US009772464B2

(12) United States Patent
Haataja

(10) Patent No.: US 9,772,464 B2
(45) Date of Patent: Sep. 26, 2017

(54) RACK AND CHASSIS FOR FIBER OPTIC SLIDING ADAPTER MODULES

(71) Applicant: ADC Telecommunications, Inc., Berwyn, PA (US)

(72) Inventor: Timothy Jon Haataja, Lakeville, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/867,446

(22) Filed: Sep. 28, 2015

(65) Prior Publication Data

US 2016/0124170 A1    May 5, 2016

Related U.S. Application Data

(63) Continuation of application No. 13/645,930, filed on Oct. 5, 2012, now Pat. No. 9,146,376.

(60) Provisional application No. 61/544,754, filed on Oct. 7, 2011.

(51) Int. Cl.
| G02B 6/00 | (2006.01) |
|---|---|
| G02B 6/44 | (2006.01) |
| G02B 6/46 | (2006.01) |
| G02B 6/38 | (2006.01) |

(52) U.S. Cl.
CPC ......... *G02B 6/4452* (2013.01); *G02B 6/3897* (2013.01); *G02B 6/4457* (2013.01); *G02B 6/4478* (2013.01); *G02B 6/46* (2013.01); *G02B 6/3825* (2013.01)

(58) Field of Classification Search
None
See application file for complete search history.

(56) References Cited

U.S. PATENT DOCUMENTS

| 5,067,784 | A | * | 11/1991 | Debortoli | G02B 6/3897 385/135 |
|---|---|---|---|---|---|
| 5,497,444 | A | | 3/1996 | Wheeler | |
| 5,717,810 | A | | 2/1998 | Wheeler | |
| 5,758,003 | A | | 5/1998 | Wheeler et al. | |
| 6,591,051 | B2 | * | 7/2003 | Solheid | G02B 6/4452 385/134 |
| RE38,311 | E | | 11/2003 | Wheeler | |
| 7,400,814 | B1 | * | 7/2008 | Hendrickson | G02B 6/4441 385/134 |
| RE41,460 | E | | 7/2010 | Wheeler | |
| 9,014,527 | B2 | | 4/2015 | Mertesdorf | |
| 9,223,106 | B2 | * | 12/2015 | Coan | G02B 6/445 |

(Continued)

OTHER PUBLICATIONS

Next Generation Frame (NGF),Jun. 2003, 30 pages.

*Primary Examiner* — Sung Pak
(74) *Attorney, Agent, or Firm* — Merchant & Gould P.C.

(57) ABSTRACT

A rack includes a first termination block disposed at the first side of the rack. The termination block houses a termination arrangement including a plurality of sliding adapter modules. The adapter modules are configured to slide between a non-extended position and an extended position. The adapter modules move away from the rack when slid to the extended position. The adapter modules have first ports facing towards the top of the rack and second ports facing towards the bottom of the rack. Certain types of racks also have a cable storage arrangement disposed at the front of the rack.

20 Claims, 51 Drawing Sheets

(56) References Cited

U.S. PATENT DOCUMENTS

| | | | | |
|---|---|---|---|---|
| 2003/0185535 A1* | 10/2003 | Tinucci | ............... | G02B 6/4455 385/134 |
| 2005/0111809 A1* | 5/2005 | Giraud | ................ | G02B 6/4455 385/135 |
| 2006/0269204 A1* | 11/2006 | Barth | .................. | G02B 6/4442 385/135 |
| 2007/0077019 A1* | 4/2007 | Barth | .................. | G02B 6/4442 385/135 |

* cited by examiner

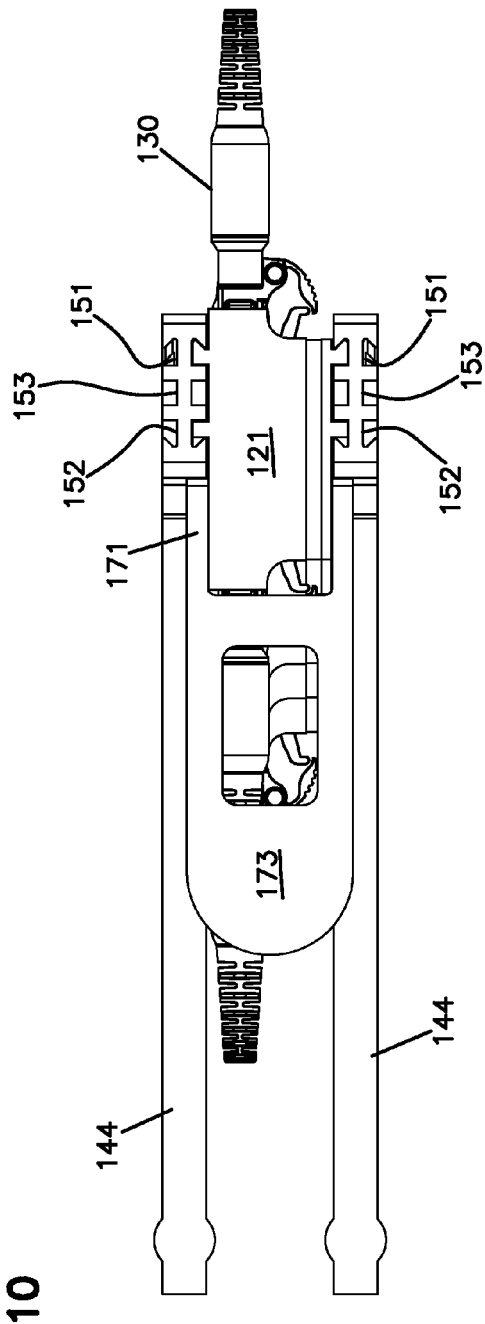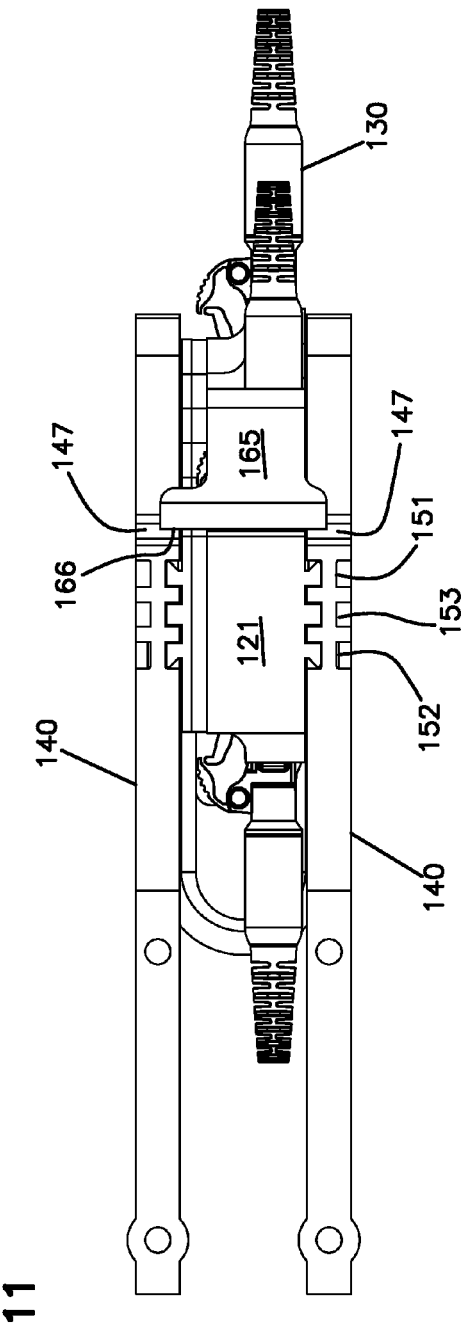

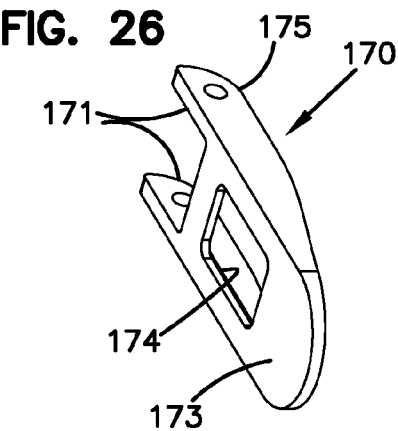
FIG. 26
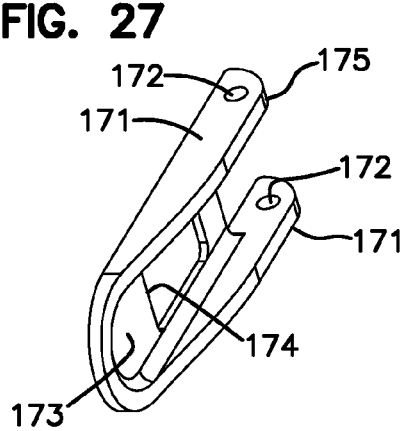
FIG. 27
FIG. 28
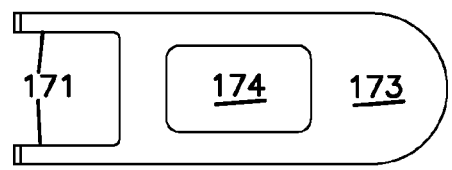
FIG. 29
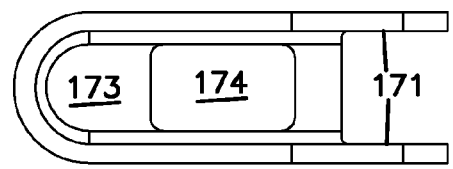
FIG. 30
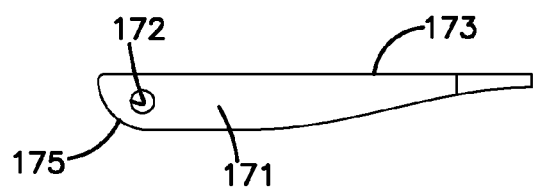

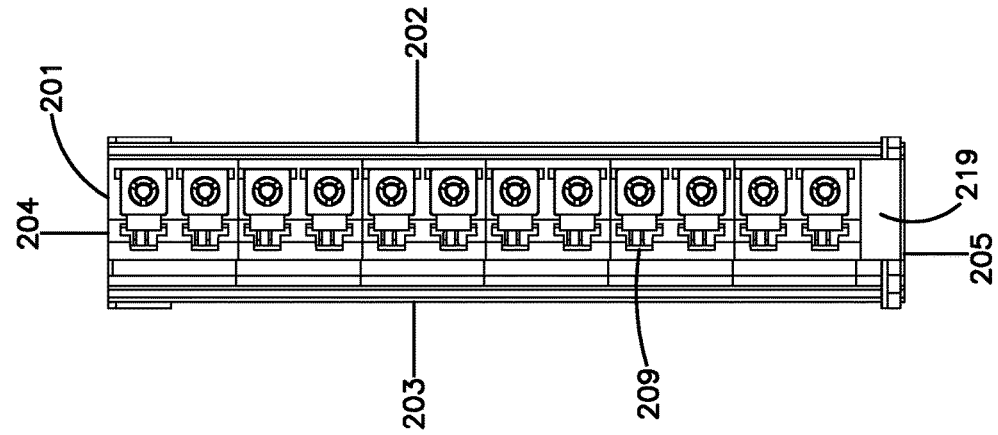
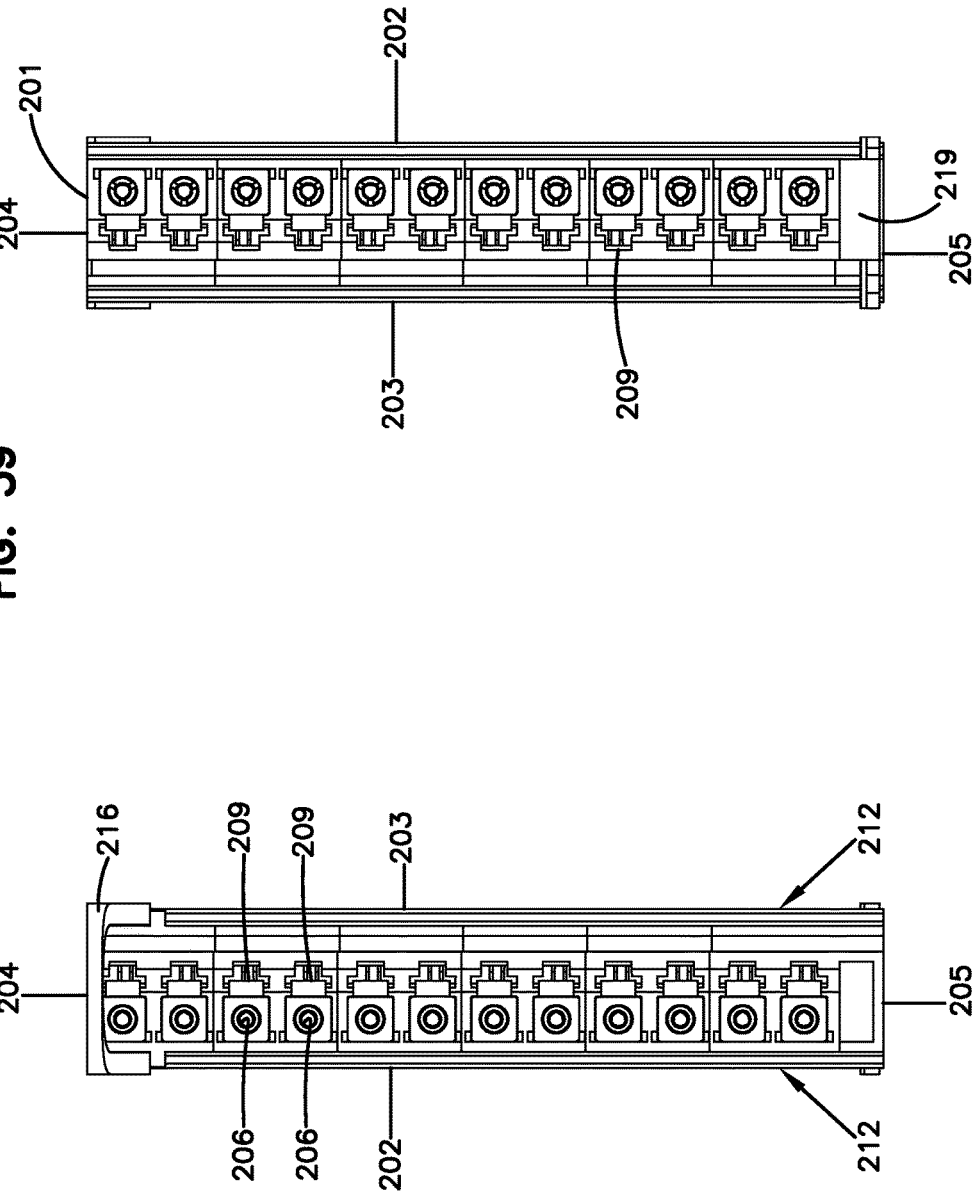

RACK AND CHASSIS FOR FIBER OPTIC SLIDING ADAPTER MODULES

CROSS REFERENCE TO RELATED APPLICATIONS

This application is a continuation of application Ser. No. 13/645,930, filed Oct. 5, 2012 now U.S. Pat. No. 9,146,376, which application claims the benefit of provisional application Ser. No. 61/544,754, filed Oct. 7, 2011, and titled "Rack and Chassis for Fiber Optic Sliding Adapter Modules," which applications are incorporated herein by reference in their entirety.

TECHNICAL FIELD

The present disclosure relates generally to fiber optic telecommunications equipment. More specifically, the present disclosure relates to a fiber optic adapter module, a chassis for holding the fiber optic adapter module, and a rack configured for holding the same.

BACKGROUND

In telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

An example of this type of equipment is found in U.S. Pat. No. 6,591,051 (the '051 patent) assigned to ADC Telecommunications, Inc. This patent concerns a high-density fiber distribution frame/rack and high-density fiber termination blocks (FTBs) which are mounted to the frame/rack. Because of the large number of optical fibers passing into and out of the FTBs, the frame/rack and blocks have a variety of structures to organize and manage the fibers. Some structures are used to aid the fibers entering the back of the frame/rack and FTBs. Other structures are provided for managing the cables leaving the FTBs on the front. The FTBs also include structures for facilitating access to the densely packed terminations. One such structure is a slidable adapter module that is incorporated into the FTBs to allow selective access to the densely packed terminations inside the FTBs.

Further development in such fiber termination systems is desired.

SUMMARY

Some aspects of the present disclosure relate to a fiber optic telecommunications device. The telecommunications device includes a fiber optic adapter module. The adapter module defines a generally one-piece block of adapters for optically connecting fiber optic cables terminated with connectors. The block defines a plurality of openings for forming an integral array of adapters.

Other aspects of the present disclosure relate to a chassis configured to hold one or more of the fiber optic telecommunications devices. The chassis is constructed and adapted to enhance cable routing towards and away from the fiber optic telecommunications devices.

Still other aspects of the present disclosure relate to a rack on which one more of the chasses may be mounted. The rack is constructed and adapted to enhance cable routing towards and away from the chasses.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 10 is a top plan view of the example adapter module and walls of FIG. 4;

FIG. 11 is a bottom plan view of the example adapter module and walls of FIG. 4;

FIG. 26 is a top, rear view of an example handle suitable for use with the adapter modules disclosed herein;

FIG. 27 is a bottom, rear view of the example handle of FIG. 26;

FIG. 28 is a top plan view of the example handle of FIG. 26;

FIG. 29 is a bottom plan view of the example handle of FIG. 26;

FIG. 30 is a side elevational view of the example handle of FIG. 26;

FIG. 38 is a rear elevational view of the first example adapter module of FIG. 31;

FIG. 39 is a front elevational view of the first example adapter module of FIG. 31;

DETAILED DESCRIPTION

Reference will now be made in detail to examples of inventive aspects of the present disclosure which are illustrated in the accompanying drawings. Wherever possible, the same reference numbers will be used throughout the drawings to refer to the same or like parts.

Figure 1:
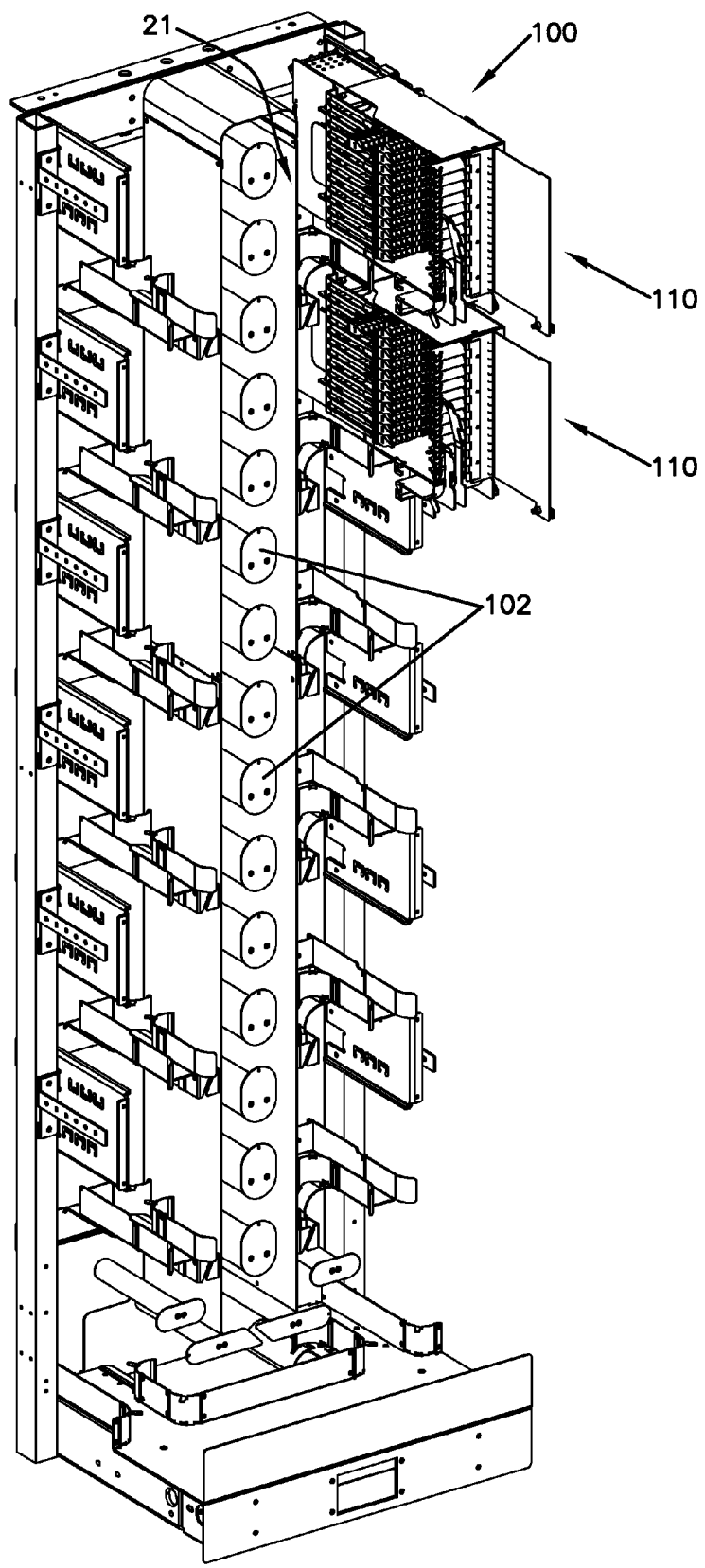
FIG. 1 is a front perspective view of a high-density fiber distribution rack having features that are examples of inventive aspects in accordance with the principles of the present disclosure, the high-density fiber distribution rack shown with two fiber termination blocks mounted thereon, the fiber termination arrangements having features that are examples of inventive aspects in accordance with the principles of the present disclosure.

A high-density distribution rack 100 and two high-density fiber termination blocks 110 having features that are examples of inventive aspects in accordance with the principles of the present disclosure are illustrated in FIG. 1. A similar high-density distribution rack 100 is described in U.S. Pat. No. 6,591,051, the disclosure of which is incorporated by reference.

Referring to FIG. 1, the fiber distribution rack 100 is adapted to receive two vertical rows of six of the fiber termination arrangements 110, two of which are shown mounted in FIG. 1. Similar fiber termination arrangements are also described in the '051 patent. Located intermediately between these two rows of fiber termination arrangements 110 is a jumper storage trough 102 that defines a series of spools for organizing and storing excess slack in cross-connect cables used to link between optical fiber terminations inside the fiber termination arrangements 110.

Figure 2:
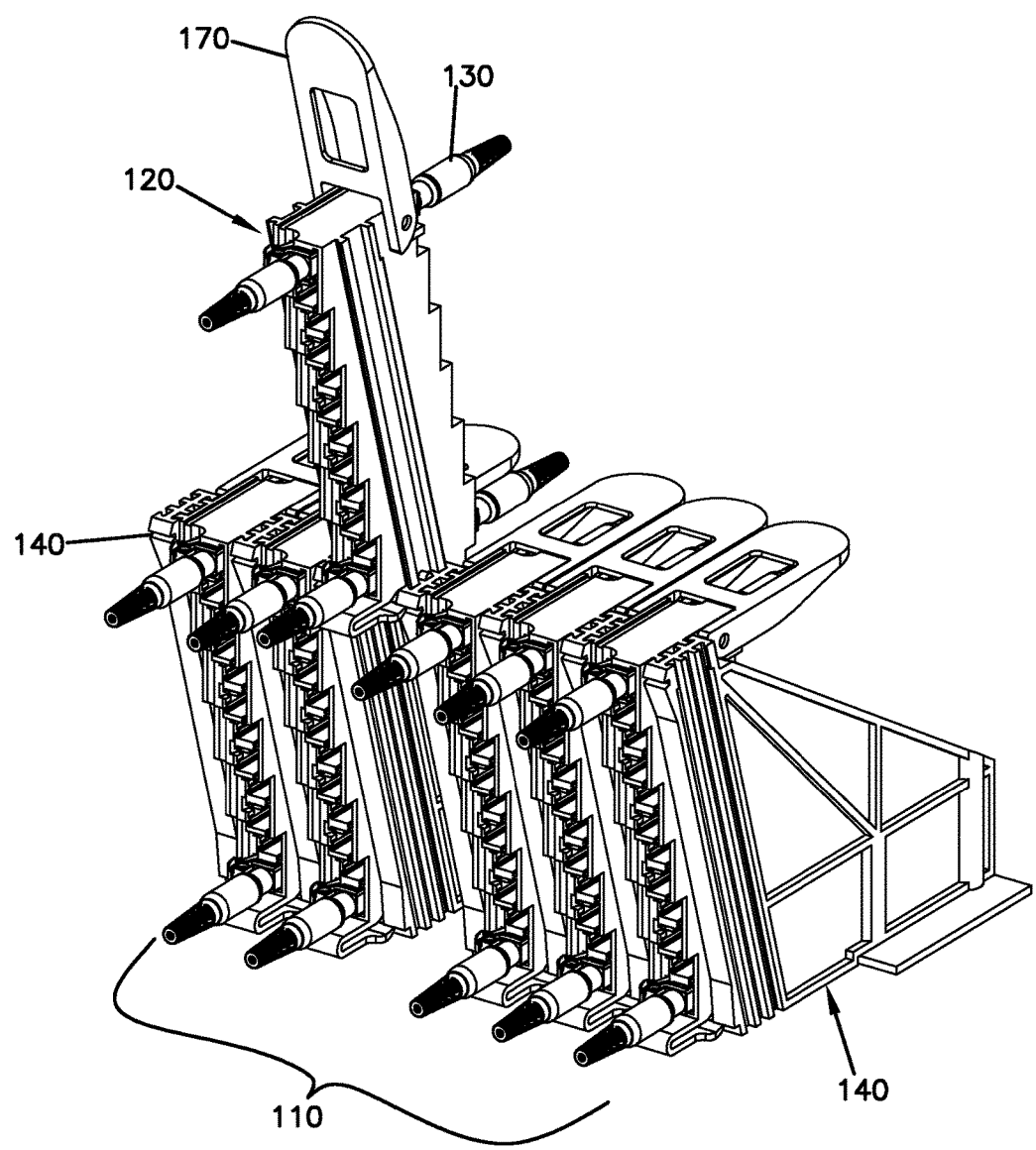
FIG. 2 is a front, top perspective view of an example termination arrangement including sliding adapter modules with one of the adapter modules in an extended position and five of the adapter modules in non-extended positions.
Figure 3:
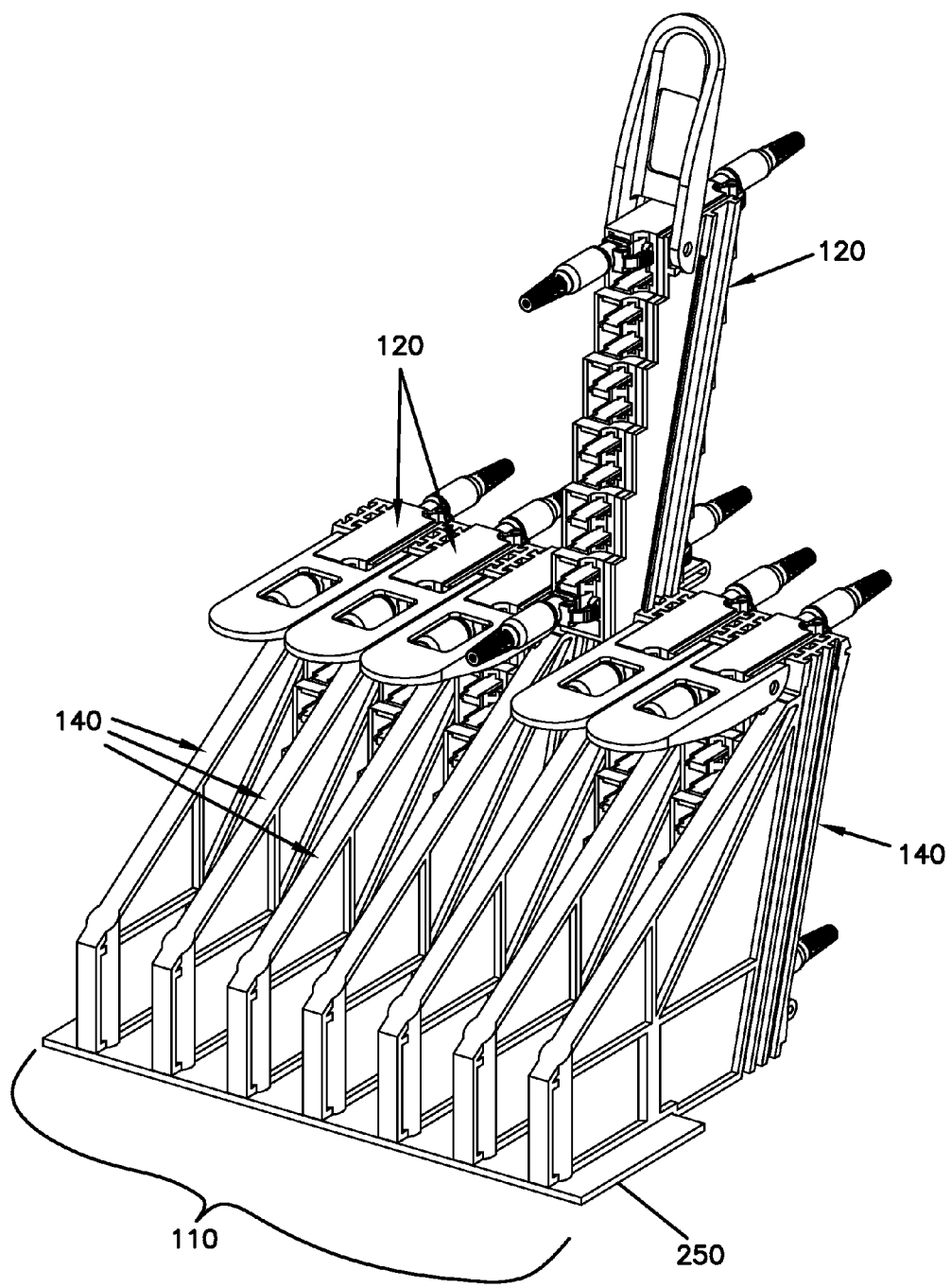
FIG. 3 is a rear, top view of the termination arrangement of FIG. 2.
Figure 6:
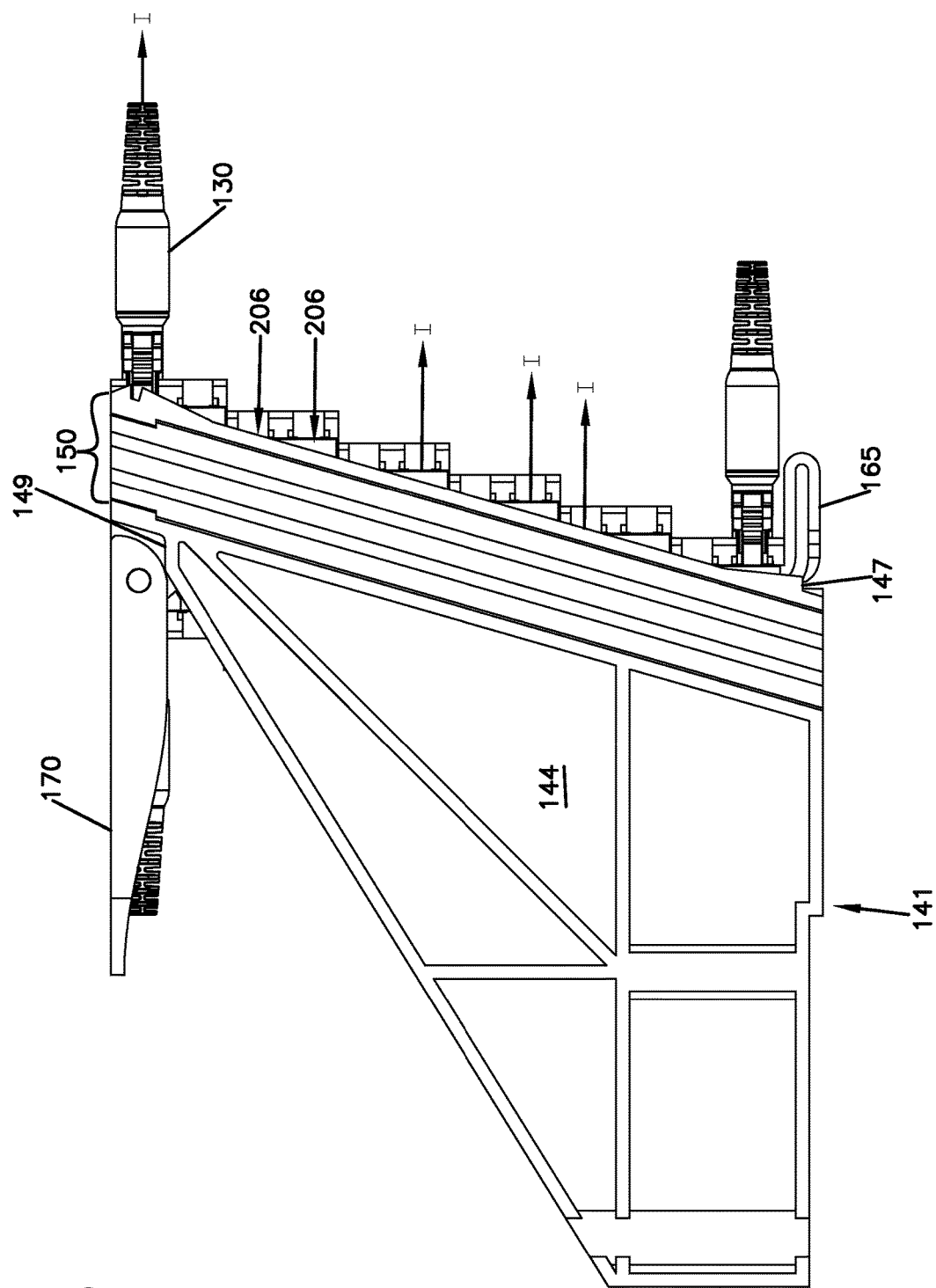
FIGS. 6 and 7 are side elevational views of the example adapter module and walls of FIG. 4.
Figure 7:
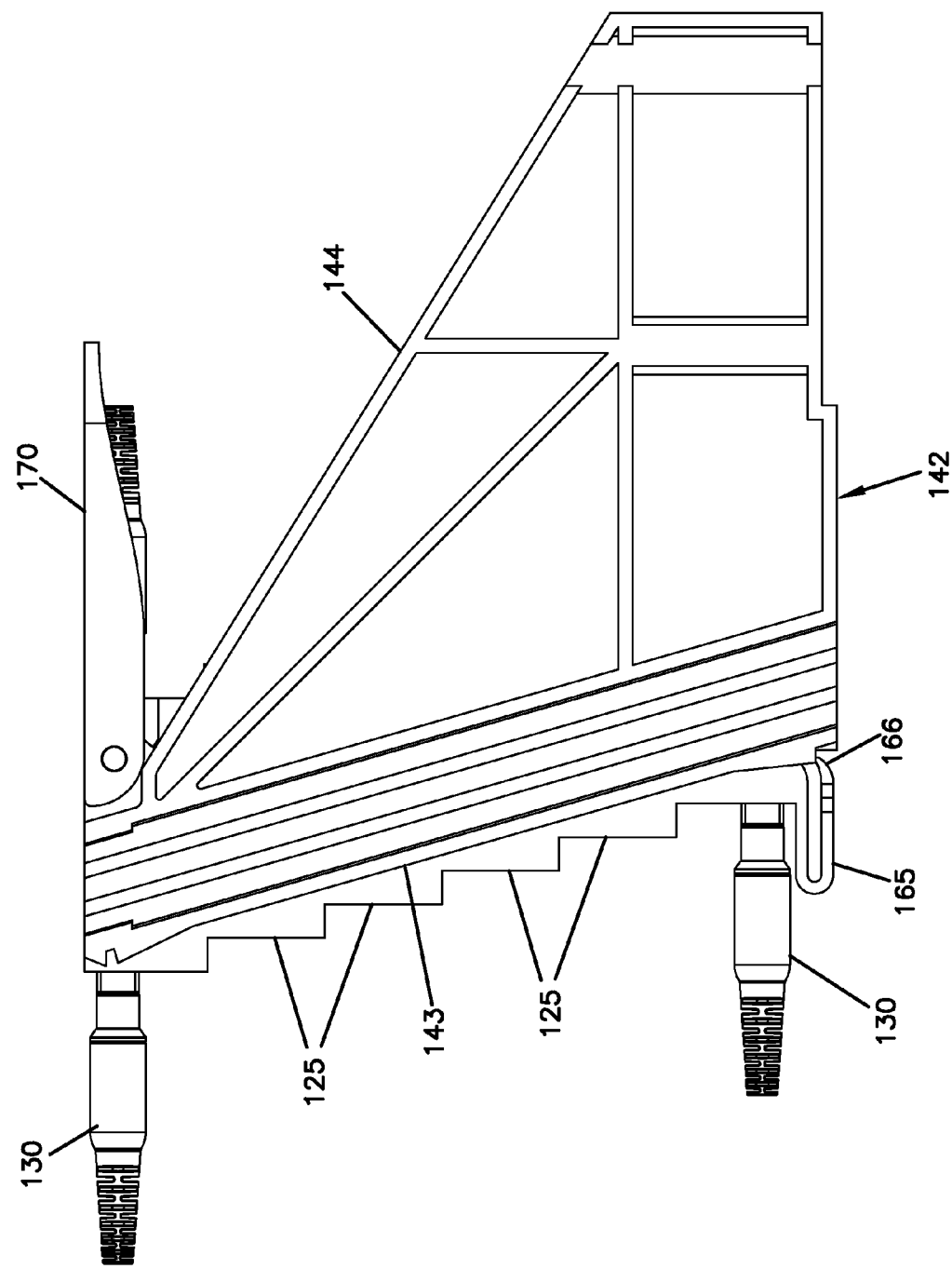
Figure 8:
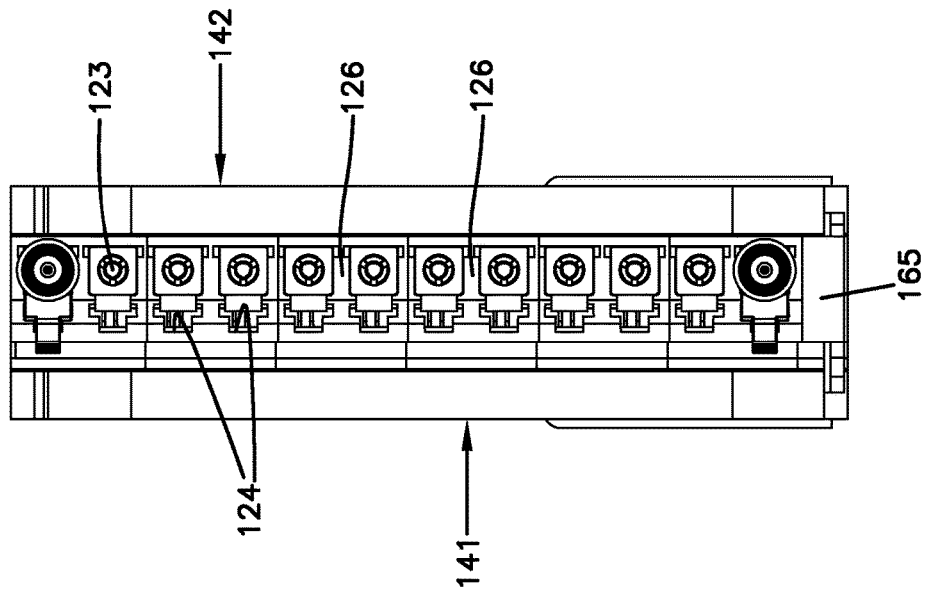
FIG. 8 is a rear elevational view of the example adapter module and walls of FIG. 4.
Figure 9:
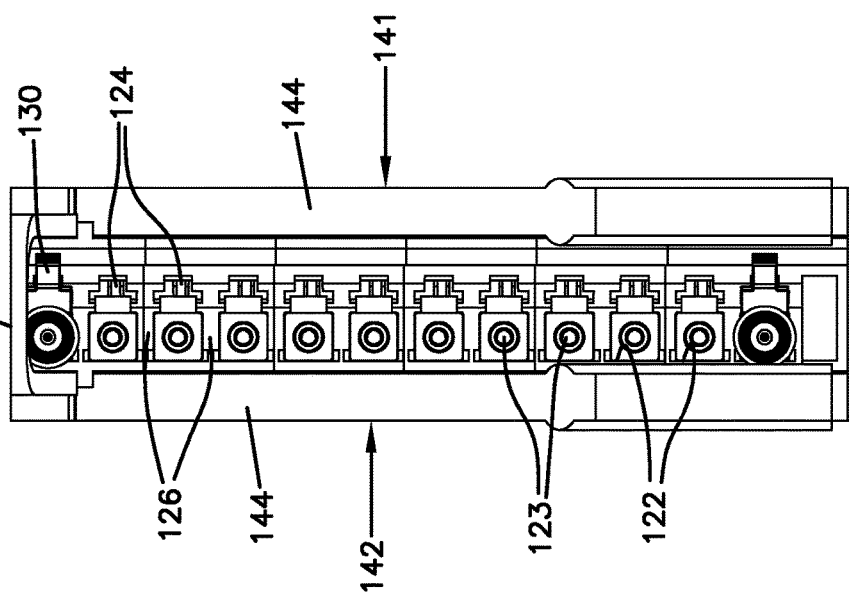
FIG. 9 is a front elevational view of the example adapter module and walls of FIG. 4.
Figure 12:
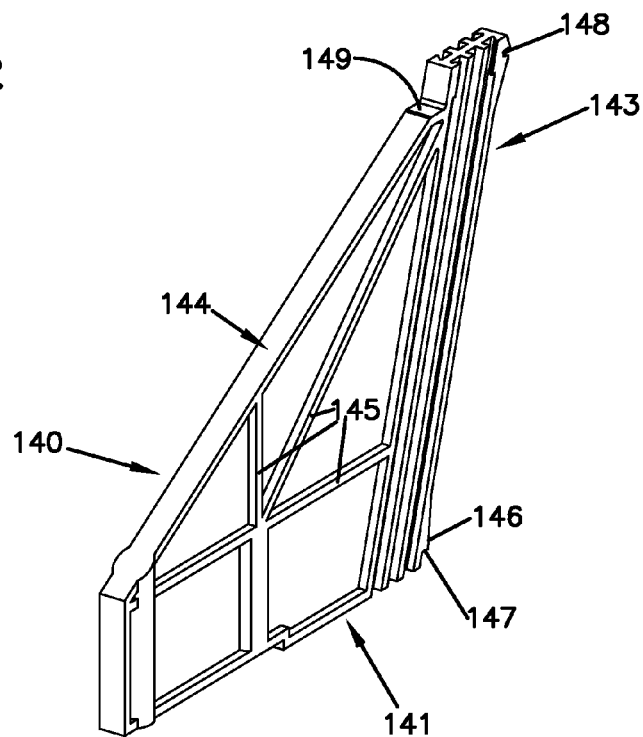
FIG. 12 is a top, rear view of an example wall suitable for use with the adapter modules disclosed herein.
Figure 13:
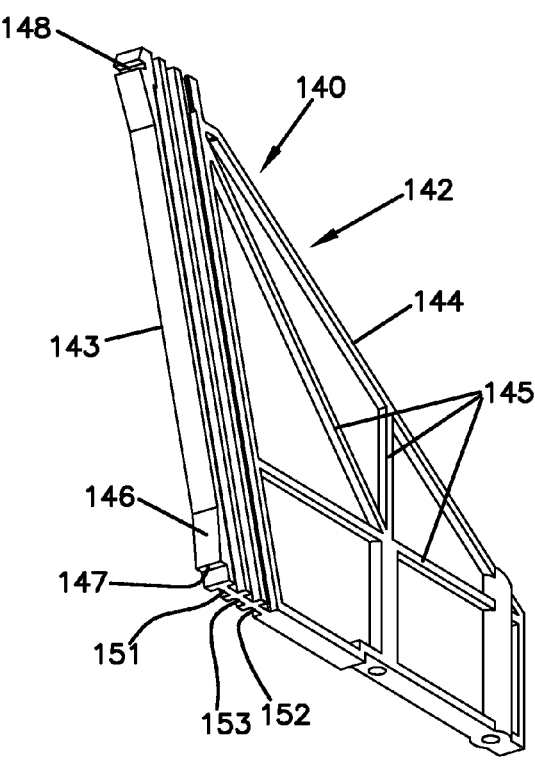
FIG. 13 is a bottom, front view of the example wall of FIG. 12.
Figure 15:
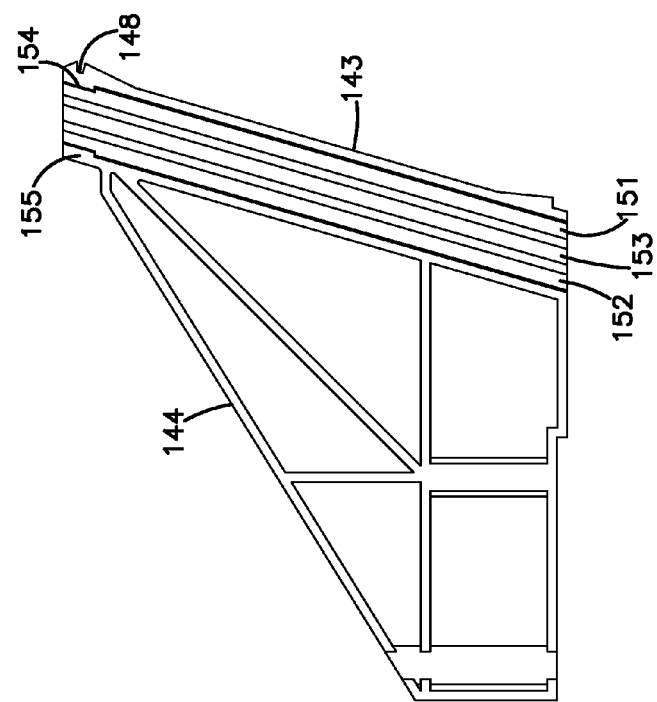
FIGS. 14 and 15 are side elevational views of the example wall of FIG. 12.
Figure 14:
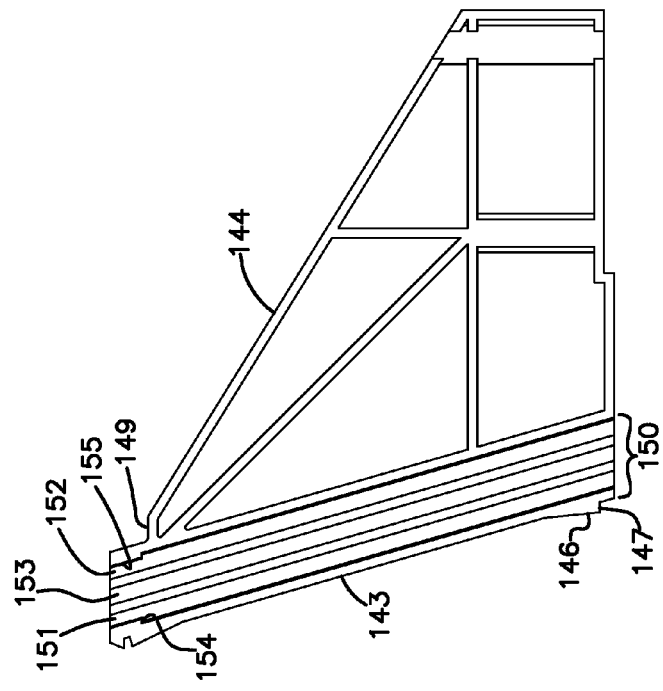
Figure 16:
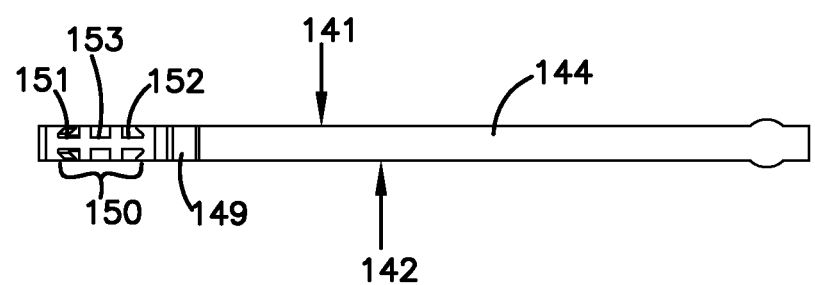
FIG. 16 is a top plan view of the example wall of FIG. 12.
Figure 17:
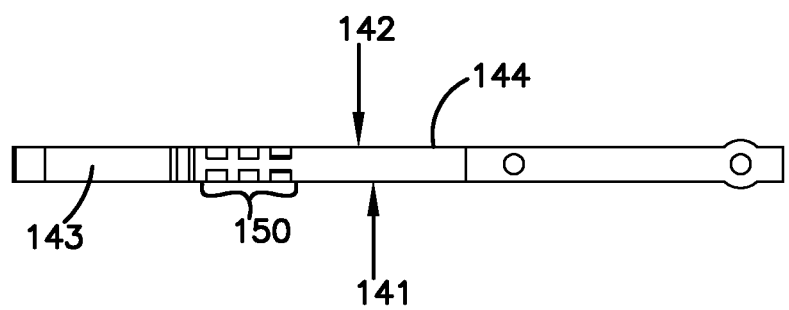
FIG. 17 is a bottom plan view of the example wall of FIG. 12.
Figure 18:
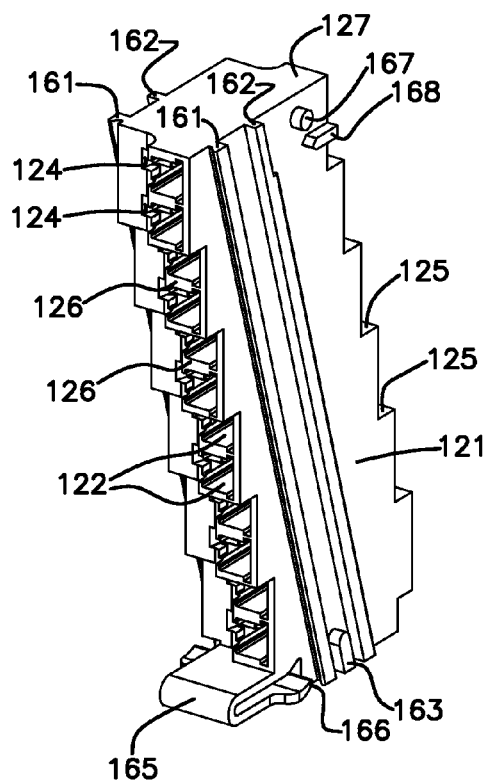
FIG. 18 is a top, front view of a first example adapter module configured in accordance with the principles of the present disclosure.
Figure 19:
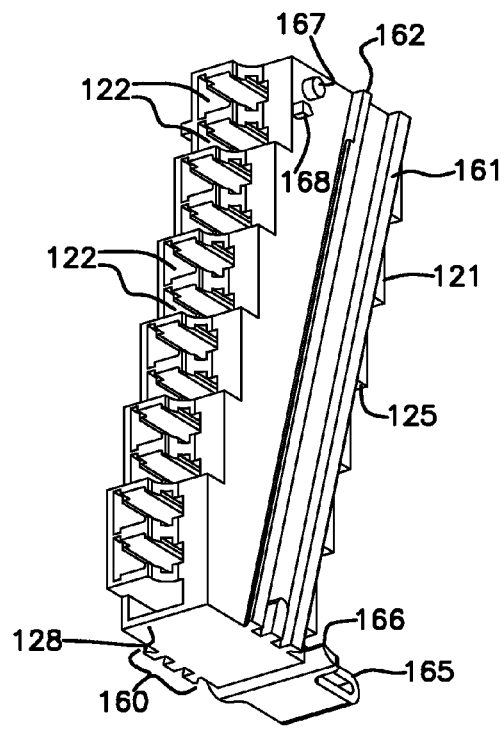
FIG. 19 is a bottom, rear view of the first example adapter module of FIG. 18.

FIGS. 2 and 3 illustrate one example implementation of a fiber termination arrangement 110 having features that are examples of inventive aspects in accordance with the principles of the present disclosure. Each fiber termination arrangement 110 includes a plurality of sliding adapter modules 120 and walls 140 having features that are examples of inventive aspects in accordance with the principles of the present disclosure. The sliding adapter modules 120 are configured to slide along the walls 140 between non-extended positions and extended positions to provide selective access to fiber optic connectors 130 mounted thereat. The adapter modules 120 slide in a direction generally non-parallel to the longitudinal axes A of the connectors mounted on the modules (see FIG. 6).

Each of the adapter modules 120 is separately slideable relative to the other adapter modules 120. In the example shown in FIGS. 2 and 3, the fiber termination arrangement 110 includes six sliding adapter modules 120 mounted between seven walls 140. Five the adapter modules 120 are in the non-extended positions and one of the adapter modules 120 is in the extended position. Moving the adapter module 120 to the extended position facilitates access to any connectors 130 held at the adapter module 120.

Referring now to FIGS. 5-11, the sliding adapter module 120 is shown slidably mounted on a pair of walls 140 that cooperatively form a track for the slidable adapter module 120. In FIGS. 5-11, the sliding adapter module 120 is shown in a retracted position relative to the walls 140.

Each wall 140 is designed to provide slidability for the adapter module 120. In FIGS. 12-17, one example wall 140 is shown in closer detail. Each wall 140 has a first side 141 and a second side 142. In certain implementations, the first and second sides 141, 142 are generally identical. Each wall 140 also includes a guiding section 143 and a support section 144. In some implementations, a guiding section 143 is formed on each side 141, 142. The support section 144 includes one or more ribs 145 that provide structural support for the wall 140.

The guiding section 143 includes a latching member adjacent a first end. The latching member defines a ramp 146 and a shoulder 147. The shoulder 147 faces the first end at a position spaced from the first end. In some implementations, a second end of the guiding section 143 includes a notched tab 148. The intersection of the support section 144 and the guiding section 143 at the second end of the guiding section 143 defines a shoulder 149. One end of the support section 144 also defines fastener openings 159 for mounting the walls 140 to a telecommunications device, such as a panel or a fiber termination block (see FIG. 1).

Figure 4:
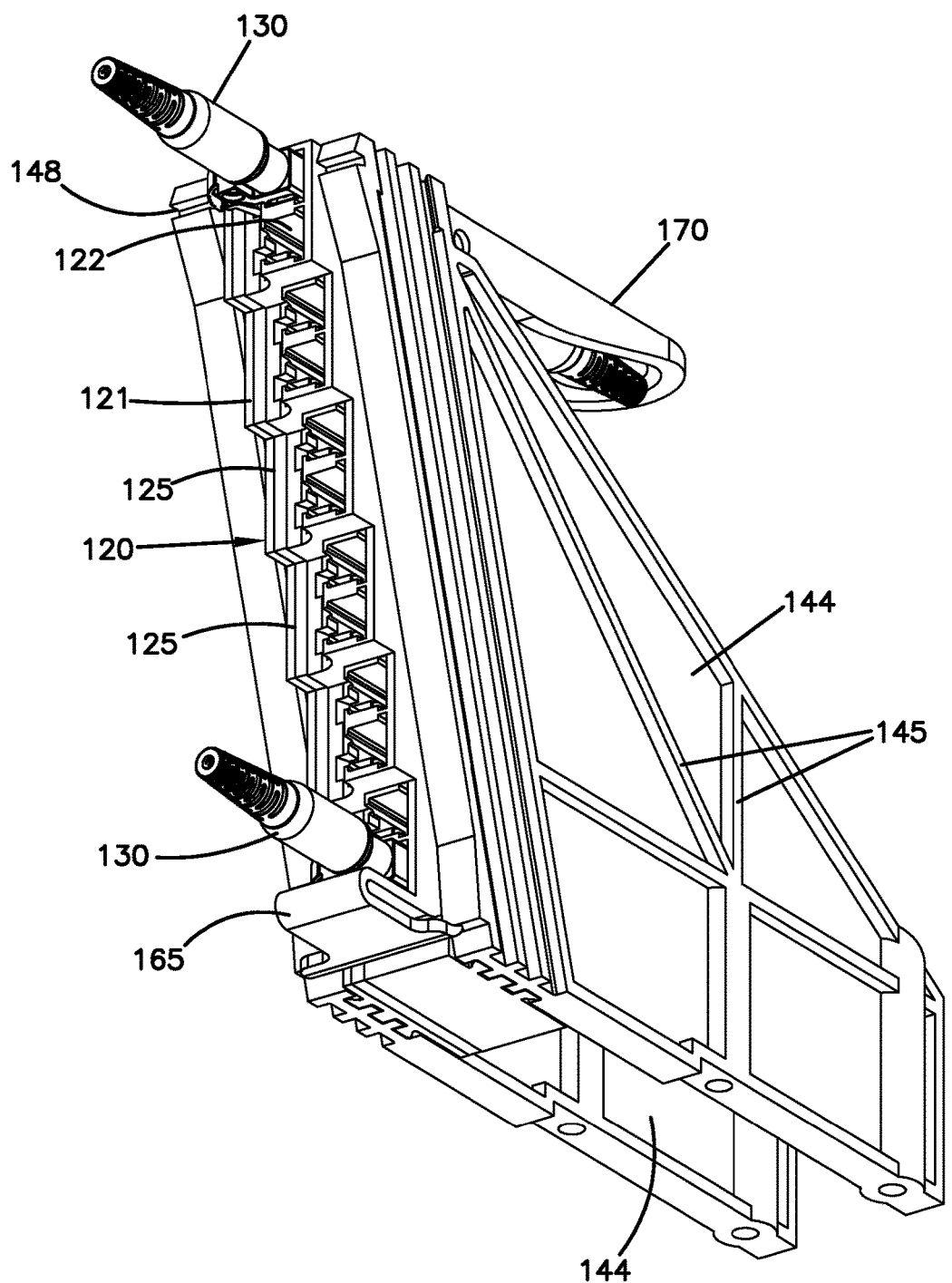
FIG. 4 is a front, bottom view of an example adapter module positioned in a non-extended position between two walls with a first fiber optic connector received at a top, front port, a second fiber optic connector received at a bottom, front port, and a third fiber optic connector received at a top, rear port of the adapter module.
Figure 5:
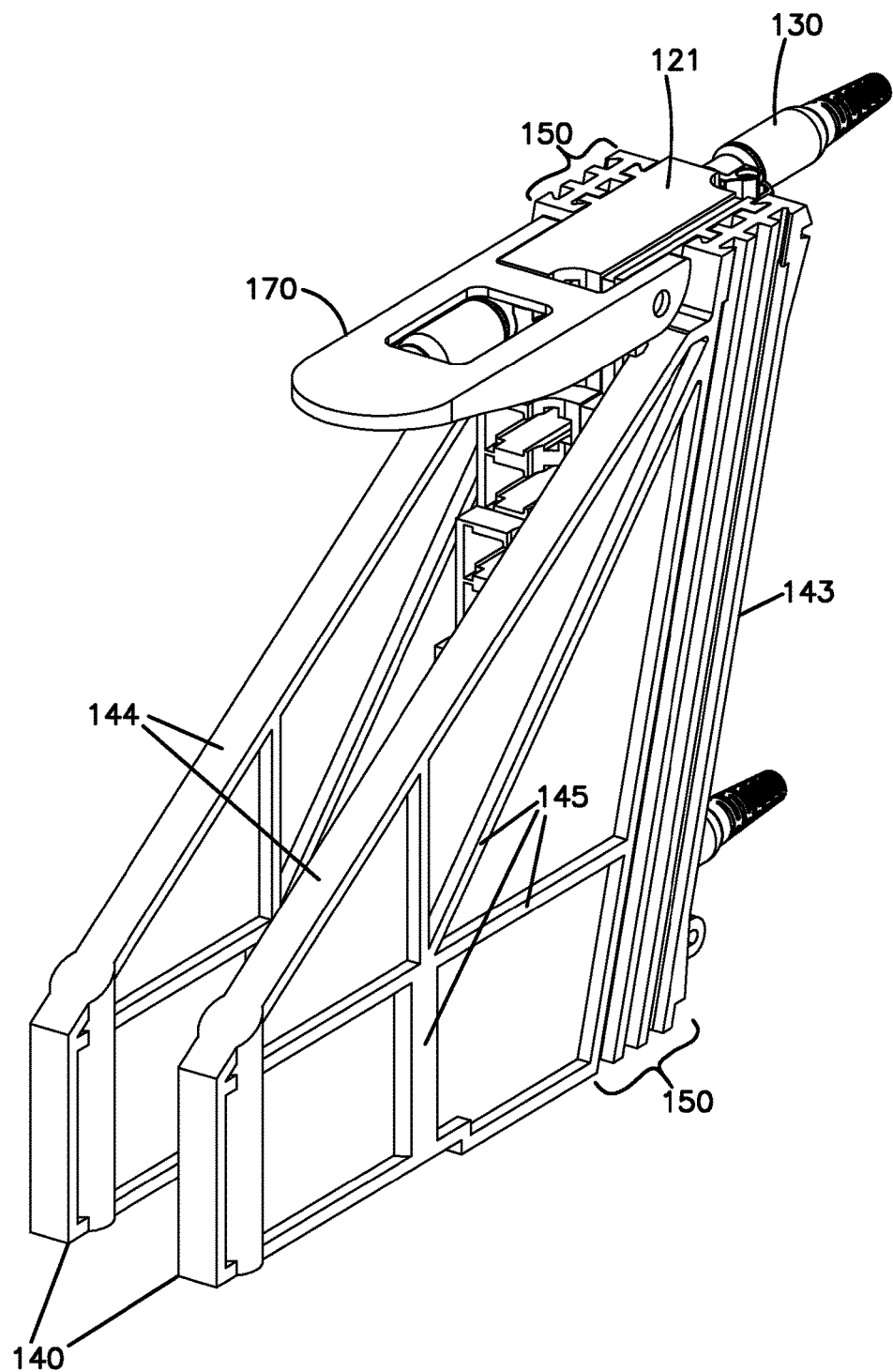
FIG. 5 is a rear, top view of the example adapter module and walls of FIG. 4.

The wall 140 also defines a plurality of linear grooves 150 on opposite sides 141, 142 of the guiding section 143 of the wall 140. In the example shown, the guiding section 143 includes a first groove 151, a second groove 152, and a third groove 153 of each side 141, 142 of the wall 140. The third groove 153 is positioned between the first and second grooves 151, 152. In other implementations, however, the guiding section 143 may include greater or fewer grooves 150. Each of the grooves 150 of one wall 140 is configured to cooperate with an opposing groove 150 from an adjacent wall 140 (see FIGS. 4 and 5) to provide a track for the sliding adapter module 120, as will be described in further detail below.

In some implementations, at least a portion of at least one of the grooves 150 is dovetailed. In the example shown, a top section 154 of the first groove 151 is dovetailed and a top section 155 of the second groove 152 is dovetailed. The remaining lengths of both grooves 151, 152 have generally rectangular transverse cross-sections. In other implementations, the grooves 151, 152 are dovetailed along their entire length. In certain implementations, the third groove 153 is dovetailed along a portion of its length. In the example shown, the third groove 153 is not dovetailed.

Referring now to FIGS. 18-25, one example implementation of a sliding adapter module 120 is illustrated. The adaptor module 120 includes a module housing 121 having a first side 129 and a second side 169 extending between a top 127 and a bottom 128. The module housing 121 defines a plurality of passages 122 extending between a first end and a second end of the module housing 121. The passages 122 are aligned parallel to each other in a column extending between the top 127 of the module housing 121 to the bottom 128 of the module housing 121

Figure 20:
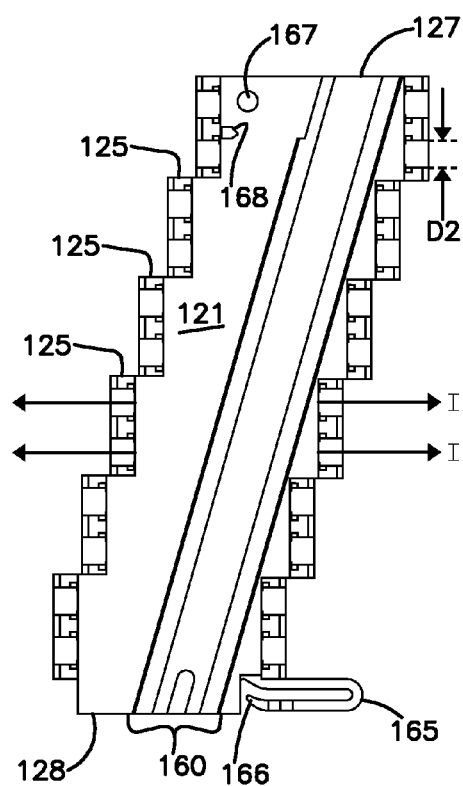
FIGS. 20 and 21 are side elevational views of the first example adapter module of FIG. 18.
Figure 21:
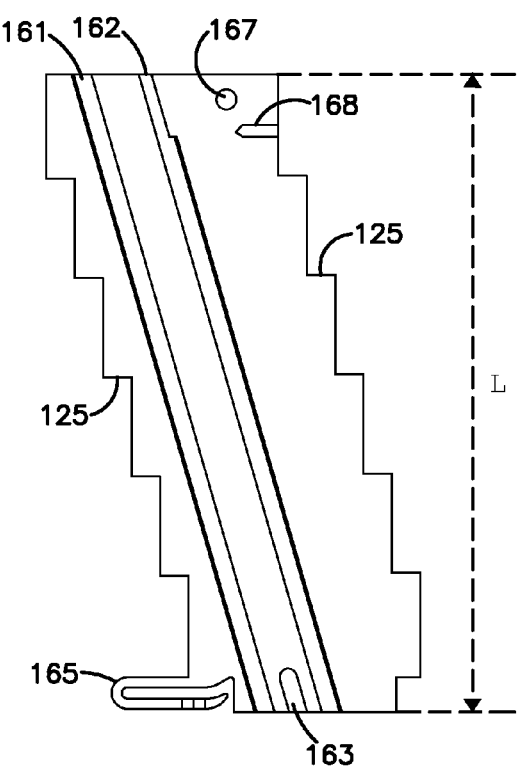
Figure 22:
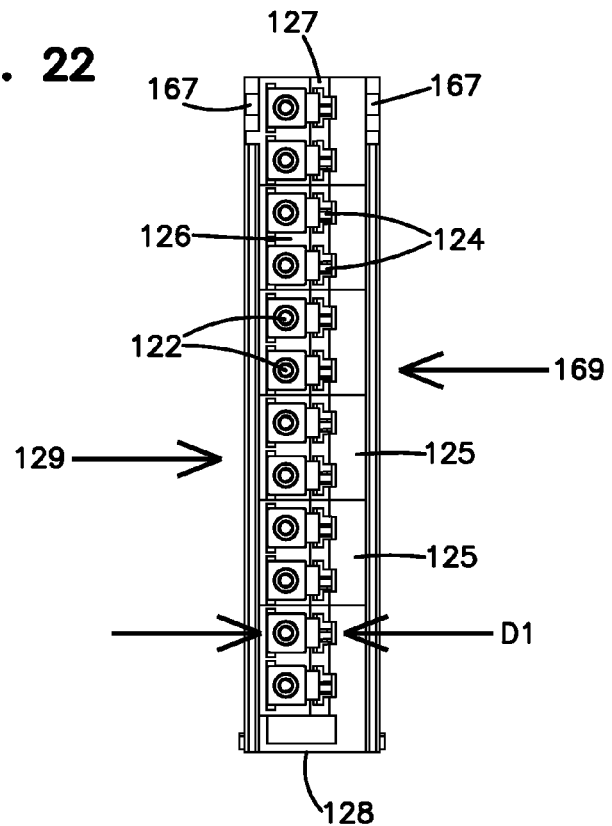
FIG. 22 is a rear elevational view of the first example adapter module of FIG. 18.
Figure 23:
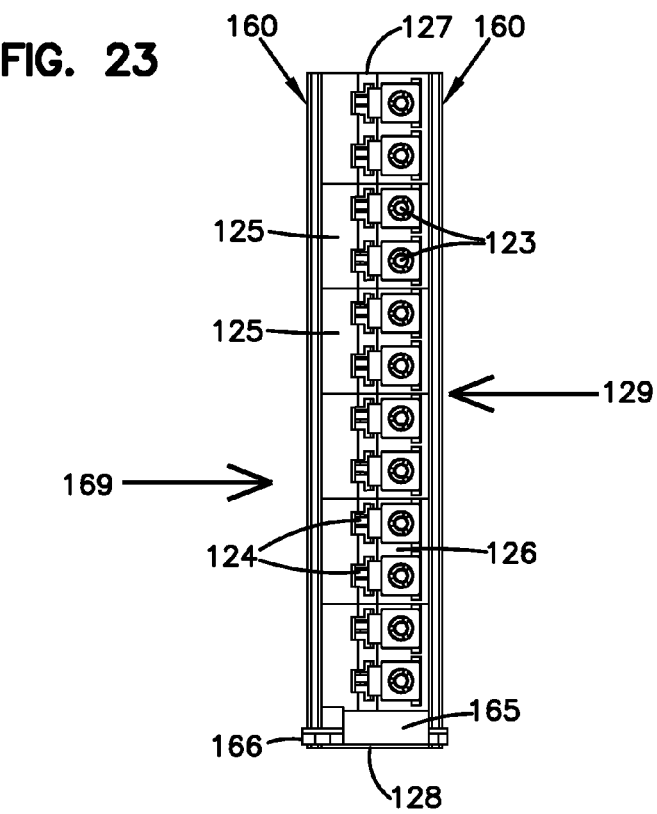
FIG. 23 is a front elevational view of the first example adapter module of FIG. 18.
Figure 24:
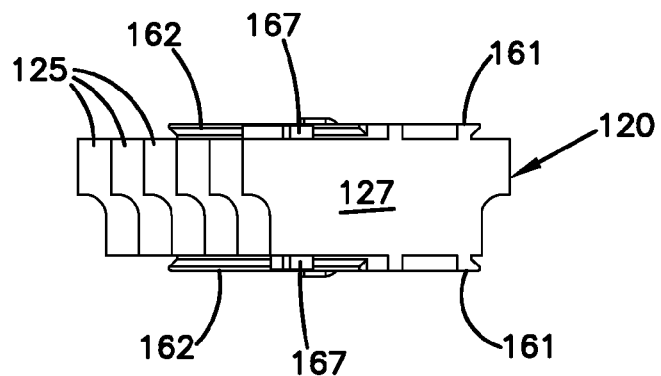
FIG. 24 is a top plan view of the first example adapter module of FIG. 18.
Figure 25:
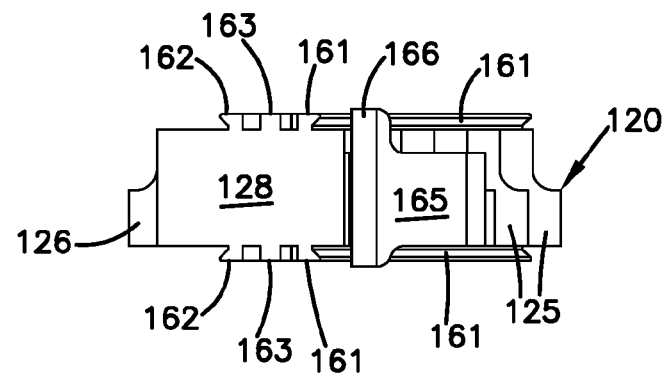
FIG. 25 is a bottom plan view of the first example adapter module of FIG. 18.
Figure 31:
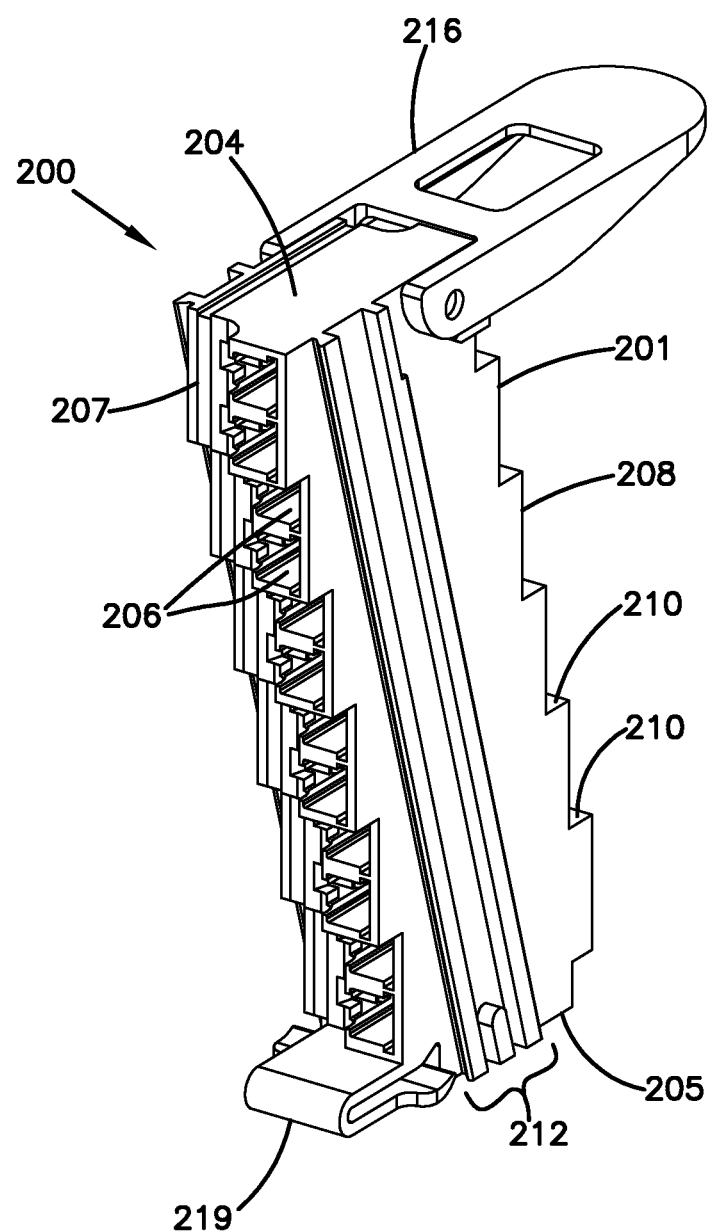
FIG. 31 is a top, front view of a second example adapter module configured in accordance with the principles of the present disclosure.
Figure 32:
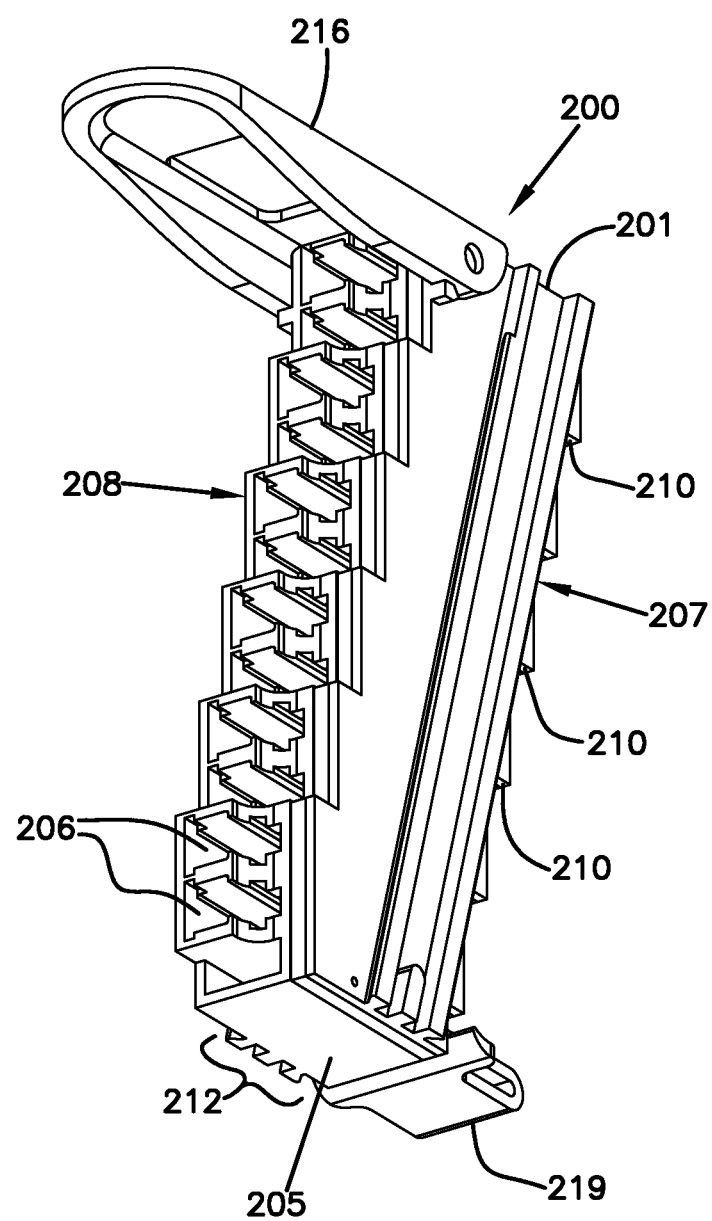
FIG. 32 is a bottom, rear view of the second example adapter module of FIG. 31.

Each end of each passage 122 forms an adapter port at which a fiber optic connector 130 may be received along an insertion axis I (FIG. 20). In some implementations, the adapter ports are configured to receive LC-type fiber optic connectors 130. In such implementations, a split sleeve 123 is located within each passage 122. In other implementations, the adapter ports are configured to receive other types of fiber optic connectors (e.g., SC-type connectors, FC-type connectors, ST-type connectors, etc.). In some such implementations, other ferrule alignment structures may be located within the passages 122).

In some implementations, the ends of the passage 122 define latching notches 124 at which a latching arm of an LC-type connector 130 may be received. In the example shown, the adapter ports are oriented so that the latching notches 124 face the second side 169 of the module housing 121. In certain implementations, the passages 122 are spaced closer to the first side 129 of the module housing 121 than the second side 169 (see FIGS. 22 and 23). For example, the passages 122 may be positioned relative to the first and second sides 129, 169 so that a sufficient gap remains between the latching notches 124 and the second side 169 to accommodate the latching arms of the connectors 130.

In some implementations, the adapter module housing 121 has a rectangular shape. In other implementations, the adapter module housing 121 has a stepped configuration with one or more passages 122 located at each step 125. For example, in certain implementations, the module housing 121 may define a series of steps 125 that are laterally offset from each other along the insertion axes of the ports. In the example shown, the adapter housing 121 defines six steps 125. In other implementations, the module housing 121 may define greater or fewer steps 125 (e.g., one, two, four, eight, etc.).

In some implementations, each step 125 of the module housing 121 defines a single passage 122. In other implementations, however, each step 125 of the module housing 121 defines a plurality of passages 122. A separator wall 126 extends between adjacent passages 122 of each step 125. In the example shown, each step 125 of the module housing 121 defines two passages 122. In other implementations, each step 125 may define greater or fewer passages 122 (e.g., one, three, four, etc.).

For slidability, the adapter module housing 121 defines a plurality of cooperating guide rails 160 for slidably mating with the grooves 150 define in the wall 140. The guide rails 160 include first and second guide rails 161, 162, respectively, which extend generally parallel to each other between the top 167 and bottom 168 of the module housing 121. The guide rails 160 also include a guide extension 163 adjacent the bottom 168 of the housing 121. In the example shown, the guide rails 160 extend diagonally along the first and second sides 129, 169 of the module housing 121.

When in the extended position, the module housing 121 is secured to the walls 140 over a relatively small surface area at the bottom of the guide rails 160 and the top of the wall grooves 150. The two guide rails 161, 162 cooperate to secure the module housing 121 to the walls 140 even when the module housing 121 is in the extended position. For example, having two guide rails 161, 162 instead of a single guide rail provides increased surface area contact between the module housing 121 and the wall grooves 150, which may facilitate maintaining retaining the module housing 121 between the walls 140. The guide extension 163 also provides increased contact with the walls 140 when the module housing 121 is in the extended position.

In some implementations, the first and second guide rails 161, 162 are dovetailed along at least a portion of their lengths to facilitate maintaining the guide rails 160 within the wall grooves 150. In certain implementations, one or both of the first and second guide rails 161, 162 are dovetailed along their entire length. In the example shown, the first guide rail 161 is dovetailed along its entire length;

the second guide rail 162 is dovetailed along a majority of its length and has a generally rectangular transverse cross-section for the rest of its length. In one implementation, the guide extension 163 is dovetailed. In another implementation, the guide extension has a rectangular transverse cross-section. In one implementation, both ends of the guide extension 163 are squared-off. In other implementations, the top end of the guide extension 163 is rounded, tapered, or otherwise contoured.

The top 127 of the module housing 121 is configured to receive a handle 170. For example, in certain implementations, a rotation pin 167 and a stop edge 168 are located on either side 129, 169 at the top 127 of the module housing 121. The bottom 128 of the module housing 121 defines a locking tab 165. The handle 170 and the locking tab 165 cooperate to releasably secure the module housing 121 in the non-extended position when mounted to the walls 140. The locking tab 165 also may aid in securing the module housing 121 in the extended position as will be described in more detail herein.

In some implementations, the locking tab 165 is located below the bottom-most passage 122 of the adapter module 121. In certain implementations, the locking tab 165 is monolithically formed with the adapter module 121. The locking tab 165 includes a latching edge 166 at an end of a spring portion. In the example shown, the locking tab 165 defines a spring portion that extends outwardly from the housing along the insertion axis I of the ports and folds or loops back towards the adapter housing 121. The latching edge 166 extends outwardly from the spring portion towards the first and second sides 129, 169 of the module housing 121.

In some implementations, the module housing 121 and the integral locking tab 165 are molded out of materials that are flexible and sufficiently strong to allow for repeated elastic rotation. In certain embodiments, the module housing 121 and locking tab 165 may be made from VALOX® PBT Resin.

One example handle 170 is shown in FIGS. 26-30. The handle 170 includes two arms 171 that each define a pin opening 172. The pin opening 172 of each arm 171 is sized and shaped to fit over the rotation pin 167 at one side 129, 169 of the module housing 121. Each arm 171 of the handle 170 defines an abutment surface 175 that is configured to interact with a respective wall 140 to release the module housing 121 from the non-extended position as will be described in more detail herein.

A grip surface 173 extends between the two arms 171. The grip surface 173 facilitates moving the module housing 121 between the non-extended and extended positions. In the example shown, the grip surface 173 defines an opening 174. In certain implementations, the opening 174 is sized to enable a finger of a user to be inserted into the opening to provide a better grip on the handle 170. In other implementations, the opening 174 is sized and shaped to provide clearance for the connectors. In still other implementations, the grip surface 173 may be solid. In the example shown, the grip surface 173 defines a rounded end opposite the arms 171. In other implementations, the end of the grip surface 173 may be squared or otherwise contoured.

The handle 170 pivots between a first position (see FIG. 6), in which the grip surface 173 extends generally parallel to the insertion axes I of the adapter ports, and a second position (see FIG. 2), in which the grip surface extends generally parallel to the guide rails 160 of the module housing 121. In some implementations, the arms 171 of the handle 170 rest stop edge 168 of the module housing 121 when the handle 170 is in the first position to inhibit further movement of the handle 170 beyond the first position. The abutment surface 175 of the handle engages the stop edge 168 when the handle 170 is in the second position to inhibit further movement of the handle 170 beyond the second position.

Figure 57:
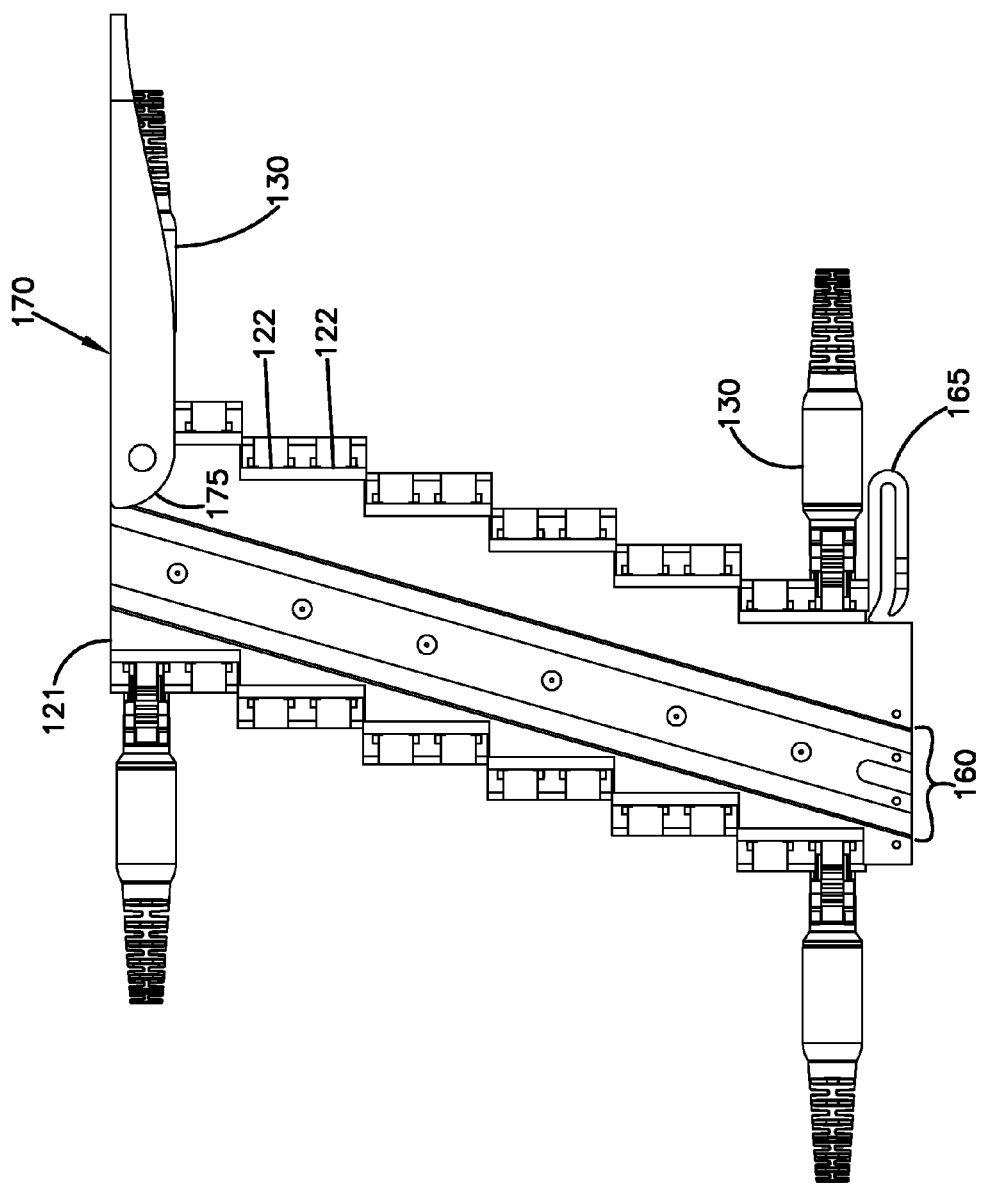
FIG. 57 is a side elevational view of a third example adapter module having a handle located at a same side of the adapter module as a locking tab in accordance with aspects of the disclosure.

In some implementations, the handle 170 is located on an opposite side of the guide rails 160 from the locking tab 165. In some such implementations, the abutment surfaces 175 of the handle 170 are configured to engage the shoulders 149 of the housings 140 that are defined above the support section 144. In other implementations, the handle 170 is located on the same side of the guide rails 160 as the locking tab 165 (see FIG. 57). In some such implementations, the abutment surfaces 175 of the handle 170 engage notches defines in the walls 140 opposite the support section 144.

A module housing 121 is installed by positioning the adapter module 120 at the walls 140 so that the locking tab 165 faces away from the support structure 144 and the guide rails 160 at the bottom 128 of the module housing 121 align with the grooves 150 at the top of two adjacent walls 140 (see FIG. 2). The first guide rail 161 is aligned with the first wall groove 151, the second guide rail 162 is aligned with the second wall groove 152, and the guide extension 163 is aligned with the third wall groove 153. The dovetailed sections of the guide rails 161, 162 fit into the dovetailed sections 154, 155 of the wall grooves 151, 152, respectively, and the module housing 121 is slid at least partially downwardly along the wall grooves 150. When the module housing 121 reaches the bottom of the walls 140, the latching edge 166 of the locking tab 165 cams over the ramp 146 of each wall 140 and snaps behind the shoulder 147 of each wall 140 to releasably lock the adapter module 120 in the non-extended position. The handle 170 is rotated to the first position (see FIG. 4).

To move the adapter module 120 to the extended position, a user rotates the handle 170 to the second position. Rotating the handle 170 causes the abutment surface 175 of the handle 170 to press against the shoulder 149 defined on each wall 140, thereby applying sufficient force to the adapter module 120 to release the latching edge 166 of the locking tab 165 from the shoulders 147 of the opposing walls 140. For example, the force may move the module housing 121 forward, thereby lifting the latching edge 166 out from behind the shoulders 147 (e.g., by elastically flexing the spring portion of the locking tab 165). When the latching edge 166 is released, the module housing 121 may be freely moved along the wall grooves 150. When the module housing 121 reaches the top of the walls 140, the latching edge 166 of the locking tab 165 snaps into the notched tab 148 of each of the opposing walls 140 to releasably lock the adapter module 120 in the extended position relative to the walls 140. As such, when the adapter module 120 is in the fully extended position (see FIGS. 2 and 3), the module housing 121 is inhibited from sliding off the walls 140.

If desired (e.g., for repair or replacement of the adapter module 120), at the fully extended position, the adapter module 120 may be fully removed from the walls 140. In some implementations, the module housing 121 is removed from the walls 140 by applying sufficient force to the module housing 121 to snap the latching edge 166 of the locking tab 165 out of the notched tab 148. In other implementations, the module housing 120 is removed from the walls 140 by squeezing or pressing on the spring portion of the locking tab 165 to flex the latching edge 166 out of the notched tab 148 of each wall 140.

The adapter module 120, by being manufactured from a single-piece housing 121 defining an integral block of adapters, can have reduced overall length, width, and height as compared the same number of separate adapters positioned adjacent each other, thereby allowing for higher density of fiber terminations. For example, each adapter opening 122 includes a major dimension D1 (FIG. 22) and a minor dimension D2 (FIG. 20) wherein the major dimension D1 is greater than the minor dimension D2 (see FIG. 23). The module housing 121 is configured such that openings 122 are lined up along their minor dimensions D2 forming a length L (FIG. 21) for the entire array of adapters (see FIG. 23).

The major dimension D1 is sized to generally correspond to the key area of an LC-type connector 130 and the minor dimension D2 is sized to generally correspond to the shorter sides of the LC-type connector 130, which are commonly known in the art. By aligning the minor dimensions D2 of the adapter ports to form the array of adapters, the overall length L of the array of adapters can be reduced relative to separately mounted adapters. In some implementations, the overall length L may range from about 3 inches to about 3.3 inches. In one example implementation, the overall length L is about 3.16 inches and each step is about 0.5 inches long. In other implementations, however, the adapter module 120 may be longer or shorter.

FIGS. 31-56 show another example implementation of an adapter module 200 that is configured to slide along the walls 140 between a non-extended position and an extended position to provide selective access to fiber optic connectors 130 mounted thereat. The adapter modules 200 slides in a direction generally non-parallel to the longitudinal axes A of the connectors 130 mounted on the modules 200.

The adaptor module 200 includes a module housing 201 having a first side 202 and a second side 203 extending between a top 204 and a bottom 205. The module housing 201 defines a plurality of passages 206 extending between a first end 207 and a second end 208 of the module housing 201. The passages 206 are aligned parallel to each other in a column extending between the top 204 and bottom 205 of the module housing 201

Each end of each passage 206 forms an adapter port at which a fiber optic connector 130 may be received along an insertion axis I' (FIG. 20). In some implementations, the adapter ports are configured to receive LC-type fiber optic connectors 130. In such implementations, a split sleeve is located within each passage 206. In other implementations, the adapter ports are configured to receive other types of fiber optic connectors (e.g., SC-type connectors, FC-type connectors, ST-type connectors, etc.). In some such implementations, other ferrule alignment structures may be located within the passages 206).

In some implementations, the ends of the passage 206 define latching notches 209 at which a latching arm of an LC-type connector 130 may be received. In the example shown, the adapter ports are oriented so that the latching notches 209 face the second side 203 of the module housing 201. In certain implementations, the passages 206 are spaced closer to the first side 202 of the module housing 201 than to the second side 203 (see FIGS. 38 and 39). For example, the passages 206 may be positioned relative to the first and second sides 202, 203 so that a sufficient gap remains between the latching notches 209 and the second side 203 to accommodate the latching arms of the connectors 130.

In some implementations, the adapter module housing 201 has a rectangular shape. In other implementations, the adapter module housing 201 has a stepped configuration with one or more passages 206 located at each step 210. For example, in certain implementations, the module housing 201 may define a series of steps 210 that are laterally offset from each other along the insertion axes I' of the ports. In the example shown, the adapter housing 201 defines six steps 210. In other implementations, the module housing 201 may define greater or fewer steps 210 (e.g., one, two, four, eight, etc.).

In some implementations, each step 210 of the module housing 201 defines a single passage 206. In other implementations, however, each step 210 of the module housing 201 defines a plurality of passages 206. A separator wall 211 extends between adjacent passages 206 of each step 210. In the example shown, each step 211 of the module housing 201 defines two passages 206. In other implementations, each step 210 may define greater or fewer passages 206 (e.g., one, three, four, etc.).

For slidability, the adapter module housing 201 defines a plurality of cooperating guide rails 212 for slidably mating with the grooves 150 define in the wall 140. The guide rails 212 include first and second guide rails 213, 214, respectively, which extend generally parallel to each other between the top 204 and bottom 205 of the module housing 201. The guide rails 212 also include a guide extension 215 adjacent the bottom 205 of the housing 201. In the example shown, the guide rails 212 extend diagonally along the first and second sides 202, 203 of the module housing 201.

In some implementations, the first and second guide rails 213, 214 are dovetailed along at least a portion of their lengths to facilitate maintaining the guide rails 212 within the wall grooves 150. In certain implementations, one or both of the first and second guide rails 213, 214 are dovetailed along their entire length. In the example shown, the first guide rail 213 is dovetailed along its entire length; the second guide rail 214 is dovetailed along a majority of its length and has a generally rectangular transverse cross-section for the rest of its length. In one implementation, the guide extension 215 is dovetailed. In another implementation, the guide extension has a rectangular transverse cross-section. In one implementation, both ends of the guide extension 215 are squared-off. In other implementations, the top end of the guide extension 215 is rounded, tapered, or otherwise contoured.

The top 204 of the module housing 201 is configured to receive a handle 216. For example, in certain implementations, a rotation pin 217 and a stop edge 218 are located on either side 202, 203 at the top 204 of the module housing 201. In some implementations, the rotation pin 217 and stop edge 218 are configured to receive the handle 170 described herein. In other implementations, another type of handle may be utilized. The bottom 205 of the module housing 201 defines a locking tab 219. In some implementations, the locking tab 219 is the same as locking tab 165 of the module housing 121 described herein. In other implementations, a different type of locking tab may be utilized.

The handle 216 and the locking tab 219 cooperate to releasably secure the module housing 201 in the non-extended position when mounted to the walls 140 (e.g., in the same way that the handle 170 and the locking tab 165 secure the module housing 121 in the non-extended position). The locking tab 219 also may aid in securing the module housing 201 in the extended position (e.g., in the same way that the locking tab 165 secured the module housing 121 in the extended position). In the example shown, the handle 216 is located at an opposite side of the guide rails 212 from the locking tab 219. In other implementations, however, the handle 216 may be located on the same side of the guide rails 212 as the locking tab 219.

In some implementations, the locking tab 219 is monolithically formed with at least part of the module housing 201. In some such implementations, the locking tab 219 is molded out of materials that are flexible and sufficiently strong to allow for repeated elastic rotation. In certain embodiments, the locking tab 219 may be made from VALOX® PBT Resin.

In accordance with some aspects, certain types of adapter modules 200 may be configured to collect physical layer information from one or more fiber optic connectors 130 received thereat. For example, certain types of adapter modules 200 may include media reading interfaces that are configured to engage memory contacts on the fiber optic connectors 130. Example fiber optic connectors having suitable memory storage and memory contacts are shown in U.S. application Ser. No. 13/025,841, filed Feb. 11, 2011, titled "Managed Fiber Connectivity Systems," the disclosure of which is hereby incorporated herein by reference.

Figure 33:
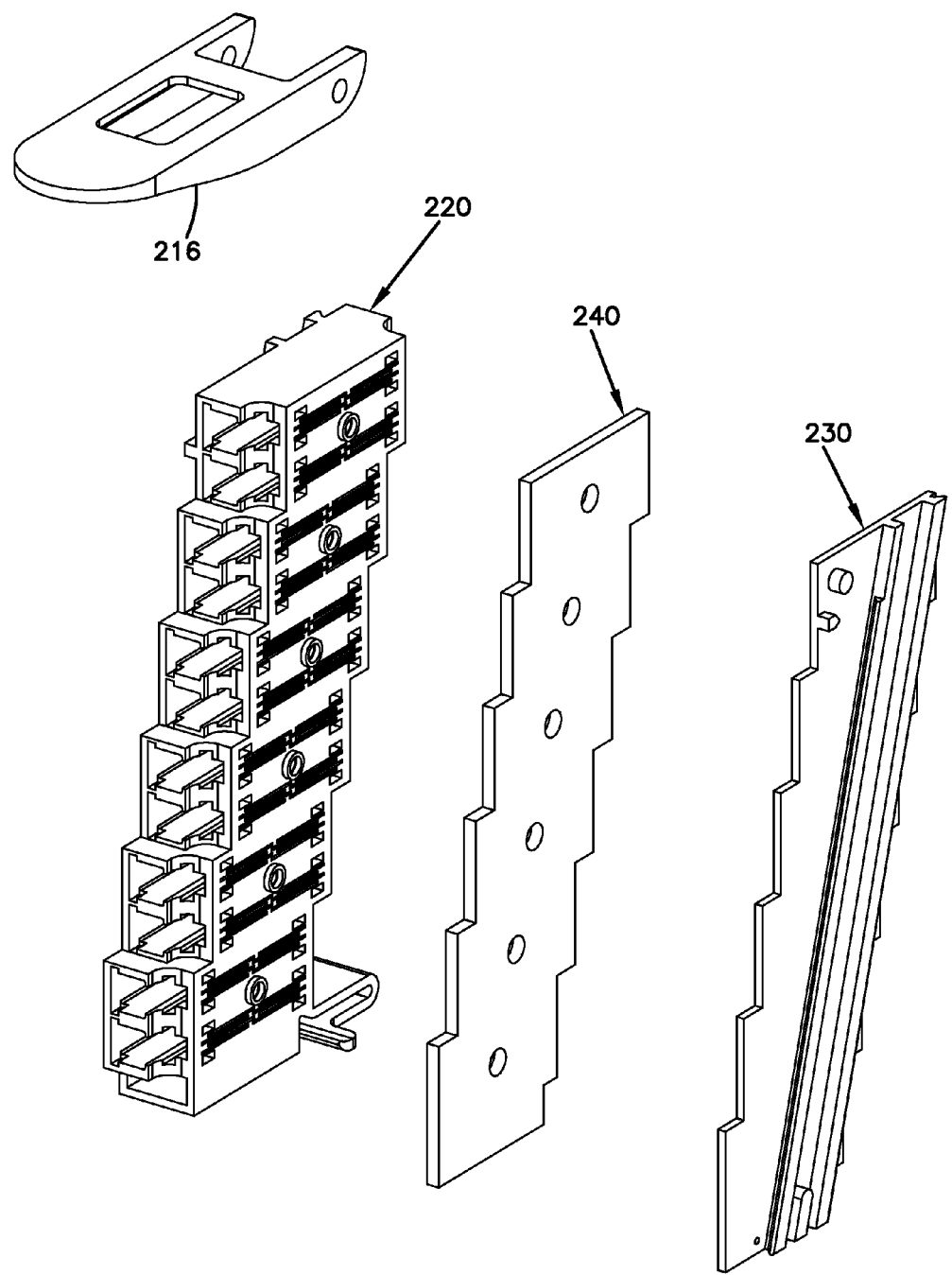
FIG. 33 is an exploded view of the second example adapter module of FIG. 31 including a termination block, a handle, a circuit board, and a cover in accordance with the principles of the present disclosure.
Figure 35:
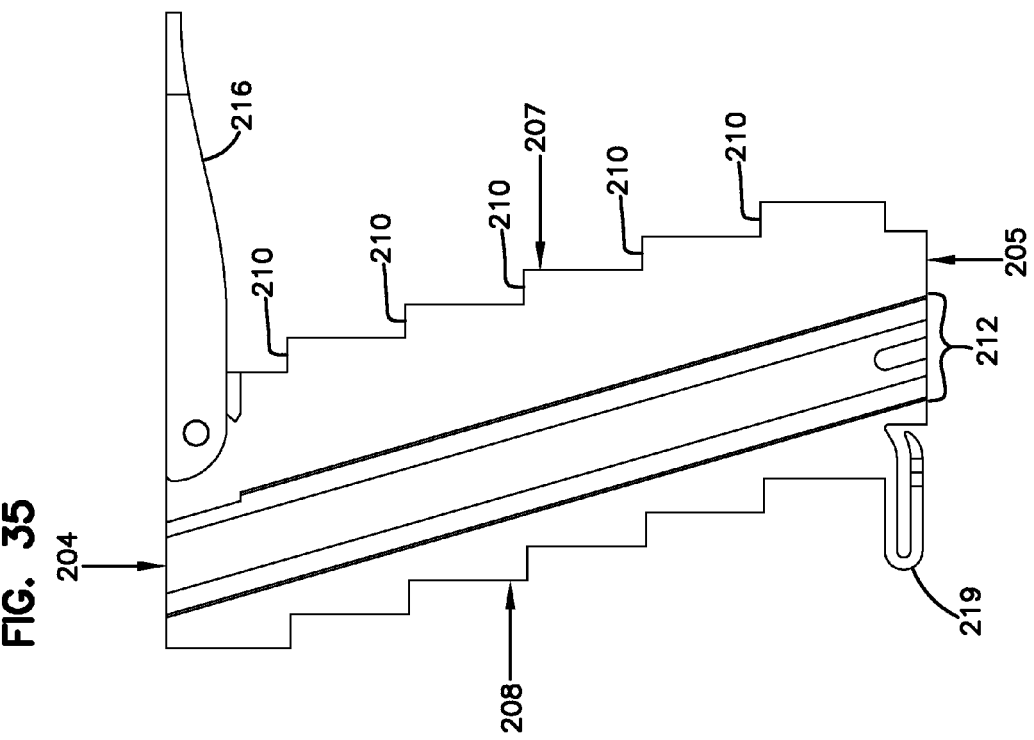
FIG. 35 is a second side elevational view of the first example adapter module of FIG. 31.
Figure 34:
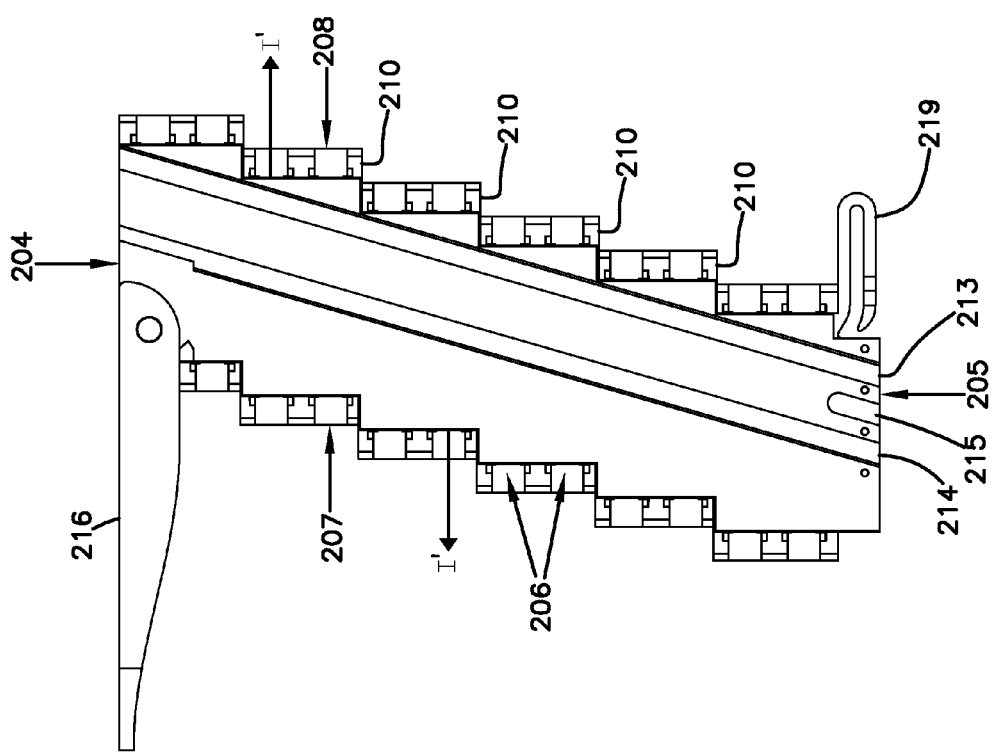
FIG. 34 is a first side elevational view of the first example adapter module of FIG. 31.
Figure 36:
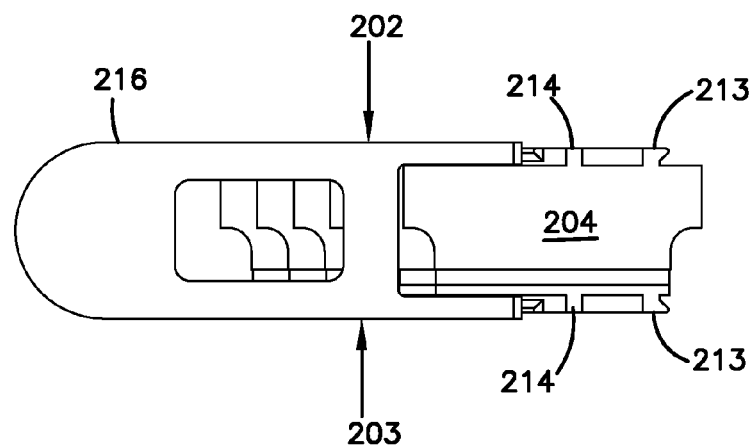
FIG. 36 is a top plan view of the first example adapter module of FIG. 31.
Figure 37:
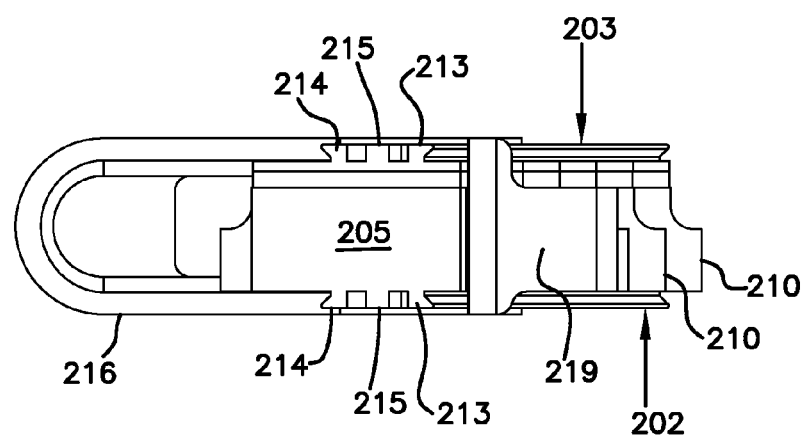
FIG. 37 is a bottom plan view of the first example adapter module of FIG. 31.
Figure 41:
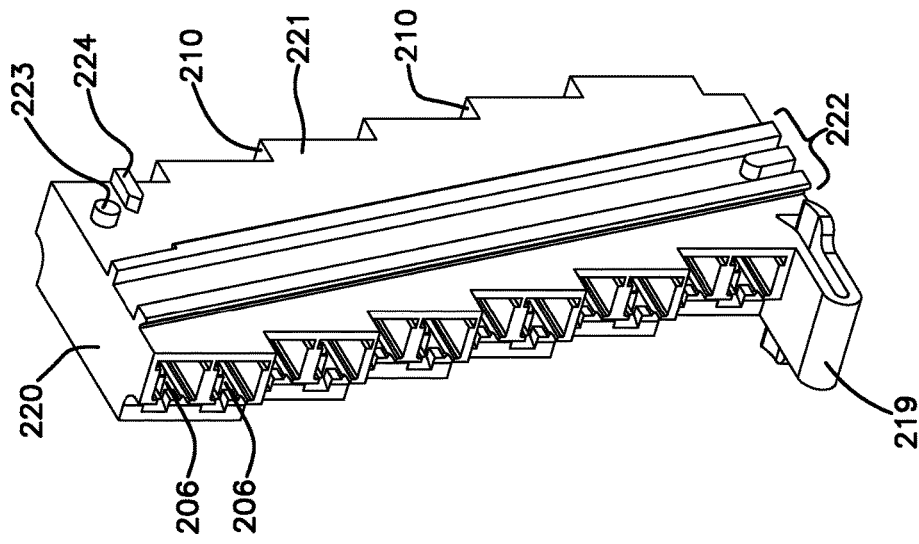
FIGS. 40-47 show one example termination block suitable for use with the second example adapter module of FIG. 31.
Figure 40:
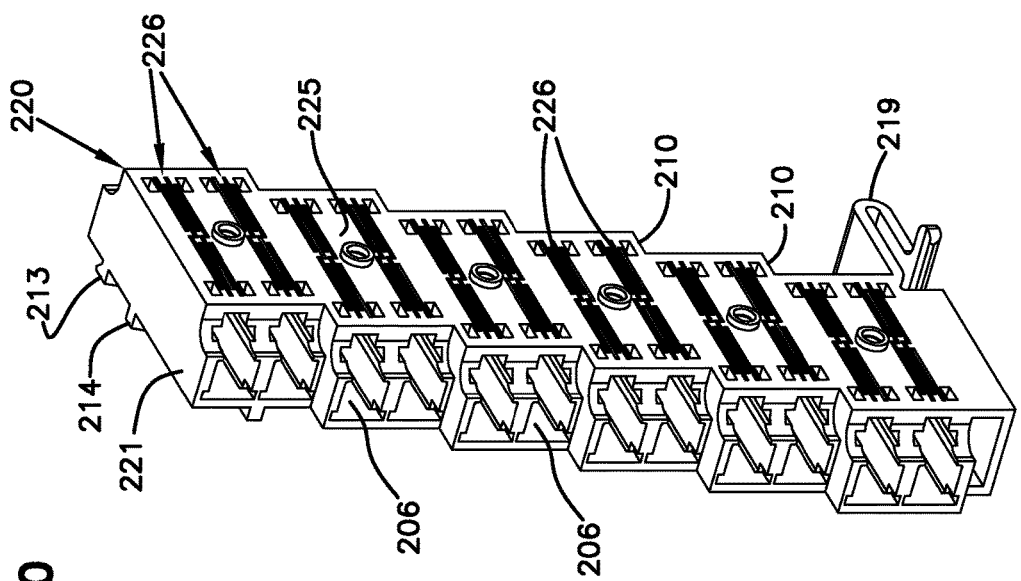
Figure 43:
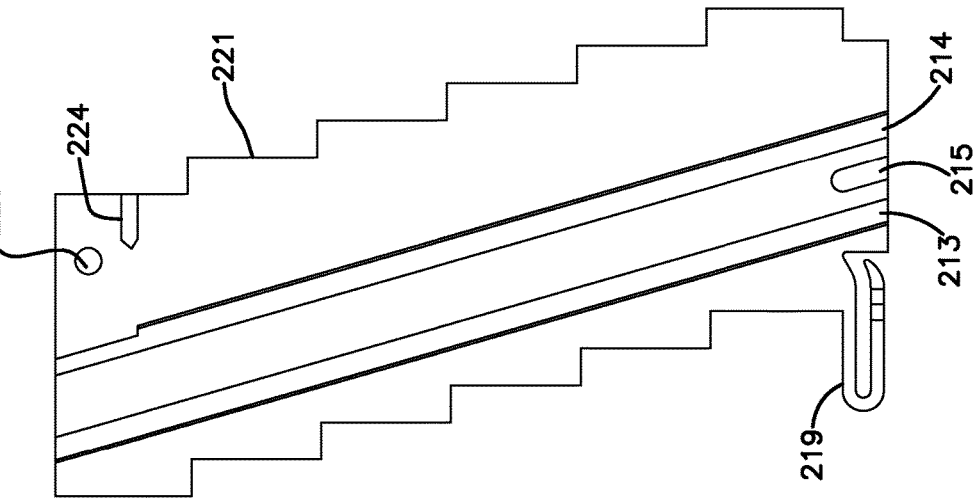
Figure 42:
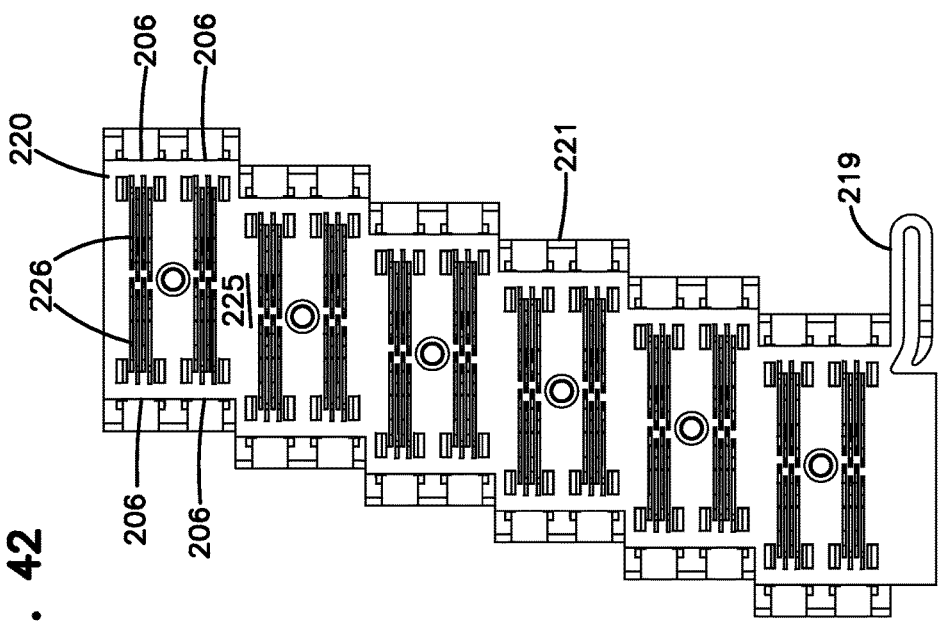
Figure 44:
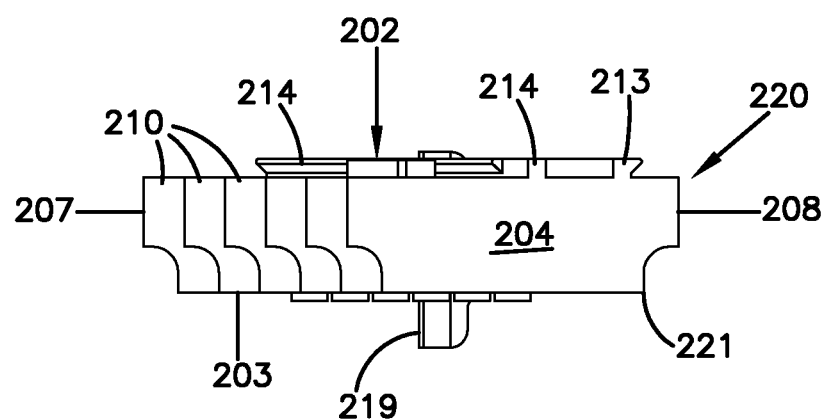
Figure 45:
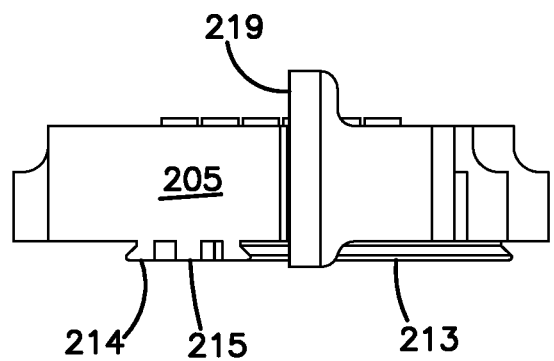
Figure 46:
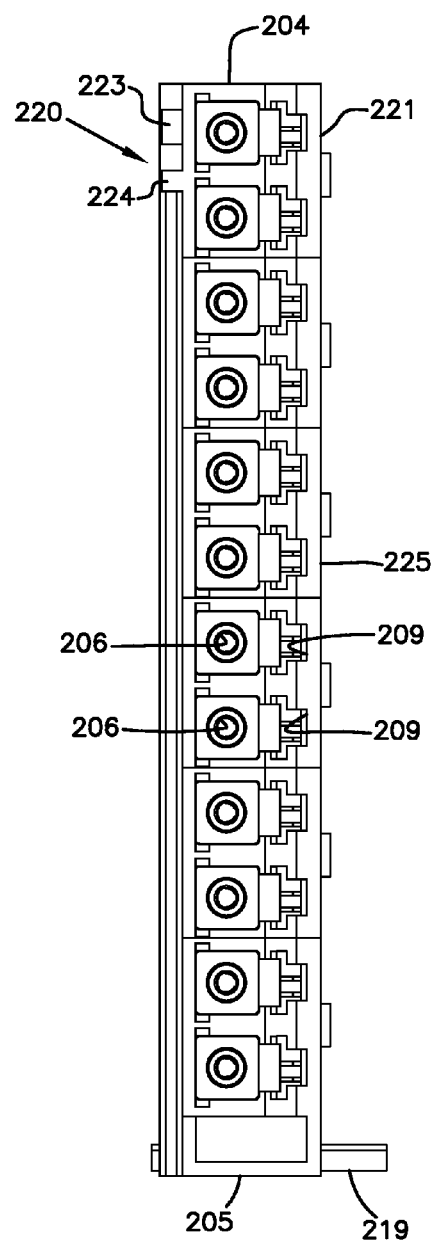
Figure 47:
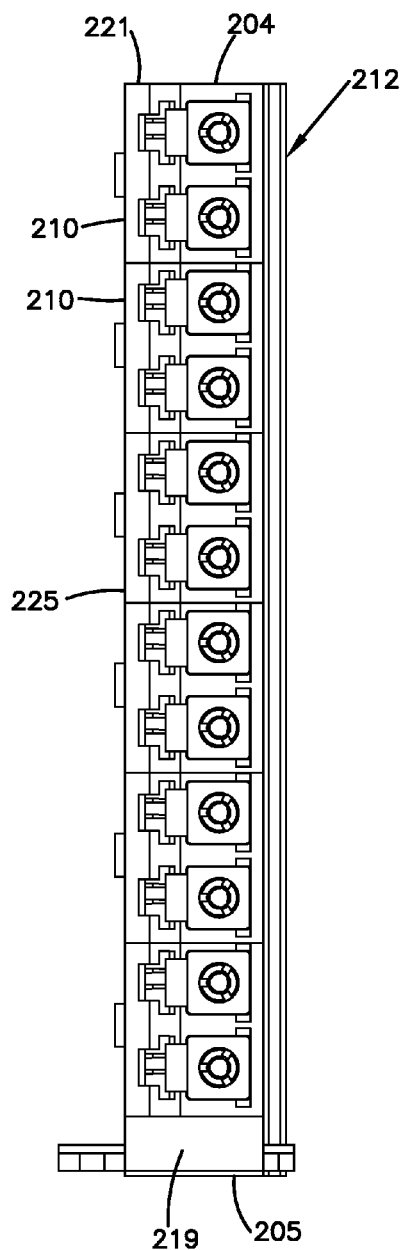
Figure 48:
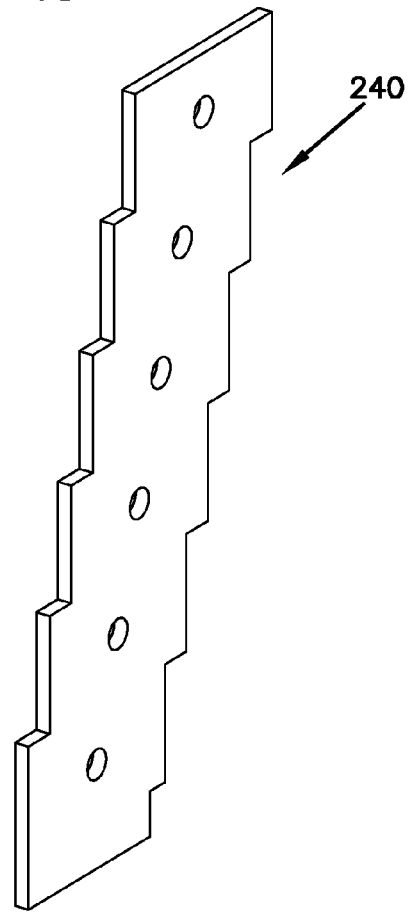
FIGS. 48 and 49 show one example circuit board suitable for use with the second example adapter module of FIG. 31.
Figure 49:
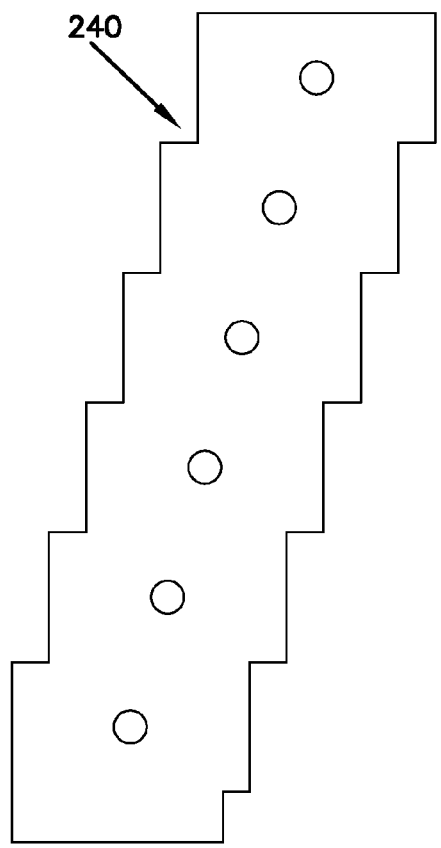
Figure 51:
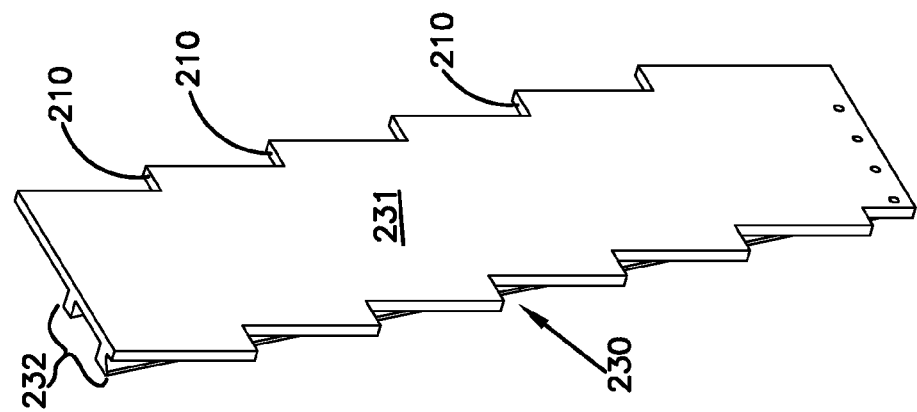
FIGS. 50-55 show one example cover suitable for use with the second example adapter module of FIG. 31.
Figure 50:
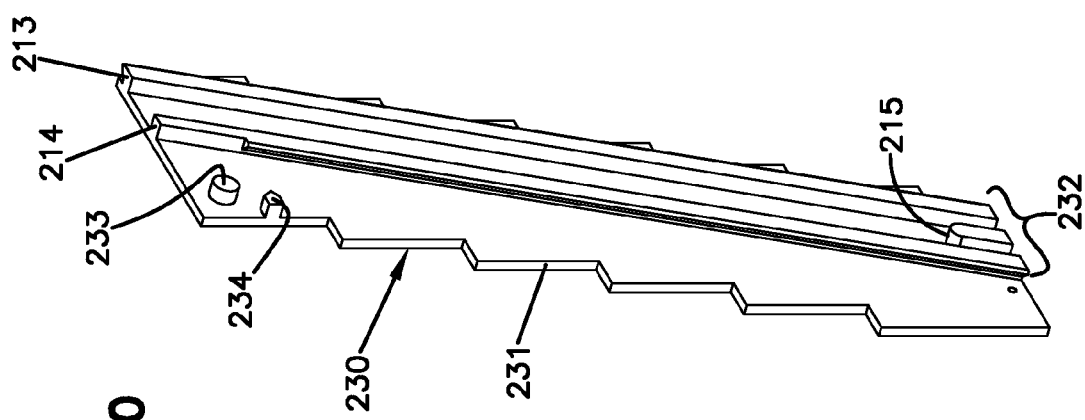
Figure 53:
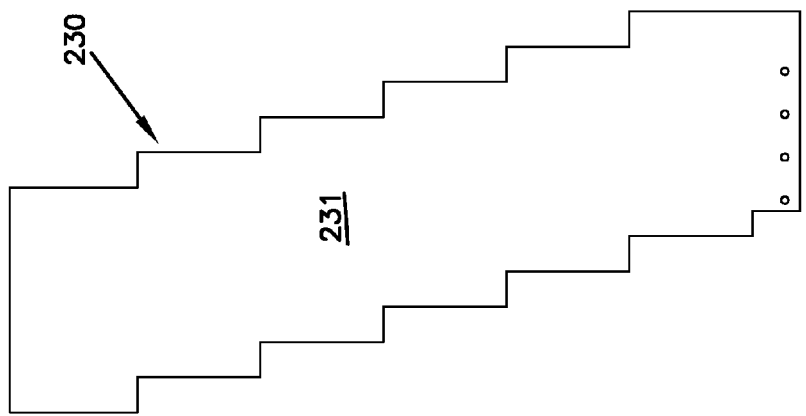
Figure 52:
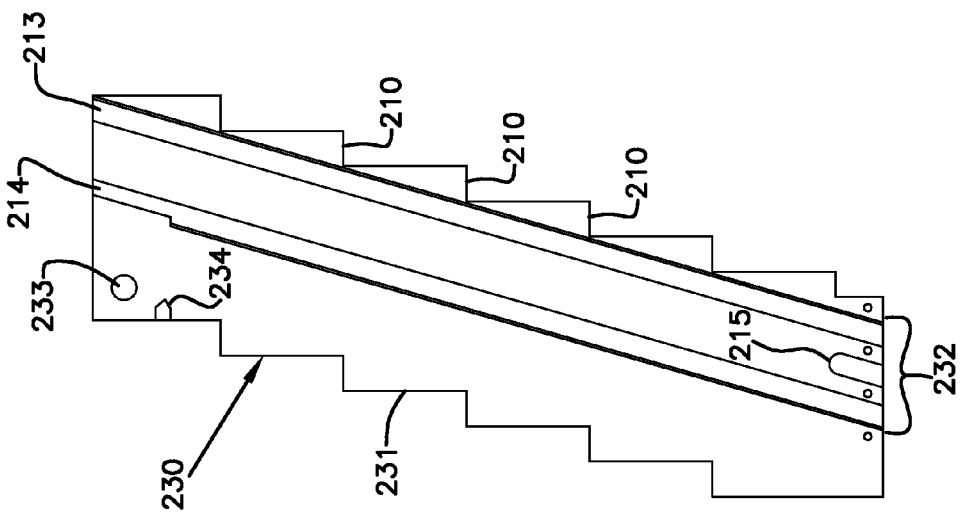
Figure 54:
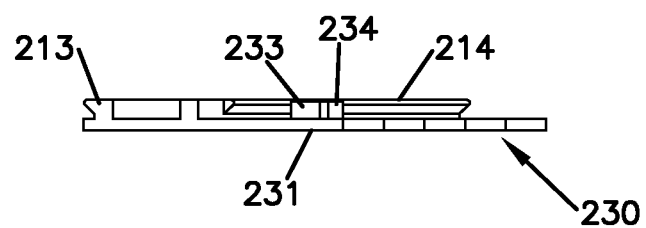
Figure 55:
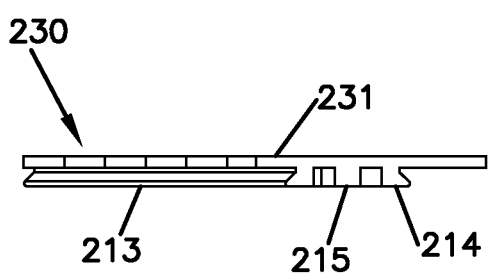

As shown in FIG. 33, the module housing 201 of the adapter module 200 may be formed from two or more separate pieces to accommodate the media reading interfaces. In some implementations, the module housing 201 includes an adapter block 220 and a separately formed cover 230. The cover 230 secures to the adapter block 220 (e.g., via fasteners, latches, pegs, etc.) to form the module housing 201. When secured together, the adapter block 220 defines the first side 202 of the module housing 201 and the cover 230 defines the second side 203. Accordingly, the adapter block 220 defines a first set 222 of guide rails 212, a first rotation pin 223, and a first stop edge 224. The cover 230 defines a second set 232 of guide rails 212, a second rotation pin 233, and a second stop edge 234.

In some implementations, the adapter block 220 defines the passages 206 and holds the ferrule alignment devices (e.g., split sleeves). The adapter block 220 also forms the locking tab 219. In other implementations, the adapter block 220 and cover 230 may each define channels that cooperate to define the passages 206 and/or the locking tab 219. In certain implementations, the connector latching notches 209 formed at the adapter ports are positioned adjacent the cover 230. Accordingly, the thickness of the cover 230 provides space to facilitate grasping the latching arms of connectors 130 received at the adapter ports.

Figure 58:
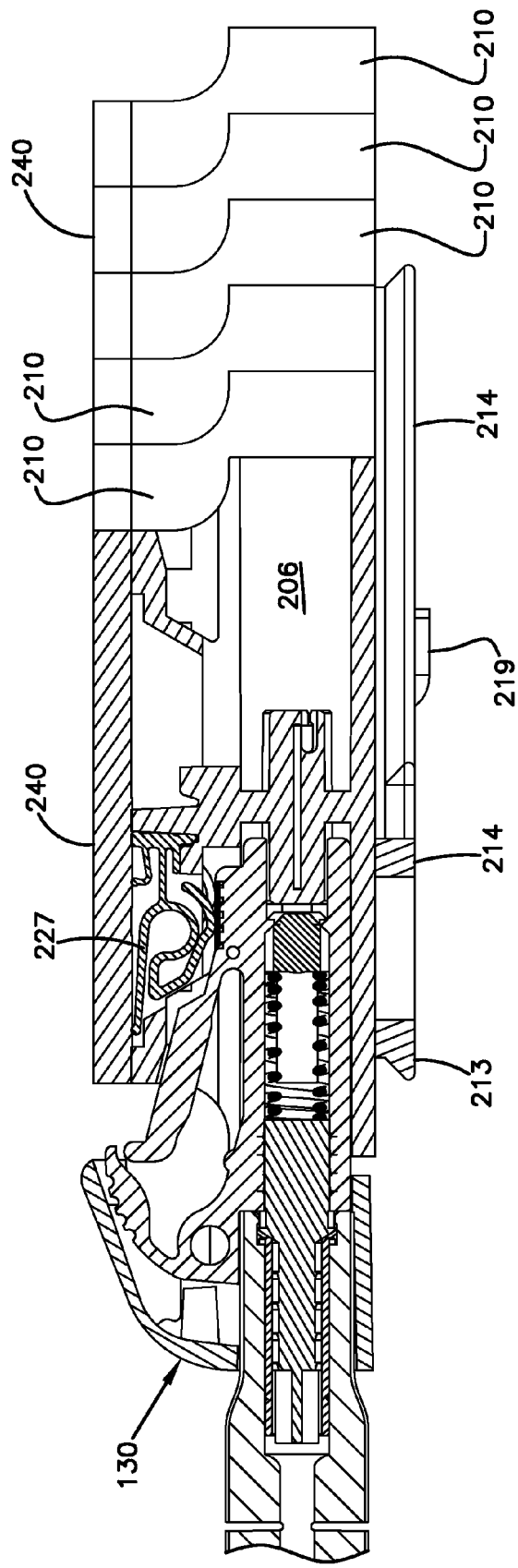
FIG. 58 is a cross-sectional view of the second adapter module of FIGS. 31-39 showing an LC-type fiber optic connector engaging a contact member of a media reading interface of the second example adapter module in accordance with aspects of the disclosure.

One or more media reading interfaces may be positioned in the adapter block 220. In certain implementations, one or more slots 226 may be defined in an exterior surface 225 of the adapter block 220 to provide access to the media reading interfaces. Certain types of media reading interfaces include one or more contact members 227 that are positioned in the slots 226. As shown in FIG. 58, a portion of each contact member 227 extends into a respective one of the passages 206 to engage memory contacts on a fiber optic connector 130. Another portion of each contact member 227 also extends out of the slot 226 to contact a circuit board 240.

In some implementations, the circuit board 240 is held between the termination block 220 and the cover 230. For example, fasteners may extend through the cover 230, through the circuit board 240, and into the termination block 220 to secure the pieces together. In other implementations, the circuit board 240 may be molded integrally formed with the cover 230, which is then secured to the termination block 220. In the example shown, the circuit board 240 has a body having the same stepped-configuration as the adapter block 220 and cover 230. In other implementations, the circuit board 240 may be smaller than the adapter block 220 and cover 230. In still other implementations, multiple circuit boards 240 may be held between the termination block 220 and cover 230.

Non-limiting examples of media reading interface contact members and a description of how such contact members obtain physical layer information from fiber optic connectors can be found in U.S. application Ser. No. 13/025,841, which is incorporated by reference above.

Figure 56:
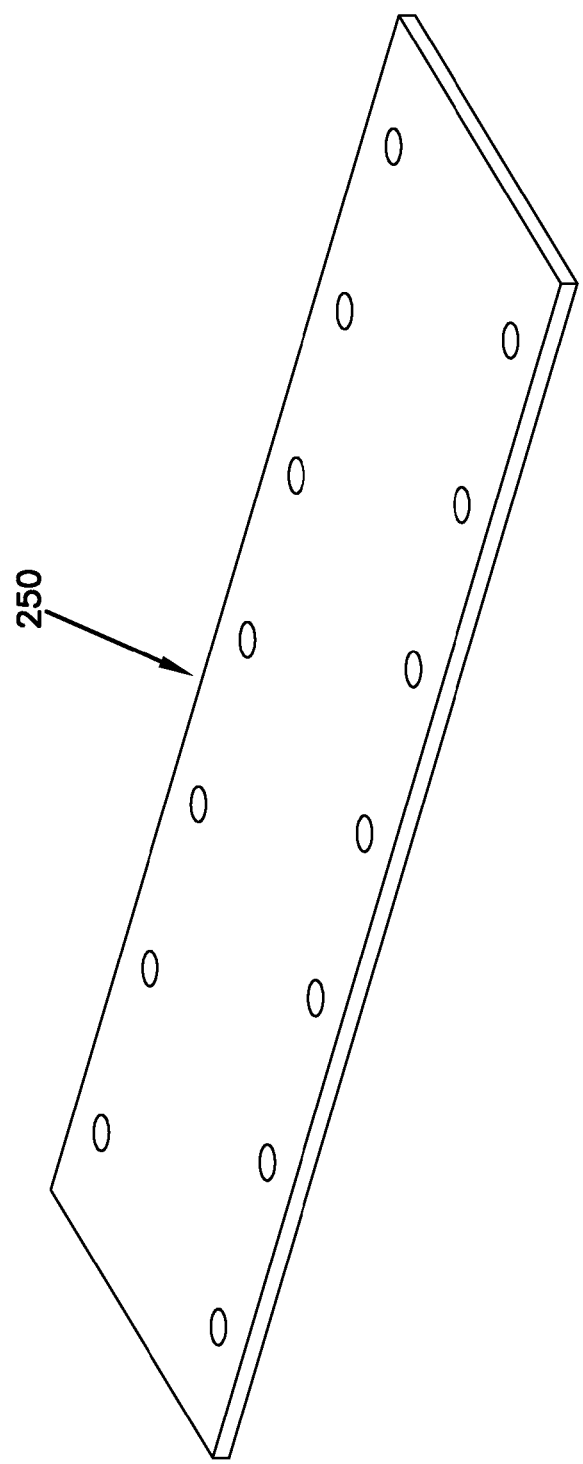
FIG. 56 shows one example circuit board suitable for use as a master circuit board in a termination arrangement in accordance with the principles of the present disclosure.

In some implementations, the walls 140 may define conductive paths that are configured to connect the media reading interfaces of the adapter modules 200 with a master circuit board 250 (FIG. 56). The master circuit board 250 may include or connect (e.g., over a network) to a processing unit that is configured to manage physical layer information obtained by the media reading interfaces. In some implementations, the master circuit board 250 may extend between two or more walls 140. For example, as shown in FIG. 3, the master circuit board 250 may extend across a bottom of each wall 140 in a termination arrangement 110.

In some implementations, the conductive paths may run along one or both exterior side surfaces of the walls 140 between the top and bottom of the walls 140. The conductive paths are located so that a media reading interface for each passage 206 of the adapter module 200 intersects at least one of the conductive paths. Certain types of walls 140 include at least three conductive paths (e.g., one for power, one for ground, and one for data). Certain types of walls 140 include at least four conductive paths. Certain types of walls 140 include a conductive path for each contact member 227 of each media reading interface of the adapter module 200.

Other types of walls 140 include a conductive path for each contact member 227 within a single media reading interface. For example, in some implementations, a first contact member of each media reading interface of an adapter module 200 may connect to a first conductive path; a second contact member of each media reading interface of the adapter module 200 may connect to a second conductive path; and a third contact member of each media reading interface of the adapter module 200 may connect to a third conductive path. Communication between the contact members 227 and the master circuit board 250 may occur in a serial bus configuration (e.g., a CAN bus). In some such implementations, the media reading interfaces of an adapter module 200 remain connected to the master circuit board 250 while the adapter module 200 is moved between the non-extended and extended positions.

FIGS. 59-76 show another example implementation of a high-density distribution rack 300 configured to hold one or more high-density fiber termination blocks 330 having features that are examples of inventive aspects in accordance with the principles of the present disclosure. The rack 300 has a front 301, a rear 302, a first side 303, and a second side 304 extending between a bottom 305 and a top 306. The rack 300 includes one or more vertical support bars 398 extending between one or more horizontal strength bars (see FIG. 75).

Figure 60:
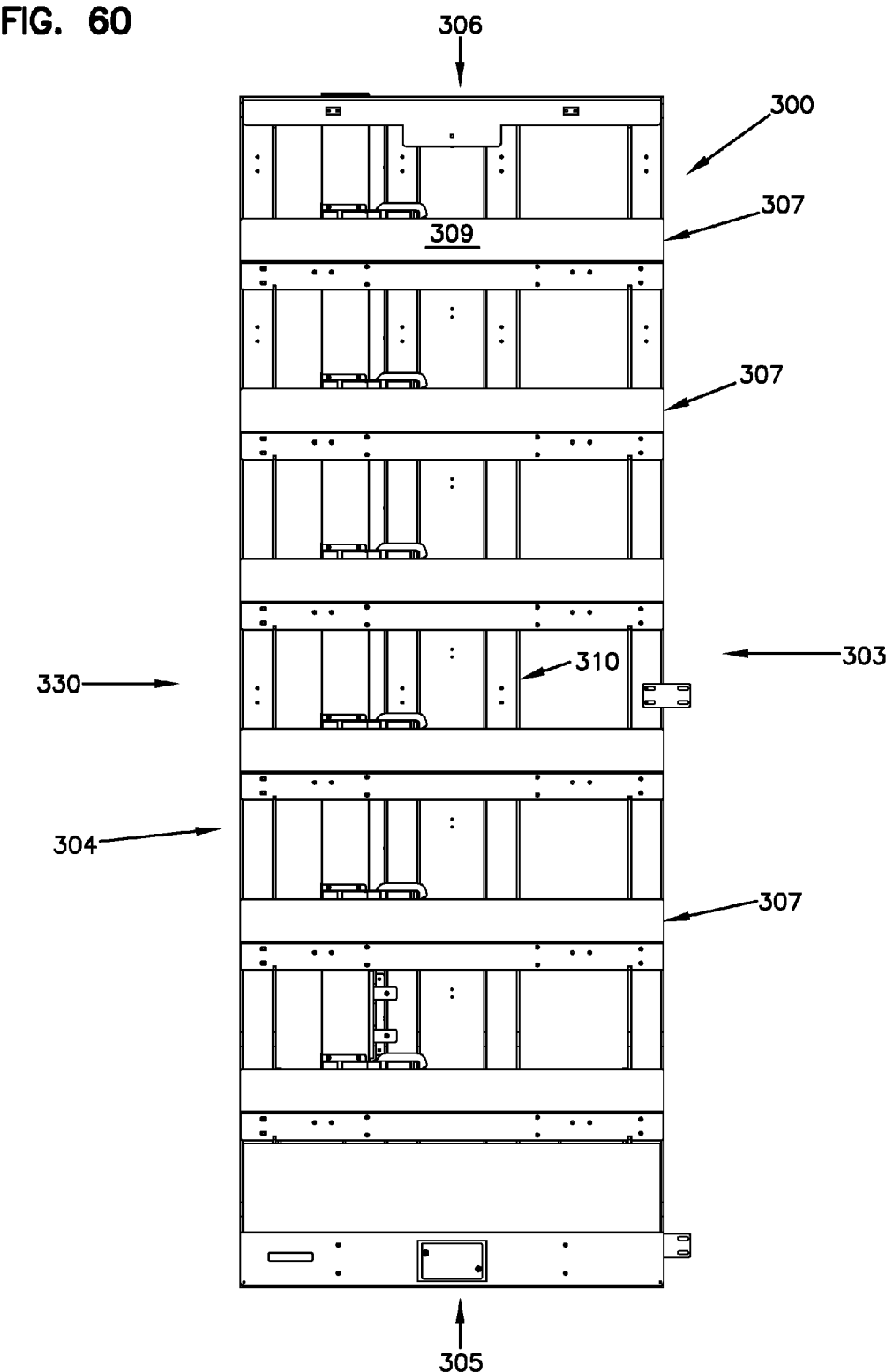
FIG. 60 is a rear elevational view of the example rack of FIG. 59.
Figure 61:
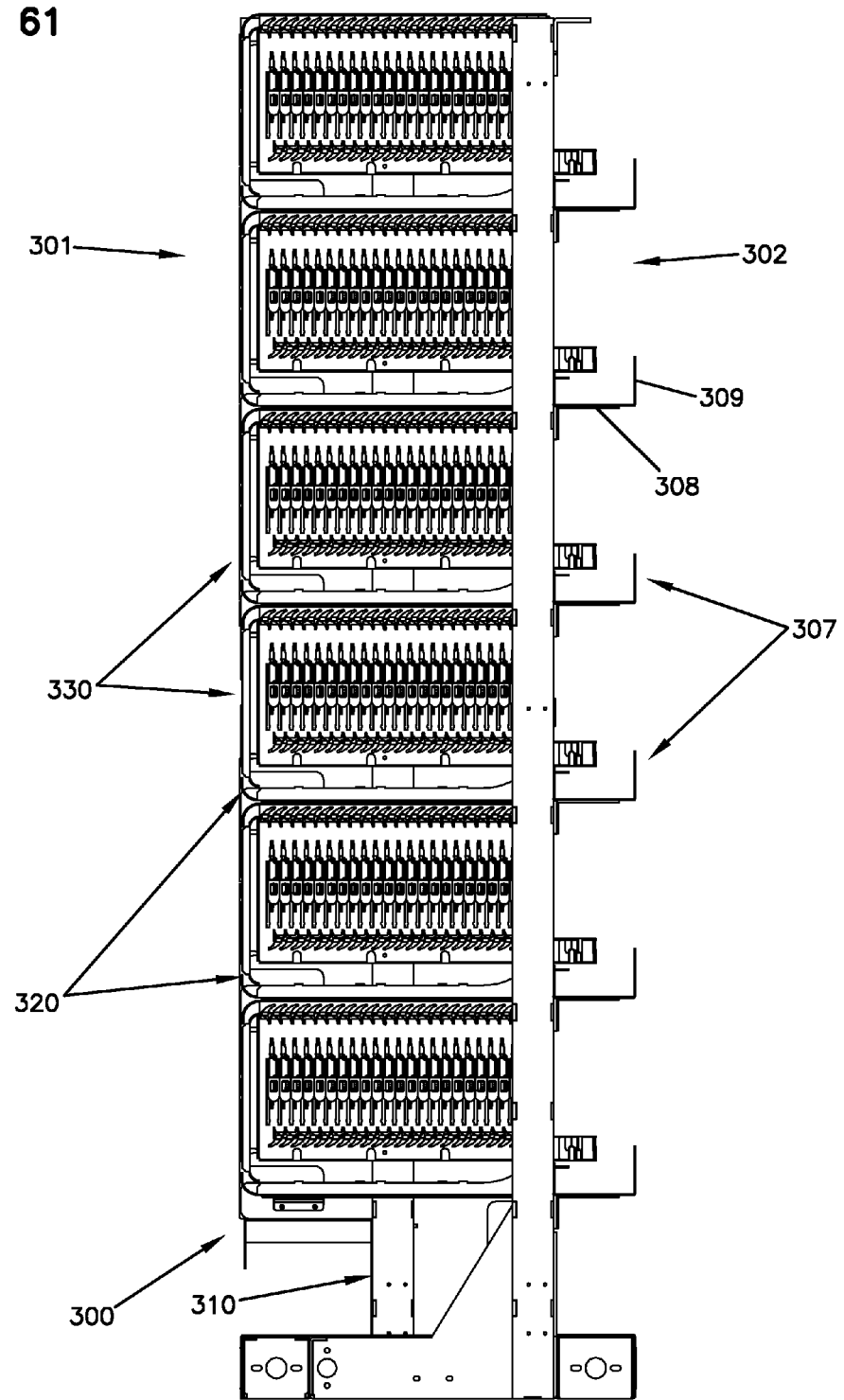
FIG. 61 is a side elevational view of the example rack of FIG. 59.
Figure 62:
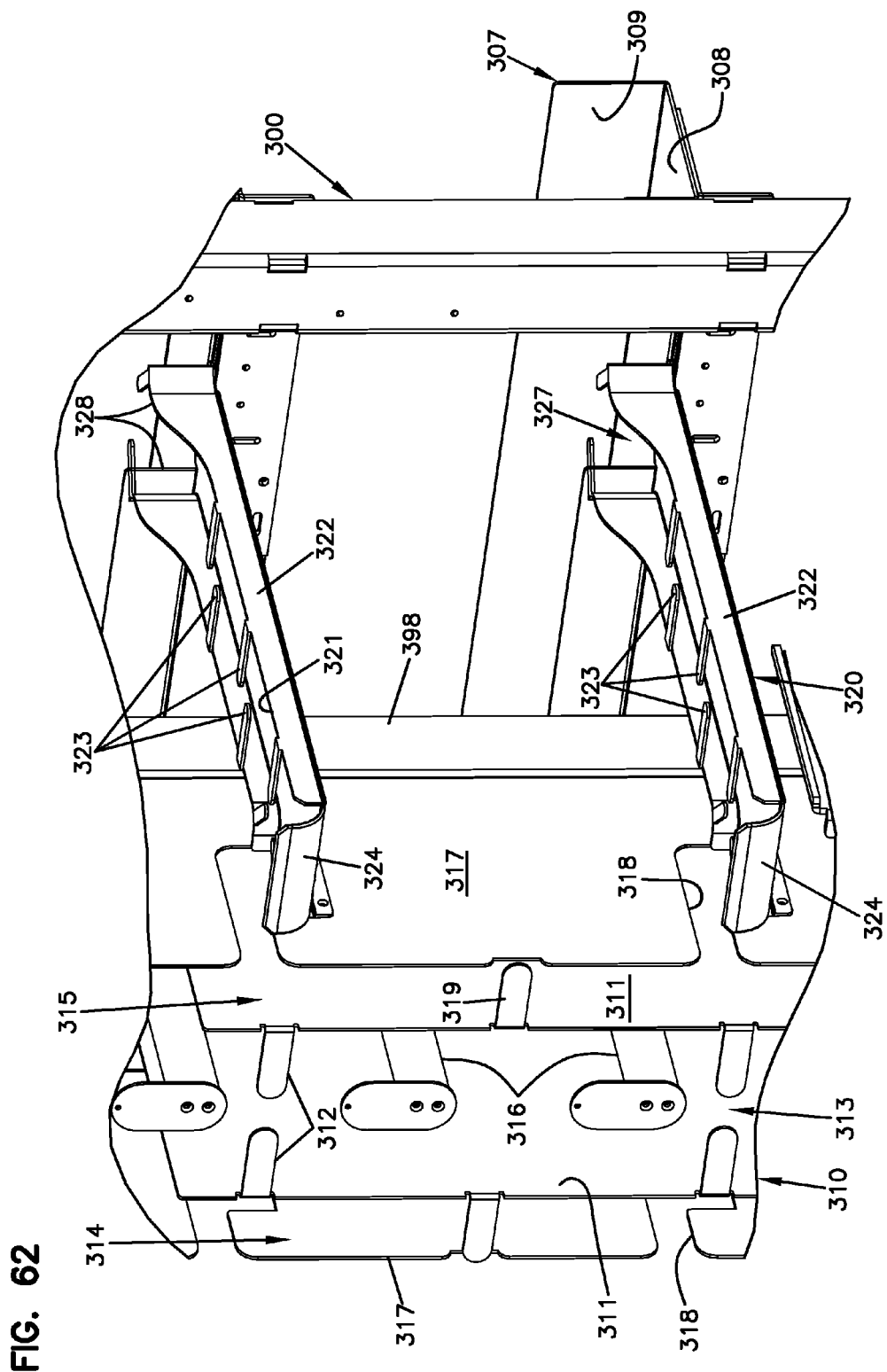
FIG. 62 is a front, side perspective view of a section of the rack of FIG. 59 with the termination blocks removed for ease in view of the guide troughs.
Figure 63:
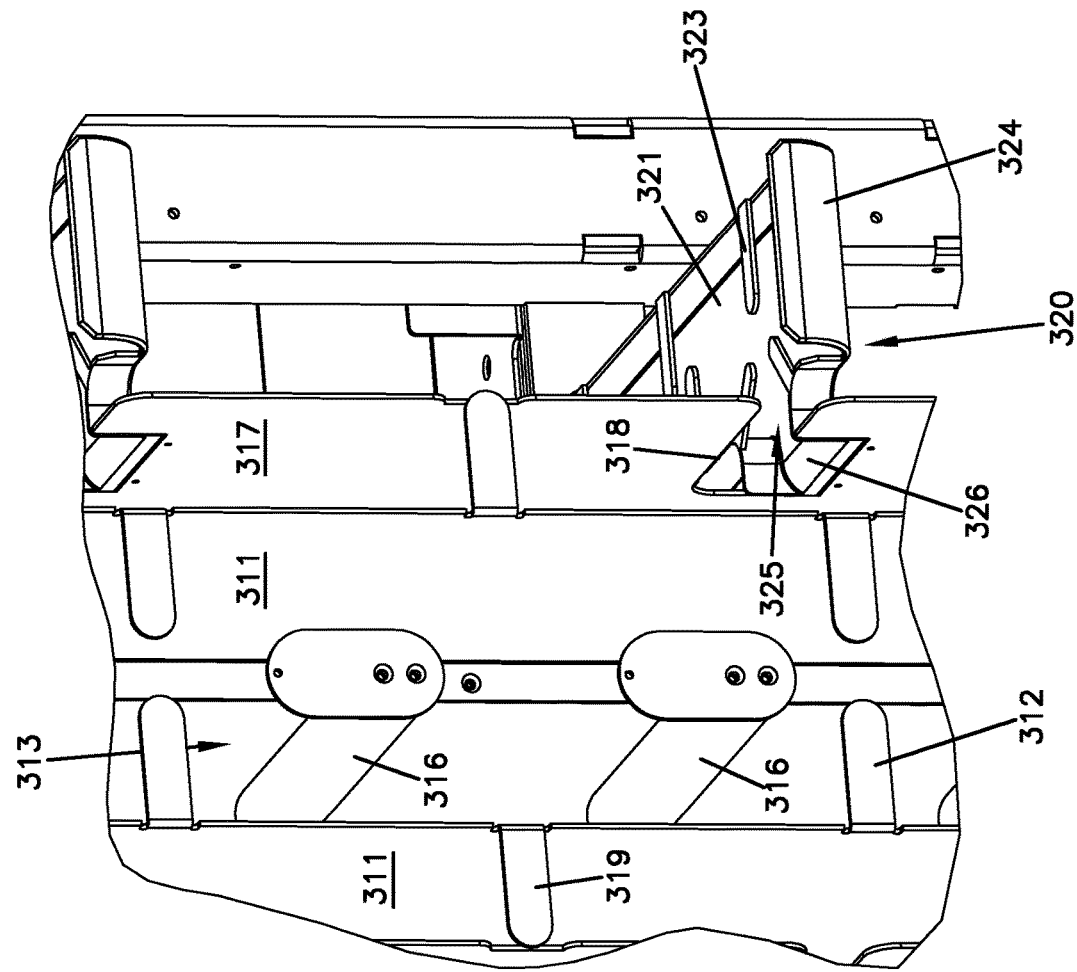
FIG. 63 is a front perspective view of the rack section shown in FIG. 62.
Figure 64:
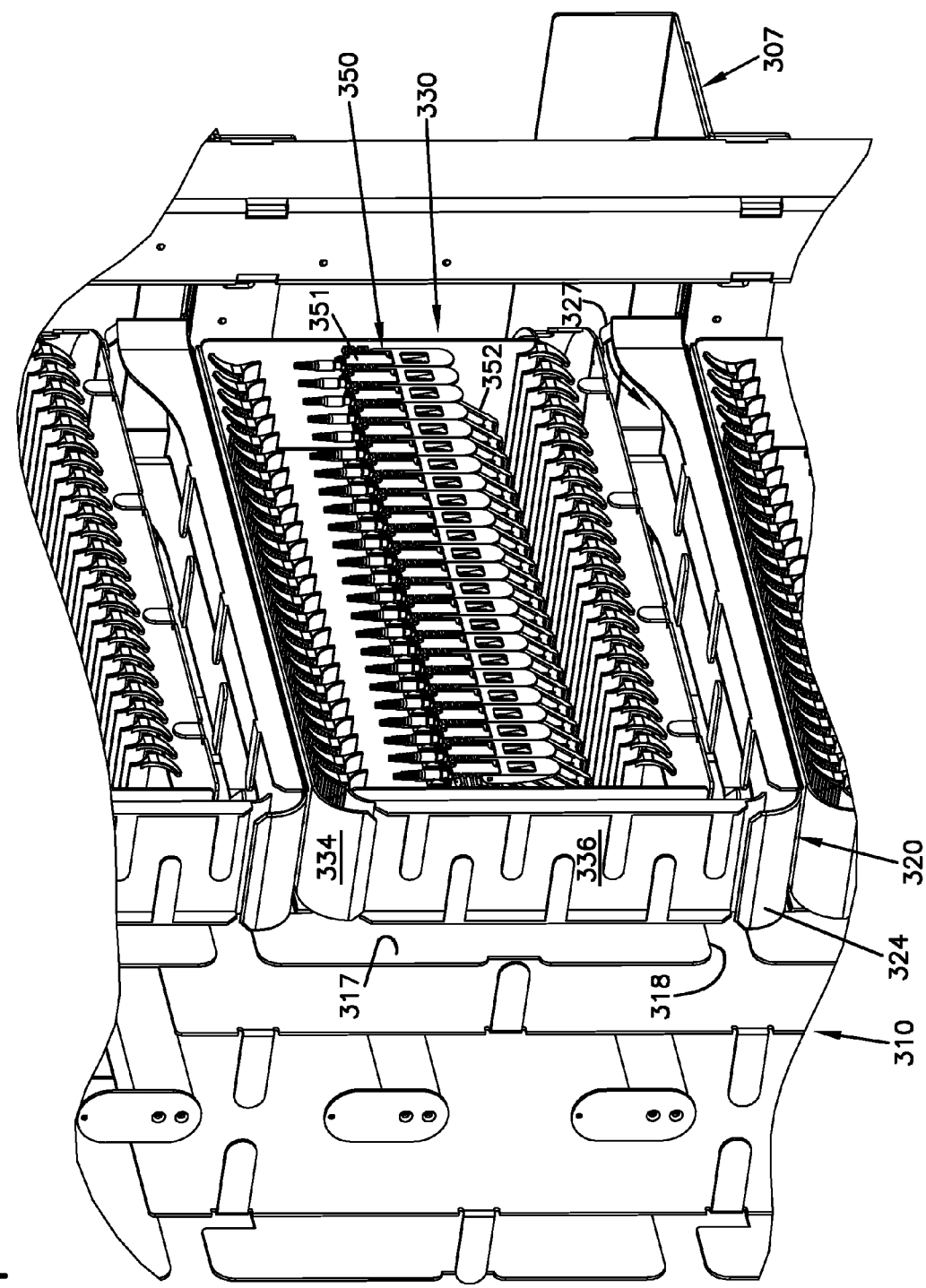
FIG. 64 is a front, side perspective view of a section of the rack of FIG. 59 including termination blocks.
Figure 65:
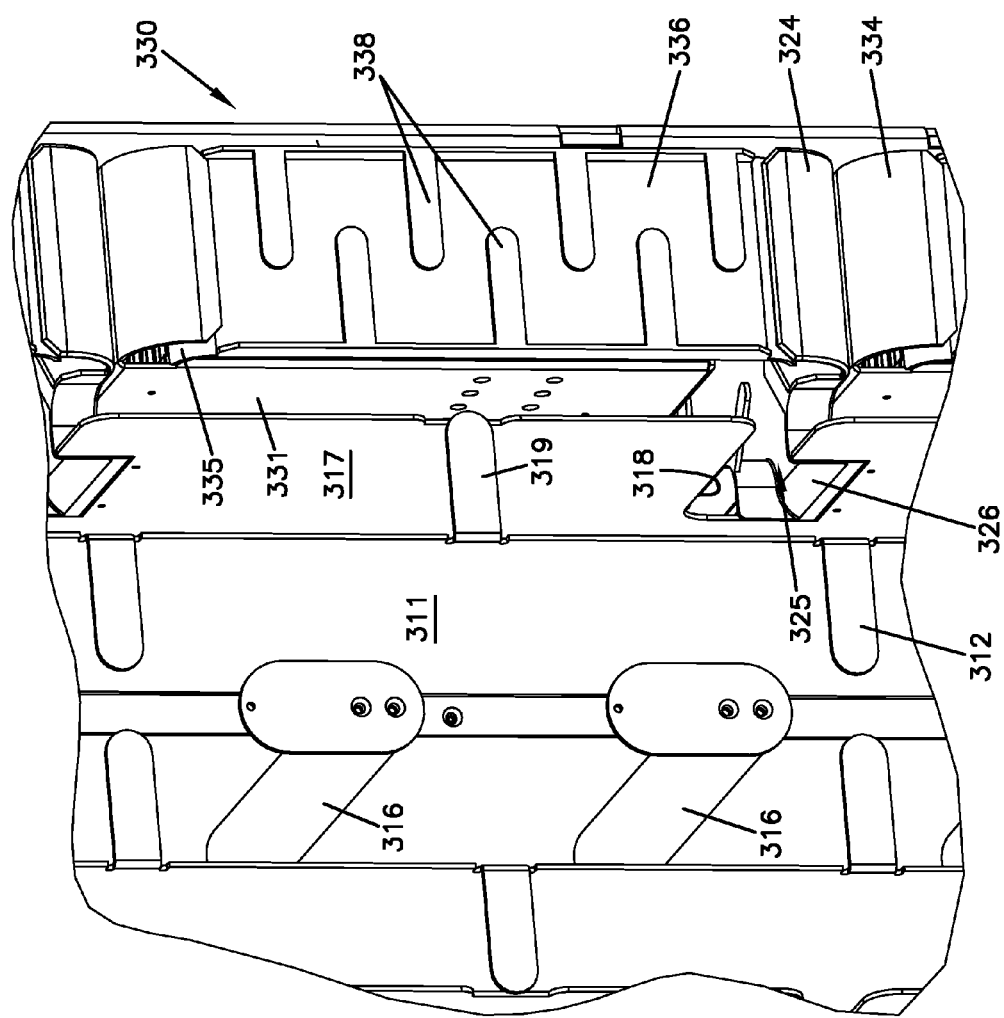
FIG. 65 is a front perspective view of the rack section of FIG. 65.

One or more horizontal troughs 307 extend across the rear 302 of the rack 300 between the first side 303 and the second side 304 (FIG. 60). Each of the horizontal troughs 307 is spaced from the other troughs 307. Each trough 307 includes a horizontally extending shelf 308 that extends rearwardly from the rear 302 of the rack 300 (FIG. 61). Each trough 307 also includes a lip 309 that is sized and configured to retain cables on the shelf 308. In the example shown, the lip 309 extends generally orthogonal to the shelf 308. In the example shown, the rack 300 includes six troughs 307. In other implementations, however, the rack 300 may include any desired number of troughs 307.

A cable storage arrangement 310 extends along the front 301 of the rack 300. In certain implementations, the cable storage arrangement 310 is disposed at a central portion of the front 301 of the rack 300. The storage arrangement 310 includes inner channel members 311 that define at least one cable storage and routing channel extending between the bottom 305 and the top 306 of the rack 300 at the front of the rack 300. In the example shown, two channel members 311 are spaced apart to define a central storage and routing channel 313, a left storage and routing channel 314, and a right storage and routing channel 315. Inner retention fingers 312 extend inwardly from the inner channel members 311.

One or more cable spools 316 are disposed in a central one of the cable routing channels 307. Twelve cable spools 316 are shown disposed in the channel 307 in the implementation of FIG. 59. In other implementations, however, a greater or lesser number of spools 316 may be disposed in the channel 307. Outer retention fingers 319 extend outwardly from the channel members 311 across the left and right channels 314, 315. Each of the left and right channels 314, 315, respectively, is bounded by outer channel members 317. Each of the outer channel members 317 defines a slot or opening 318 therethrough that provides access to the outer channels 314, 315 from respective sides 303, 304 of the rack 300.

At least one of the sides 303, 304 of the rack 300 is constructed and adapted to hold one or more high-density fiber termination blocks 330 having features that are examples of inventive aspects in accordance with the principles of the present disclosure. In certain implementations, the termination blocks 330 may be installed at block mounting locations at both sides 303, 304 of the rack 300. In certain implementations, the termination blocks 330 attach to the vertical support racks 398 (see FIGS. 75 and 76). In the example shown in FIG. 61, six termination blocks 330 may be mounted to each side 303, 304 of the rack 300. In other implementations, however, a greater or lesser number of termination blocks 330 may be installed to each side 303, 304 of the rack 300.

A guide trough 320 is disposed on the rack 300 for each termination block 330. The guide troughs 320 extend generally between the front 301 and rear 302 of the rack 300. Each guide trough 320 includes a generally planar base 321 extending horizontally between the cable storage arrangement 310 and one of the horizontal troughs 307. Side walls 322 extend upwardly from the base 321 of the guide trough 320 to retain fibers or cables routed therethrough in the guide trough 320. In certain implementations, retention fingers 323 extend inwardly from the side walls 322.

A first port 325 of the guide trough 320 is located at one of the slots 318 extending through one of the outer channel members 317. A forward radius limiter 324 curves upwardly from the base 321 at the front of the guide trough 320. Another radius limiter 326 extends between the guide trough base 321 and the slot 318 defined in the outer member 317 to form the first port 325. The radius limiter 326 facilitates transitioning the fibers or cables from the guide trough 320 to a respective outer storage and routing channel 314, 315. A second port 327 of the guide trough 320 is provided at the respective horizontal trough 307. Additional radius limiters 328 are provided at the second port 327 to facilitate transitioning the fibers or cables onto the respective horizontal trough 307.

The termination blocks 330 and guide troughs 320 are disposed in a pairs on the rack 300. In some implementations, each pair is disposed close to upper and/or lower adjacent pairs so that the termination blocks 330 and guide troughs 320 form a compact, stacked formation. For example, in some implementations, the top of one termination block 330 is located immediately below a bottom of an adjacent trough 320.

FIGS. 66-70 show one example high density termination block 330 suitable for mounting at a side 303, 304 of the rack 300. The termination block 330 includes a main panel 331 from which a rear panel 332, a top panel 333, a front panel 340, and a bottom panel 341 extend outwardly to define an interior of the block 330. In some implementations, the main panel 331, rear panel 332, top panel 333, front panel 340, and bottom panel 341 are integrally formed. In other implementations, these panels 331, 332, 333, 340, 341 are formed separately and attached together (e.g., screwed, riveted, welded, etc.).

Figure 66:
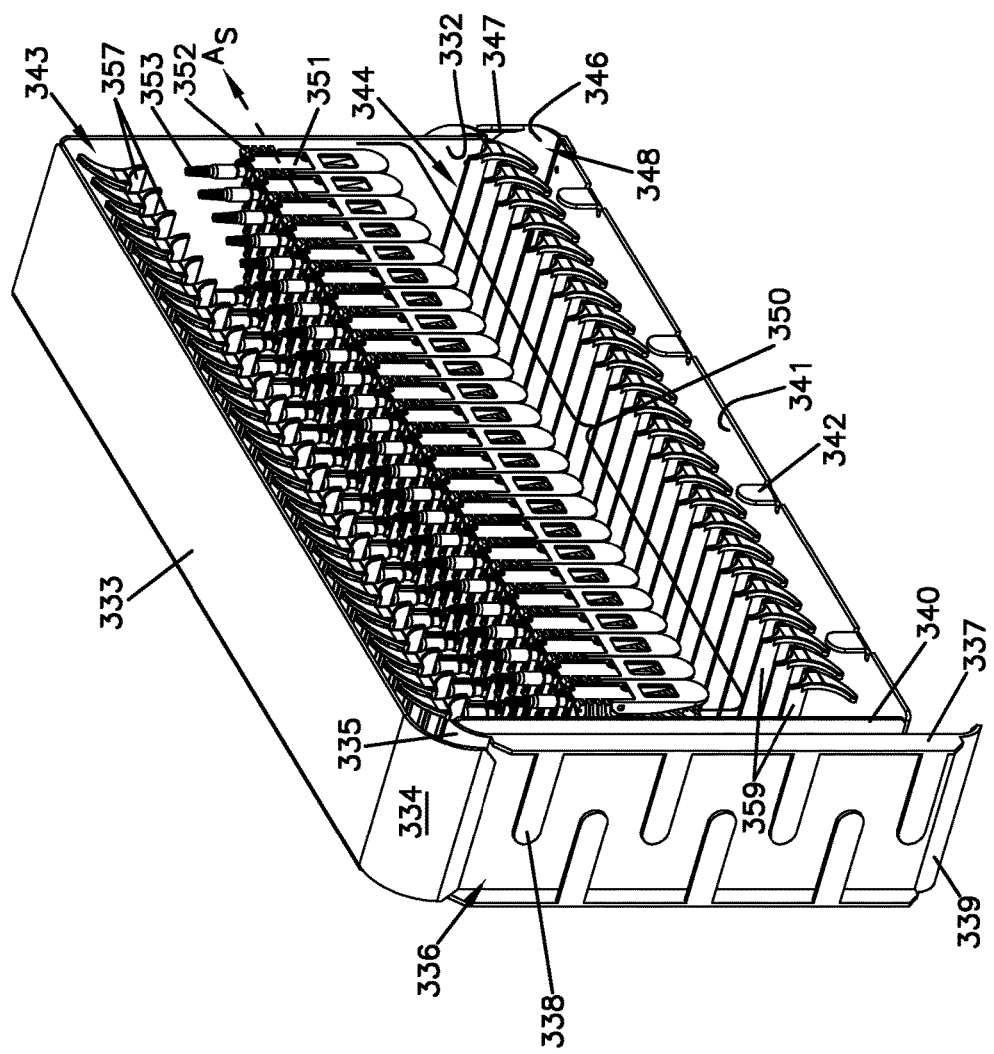
FIG. 66 is a front, side perspective view of an example termination block having features that are examples of inventive aspects of the present disclosure.
Figure 67:
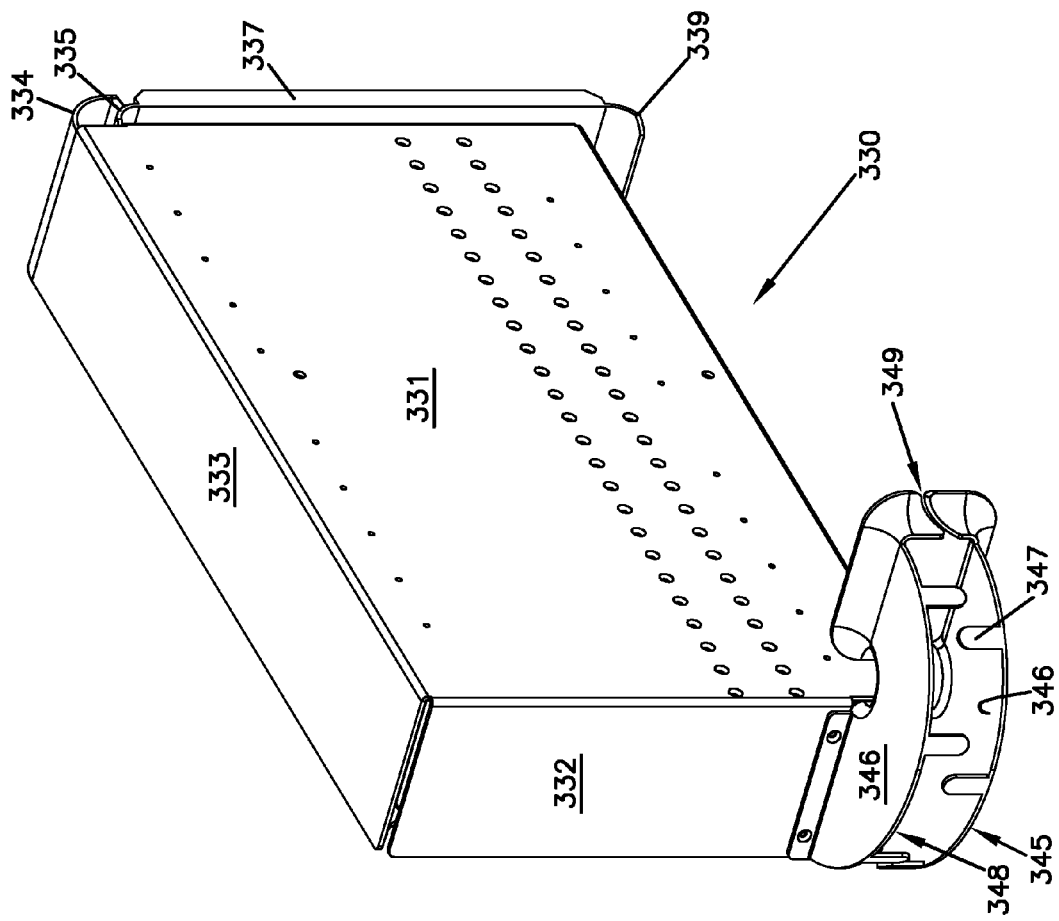
FIG. 67 is a rear, side perspective view of the termination block of FIG. 66.

A front routing trough 336 is coupled to the front panel 340 via a radius limiter 335 (see FIG. 66). The routing trough 336 includes side walls 337 from which one or more retention fingers 338 extend inwardly. The routing trough 336 forms a bottom radius limiter 339 the curves downwardly and rearwardly from the trough 336. A forward radius limiter 334 extends forwardly of the top panel 333 and over the radius limiter 335 to define an entrance 356 (see FIG. 68) into the interior of the block 330. The entrance 356 extends upwardly along the front routing trough 336, between the radius limiters 334, 335, and into a top portion of the block interior.

Figure 68:
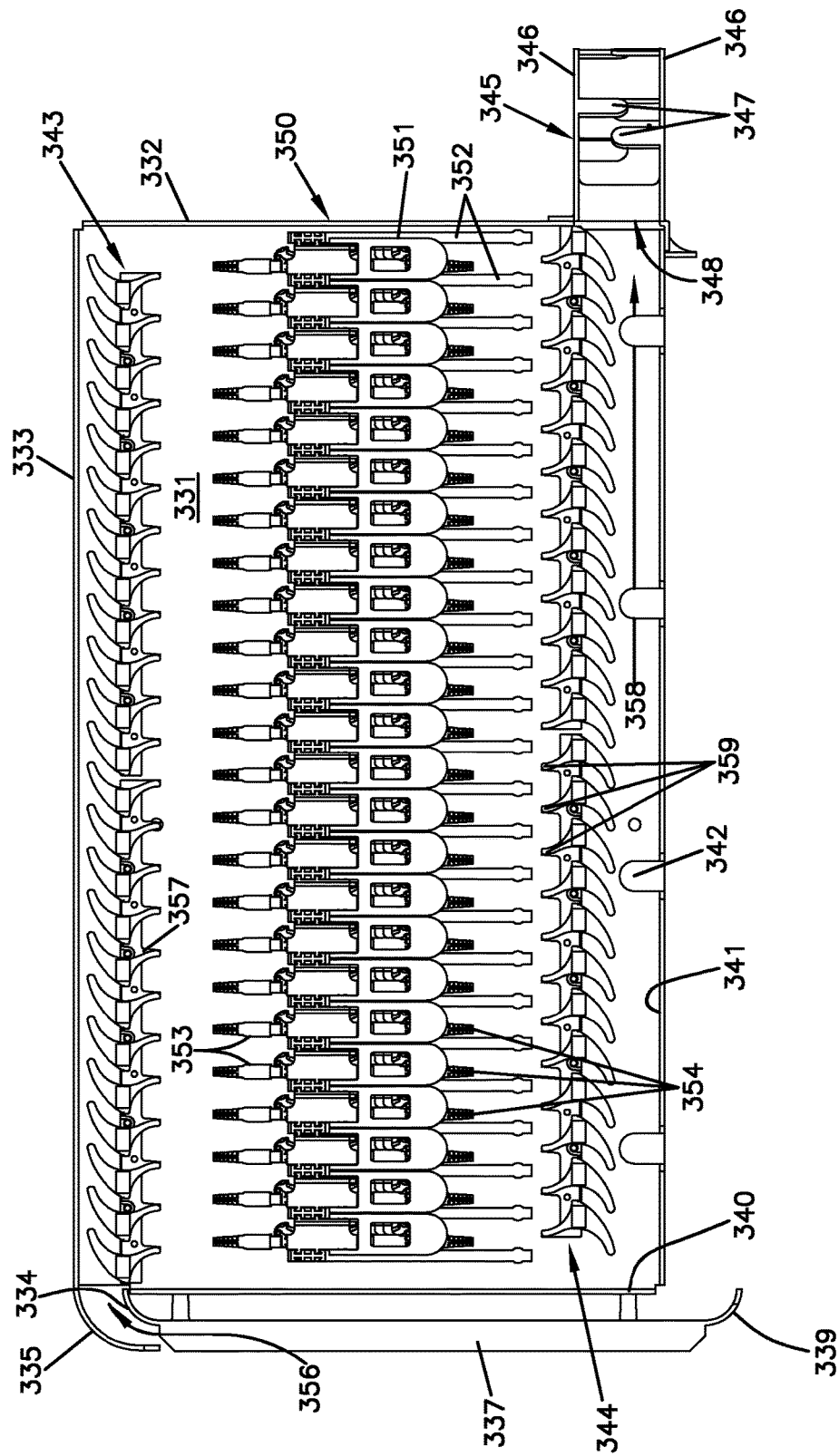
FIG. 68 is a side elevational view of the termination block of FIG. 66.
Figure 70:
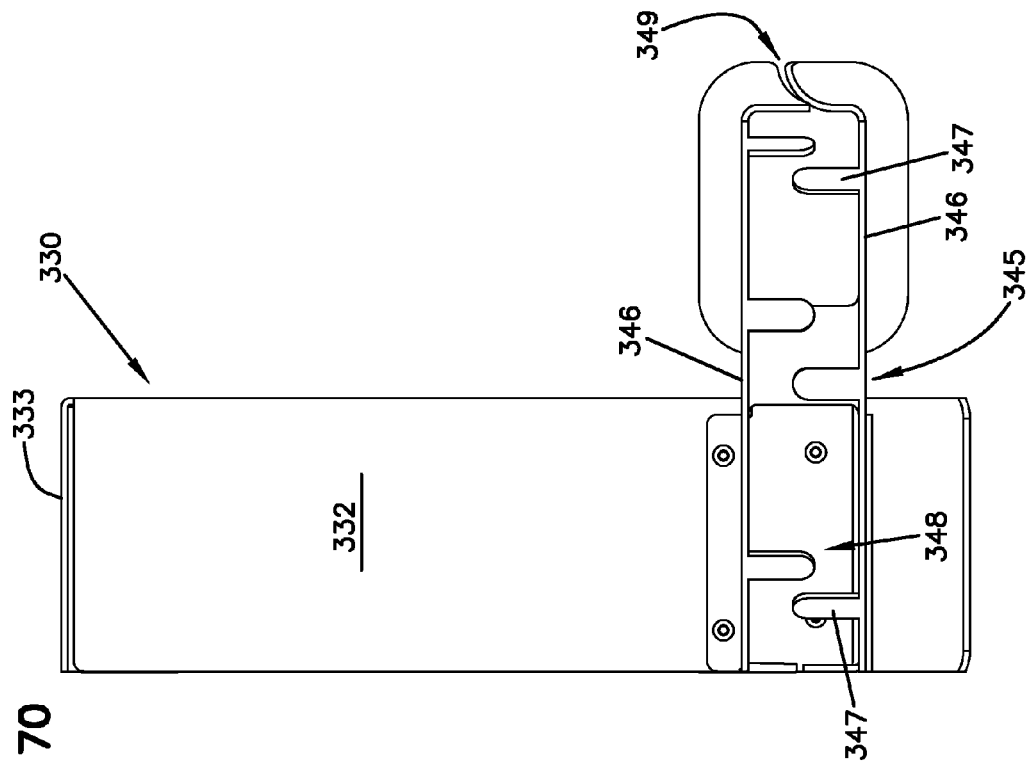
FIG. 70 is a rear elevational view of the termination block of FIG. 66.
Figure 69:
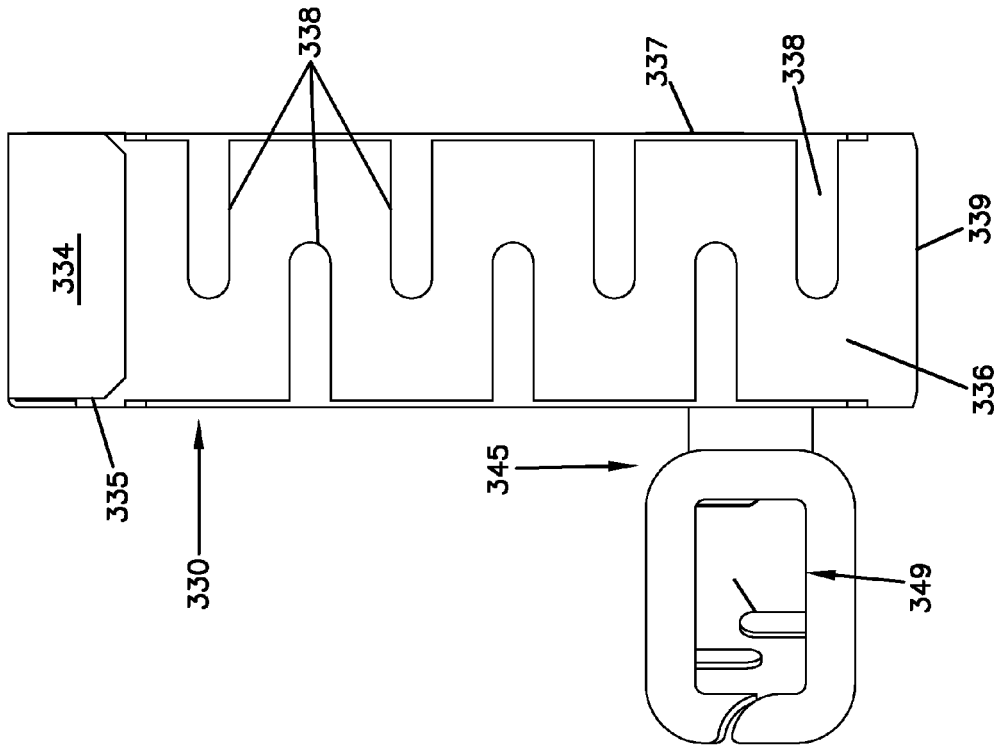
FIG. 69 is a front elevational view of the termination block of FIG. 66.

A bottom of the rear panel 332 is spaced from the bottom panel 341 of the termination block 330 to form an exit 358 from the block interior (see FIG. 68). Retention tabs 342 extend upwardly from sides of the bottom panel 341 to facilitate routing cables along a bottom portion of the block interior towards the exit 358. A curved routing guide 345 may be attached to the rear of the termination block 330 at the exit 358 (see FIG. 67). In the example shown, a portion of the routing guide 345 is attached to a bottom of the rear panel 332 and another portion of the routing guide 345 is attached to the bottom panel 341 of the block 330.

The routing guide 345 includes spaced channel members 346 from which retention tabs 347 extend (e.g., upwardly and/or downwardly) to define a curved routing channel. The curved routing guide 345 extends from a first end 348, which may be disposed at the exit 358 of the termination bock, to a second end 349. In some implementations, the first and second ends 348, 349 do not face in opposite directions. In certain implementations, the first and second ends 348, 349 of the routing guide 345 face in generally the same direction. In the example shown, the routing guide 345 is constructed and adapted so that the second end 349 is located about flush with the first end 348. In the example shown, the routing guide 345 is generally C-shaped (see FIG. 67). In other implementations, however, the routing guide 345 may be routing guide 345 may be J-shaped, U-shaped, S-shaped, or Y-shaped. In the example shown, the second end 349 of the guide 345 is trumpet-shaped.

A fiber termination arrangement 350 is disposed within the interior of the termination block 330. In certain implementations, the fiber termination arrangement 350 is coupled to the main panel 331. Each fiber termination arrangement 350 includes at least one adapter module 351 slidably mounted between two walls 352. Each sliding adapter modules 351 is configured to slide between the walls 352 along a slide axis $A_S$ between at least a non-extended position and an extended position to provide selective access to fiber optic connectors 353, 354 mounted thereat.

In certain implementations, each adapter module 351 is disposed fully within the block interior when in the non-extended position (see FIG. 66) and at least a portion of the adapter module 351 extends at least partially out of the block interior when in the extended position. In certain implementations, the connectors 353, 354 of an adapter module 351 are disposed fully outside the block interior when the adapter module 351 is in the extended position. In one implementation, each adapter module 351 is disposed fully outside of the block interior when in the extended position.

Each of the termination blocks 330 is oriented so that the slide axis $A_S$ of each adapter module 351 extends at least partially between the first and second sides 303, 304 of the rack 300. In certain implementations, the termination blocks 330 are oriented so that moving an adapter module 351 to the extended position causes the adapter module 351 to move away from the rack 300. In certain implementations, the adapter modules 351 slide at least partially in an upward-downward direction when slid along axis $A_S$.

Figure 59:
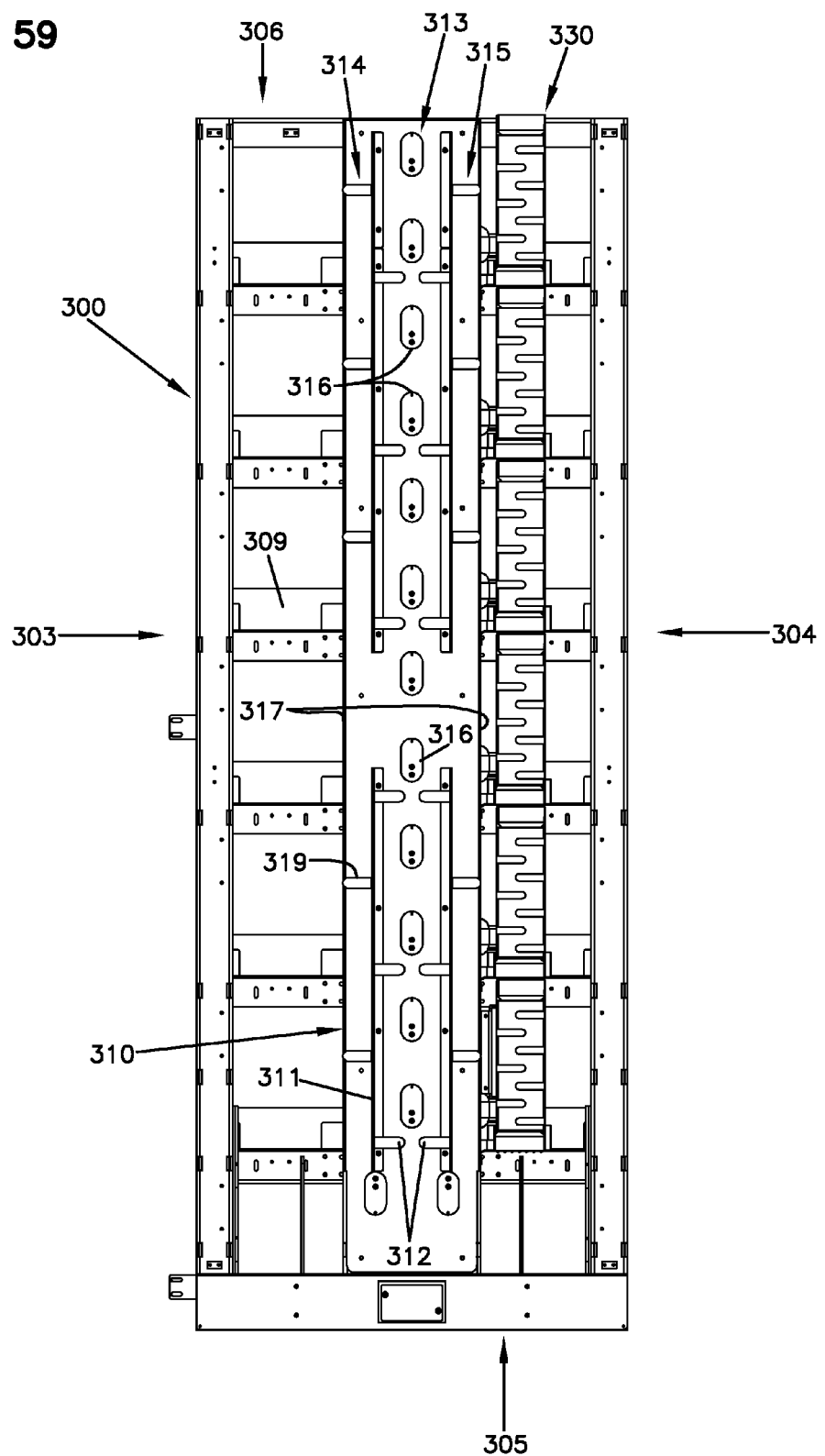
FIG. 59 is a front elevational view of an example rack on which one or more termination blocks holding termination arrangements may be mounted.

In the example shown in FIGS. 59-61, the adapter modules 351 of termination blocks 330 pull upwardly and towards the second side 304 when moved from the non-extended position to the extended position. If termination blocks were to be added to the first side 303 of the rack 300 in FIGS. 59-61, then the adapter modules 351 of first side termination blocks 330 would pull at least partially towards the first side 303 when moved from the non-extended position to the extended position. In certain implementations, the adapter modules 351 of first side termination blocks 330 would slide at least partially upwardly when moved to the extended position. In certain implementations, the termination blocks mounted to the first side 303 of the rack 300 would be mirror images of the termination blocks mounted to the second side 304 of the rack 300.

In certain implementations, the slide axis $A_S$ of each adapter module 351 extends through a longitudinal axis of the adapter module 351. For example, the slide axis $A_S$ may extend at an angle relative to the main panel 331 (e.g., see FIG. 66). In certain implementations, all of the adapter modules 351 in a termination block 330 move in the same direction when each is moved to the extended position. In other orientations, the termination blocks 330 may be disposed in any desired orientation.

In some implementations, the termination arrangement 350 is oriented so that the walls 352 extend outwardly from the main panel 331 and extend generally parallel to the front and rear panels 340, 332 of the termination block 330. The walls 352 are spaced from each other in a front-rear direction. Each of the adapter modules 351 defines a plurality of first ports facing upwardly towards the top panel 333 and a plurality of second ports facing downwardly towards the bottom panel 341. In certain implementations, the adapter modules 351 include additional optical circuitry contained in a module housing that slides with the ports. Accordingly, a first set of optical connectors 353 extend towards the top panel 333 when the connectors 353 are plugged into the first ports and a second set of optical connectors 354 extend towards the bottom panel 341 when the connectors 354 are plugged into the second ports.

A first set of guide fingers 343 is provided at the top portion of the termination block interior between the top panel 333 and the termination arrangement 350. The guide fingers 343 provide bend radius limiting surface 357 that curve downwardly from the entrance 356 towards the termination arrangement 350 (FIGS. 66 and 68). A second set of guide fingers 344 is provided at the bottom portion of the termination block interior between the bottom panel 341 and the termination arrangement 350. The guide fingers 344 provide bend radius limiting surface 359 that curve upwardly from the exit 358 towards the termination arrangement 350. In certain implementations, the bend radius limiting surfaces 359 of the second guide fingers 344 curve in an opposite direction from the bend radius limiting surfaces 357 of the first guide fingers 343.

In the example shown, the termination block 330 holds twenty-four adapter modules 351. In other implementations, however, the termination block 330 may hold a greater or lesser number of adapter modules 351. For example, some non-limiting example termination blocks 330 may hold two, eight, twelve, thirty-six, forty-eight, of fifty adapter modules 351. In certain implementations, a first guide finger 343 is aligned with the first ports of each adapter module 351 and a second guide finger 344 is aligned with the second ports of each adapter module 351. Accordingly, in the example shown, the termination block 330 holds twenty-four first guide fingers 343, and twenty-four second guide fingers 344. In other implementations, however, the termination block 330 may hold a greater or lesser number of guide fingers 343, 344.

The fiber termination arrangement 350 may be implemented using any of the termination arrangements disclosed herein. For example, in some implementations, the termination arrangement 350 may be implemented using the sliding adapter modules 120 and walls 140 disclosed above with reference to FIGS. 1-30. In other implementations, the termination arrangement 350 may be implemented using the sliding adapter modules 200 disclosed above with reference to FIGS. 31-39. In still other implementations, other types of sliding adapter modules and/or wall structures may be utilized.

In some implementations, the adapter modules 351 include one or more separately formed adapters mounted to a rack. In other implementations, the adapter modules 351 include blocks of integrally formed adapters. In still other implementations, the adapter modules 351 may be in the form of a cassette that includes fiber optic adapters on a first side. A multi-fiber connector or a cable extends outwardly from a second side of the cassette. Additional details pertaining to one example of such a cassette can be found in U.S. application Ser. No. 13/645,634, filed Oct. 5, 2012, entitled "FIBER OPTIC CASSETTE, SYSTEM, AND METHOD," the disclosure of which is incorporated herein by reference in its entirety.

In certain implementations, the sliding adapter modules 351 may be configured to collect physical layer information from one or more of the fiber optic connectors 353, 354 received thereat. For example, the adapter modules 351 may include media reading interfaces as disclosed above. The walls 352 of the termination arrangement 350 may define conductive paths that are configured to connect the media reading interfaces of the adapter modules 351 with a circuit board (e.g., see master circuit board 250 of FIG. 3). One or more electrical cables may be routed along the rack 300 to the circuit board 250. For example, the circuit board may be mounted to the main panel 331 and the electrical cables may be plugged into a socket disposed at the termination block 330 and connected to the circuit board.

Figure 71:
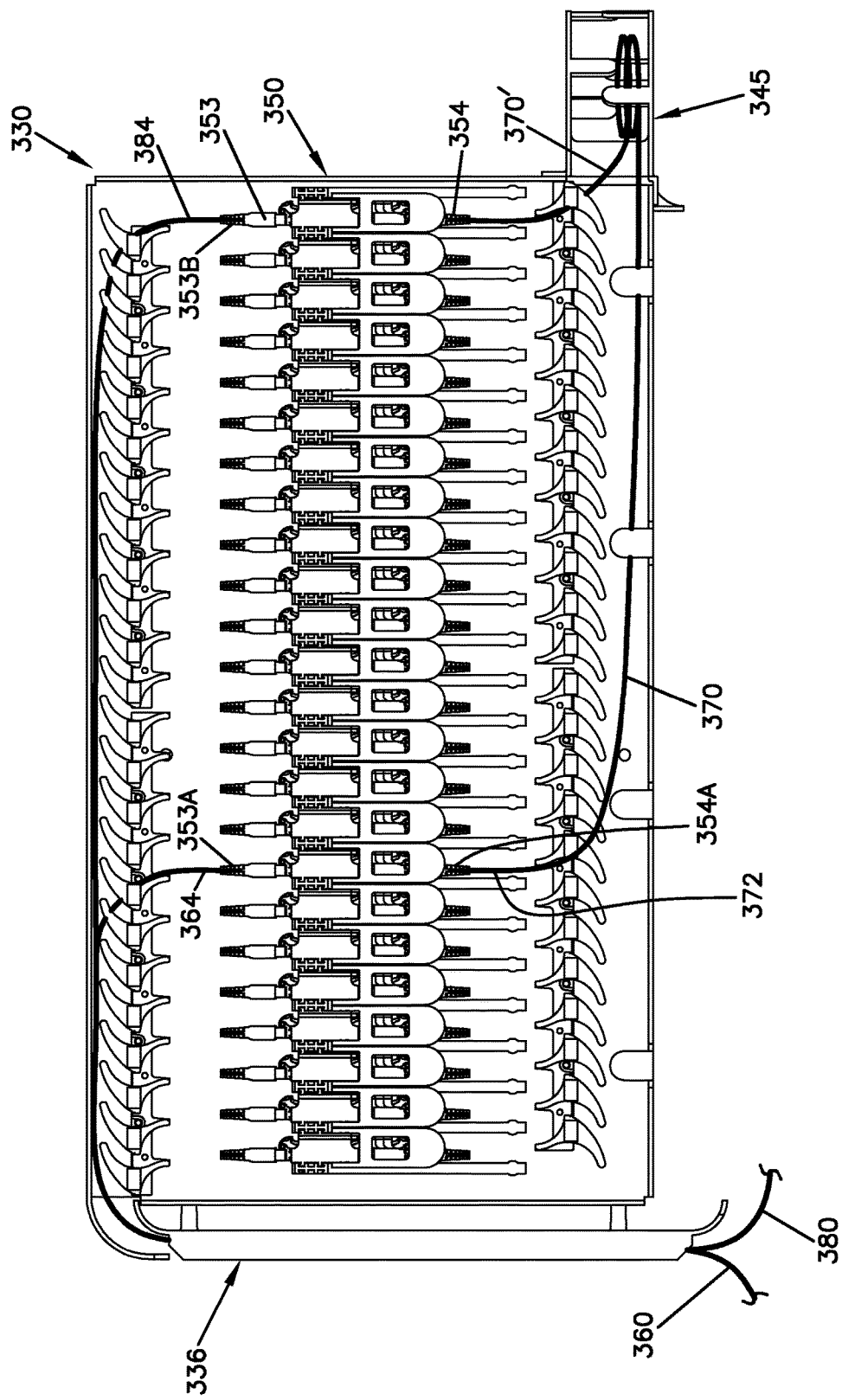
FIGS. 71-75 illustrate some non-limiting example cable routing paths through the rack.

FIGS. 71-75 illustrate some non-limiting example cable routing paths through the rack 300. FIG. 71 shows a side elevational view of a tracking block 330 containing the termination arrangement 350. Three cable routing paths are depicted in FIG. 71. A first cable routing path leads from the termination arrangement 350 to a front 301 of the rack 300. For example, cables extending along the first routing path may have a first end connected at a first termination block of a rack and a second end connected at a second termination block of the same rack. Slack storage from the cables may be stored at the cable storage arrangement 310.

Figure 75:
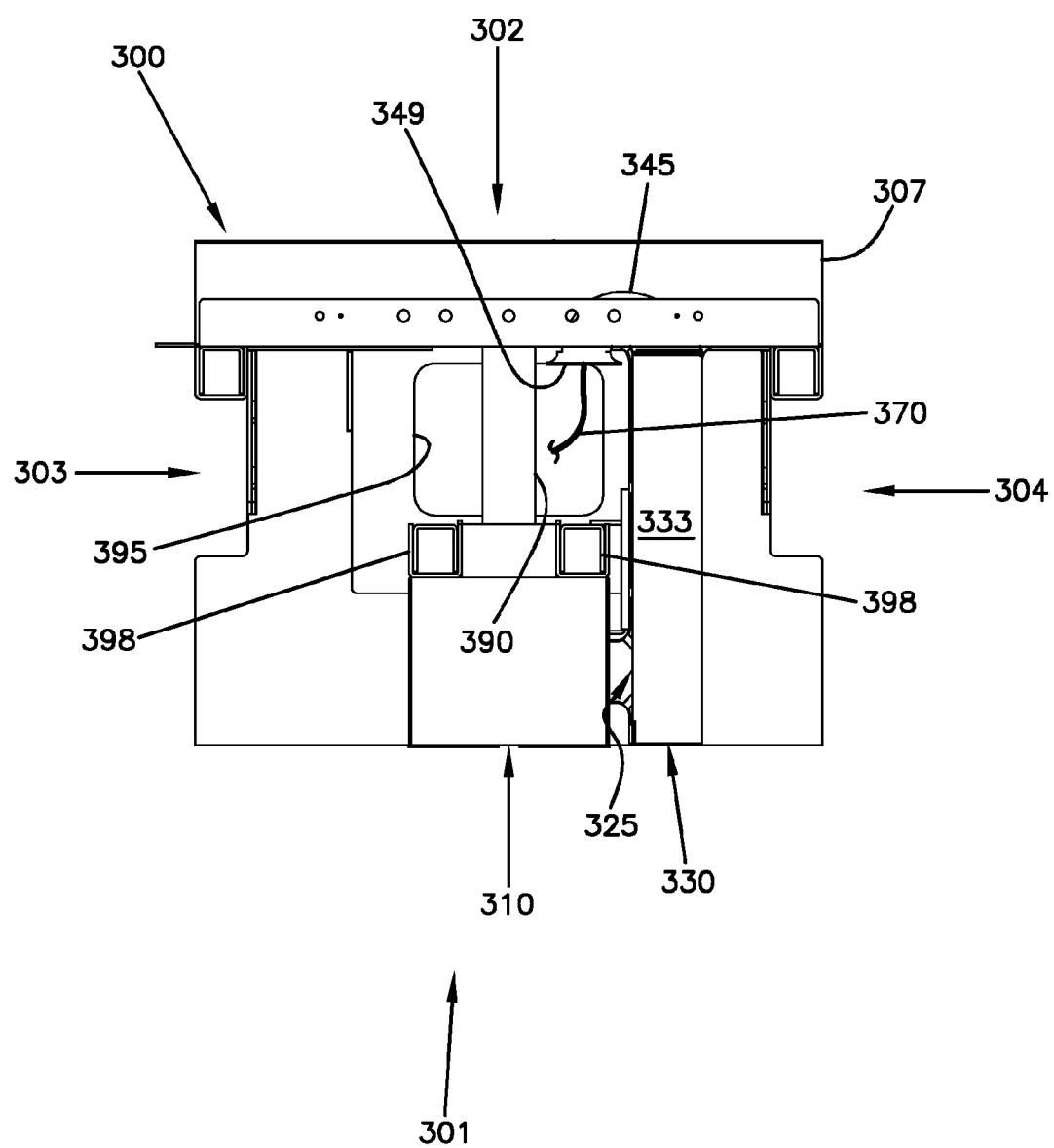
Figure 76:
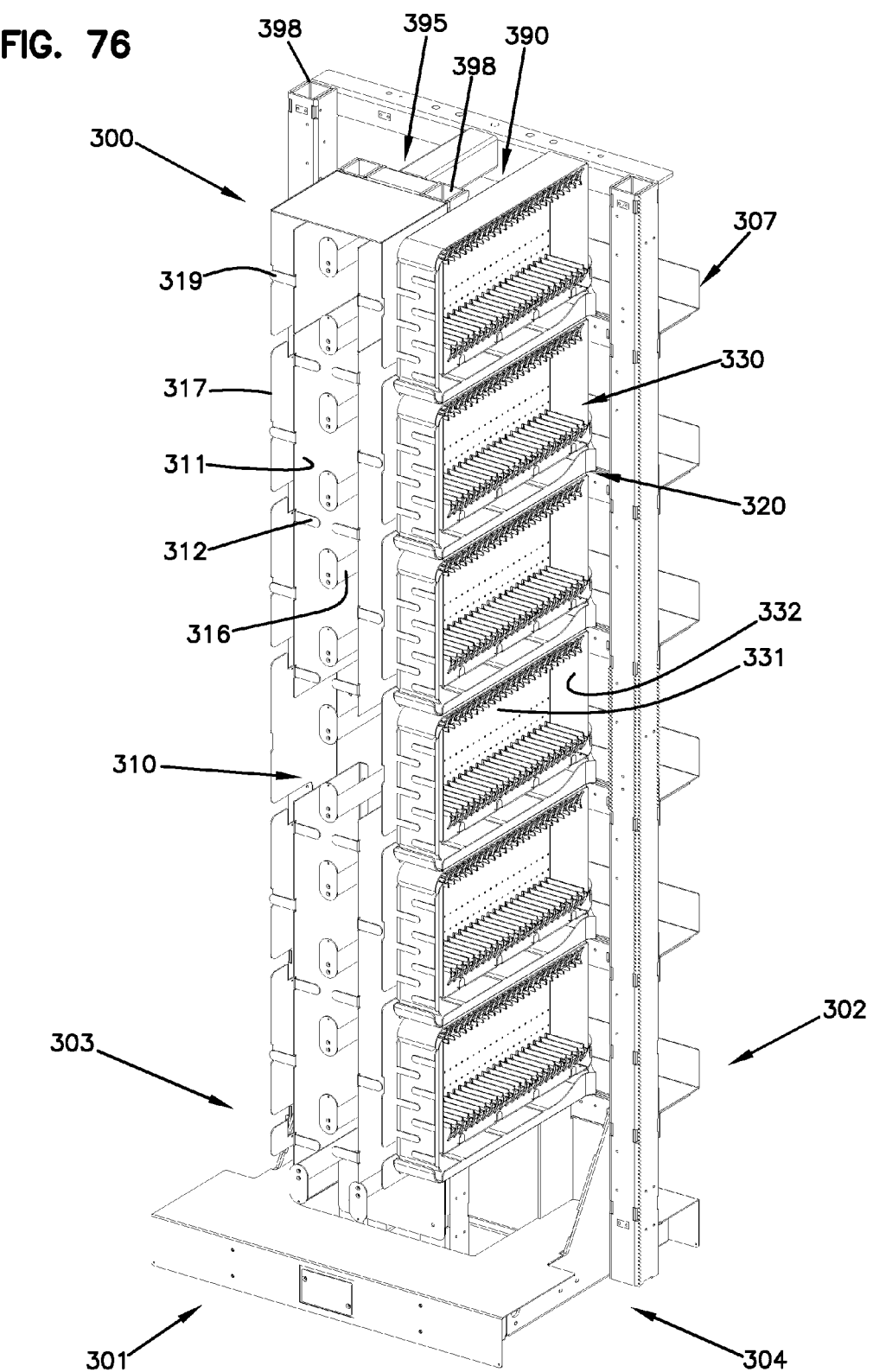
FIG. 76 is a front, side perspective view of the example rack of FIG. 59 with the termination arrangements removed from the termination blocks.

A second cable routing path leads from the termination arrangement 350 to the rear side 302 of the termination block 330, through the curved routing guide 345, and into a vertical channel as disclosed herein with reference to FIG. 75. The vertical channel leads to a guideway system (e.g., a track system). Cables extending along the second routing path may have a first end connected at a first termination block of a rack and a second end connected to optical equipment at a location remote from the rack.

A third cable routing path leads from the termination arrangement 350 to the horizontal troughs 307 at the rear side 302 of the rack 300. For example, cables extending along the third routing path may have a first end connected at a first termination block of a rack and a second end connected at a second termination block disposed at a different side of the same rack or at a second rack. Each end of each cable enters the respective termination block along the third cable routing path. The second rack also includes horizontal troughs that align with the horizontal troughs 307 of the rack 300 to enable cables to extend between racks.

To better illustrate the first cable routing path, a first optical cable 360 is shown routed into the top portion of the termination block interior through the entrance 356. For example, the first optical cable 360 may be routed up the front routing trough 336 and between the radius limiters 334, 335. An end 364 of the first optical cable 360 is routed through the first set of guide fingers 343 towards the termination arrangement 350. The end 364 is terminated at a first optical connector 353A, which is plugged into one of the first ports of one of the sliding adapter modules 351 of the termination arrangement 350.

The guide fingers 343, 344 extend outwardly from the main panel 331 sufficient to accommodate movement of the sliding adapter modules 351. For example, when a sliding adapter module 351 moves from a non-extended position to an extended position, the optical fibers extending outwardly from the first and second ports of the adapter module 351 slide sideways along a bend radius limiter surface defined by a respective one of the guide fingers 343.

To better illustrate the second cable routing path, a second optical cable 370 connects to the first optical cable 360 at the termination arrangement 350. For example, the second optical cable 370 has a first end 372 that is terminated by a second optical connector 354A, which is plugged into one of the second ports of one of the sliding adapter modules 351 of the termination arrangement 350. The second optical connector 354A is aligned and optically coupled to the first optical connector 353A via the adapter module 351. Moving the adapter module 351 to the extended position enhances access to the optical connectors 353A, 353B.

The second optical cable 370 is routed out of the bottom portion of the termination block interior through the exit 358. For example, the second optical cable 370 extends downwardly from the terminated end 372, through the second set of guide fingers 344, towards the bottom panel 341 of the termination block 330. The second optical cable 370 exits the termination block interior through exit 358 and enters the curved routing guide 345. The curved routing guide 345 directs the second optical cable 370 to a vertical channel of the rack 300 for distribution to a horizontal trough 307, a bottom 305 of the rack 300, or a top 306 of the rack 300.

To better illustrate the third cable routing path, a third optical cable 380 extends into the interior of the termination block 330 through the entrance 356. For example, the third optical cable 380 may be routed up the front routing trough 336 and between the radius limiters 334, 335. An end 384 of the third optical cable 380 is routed through the first set of guide fingers 343 towards the termination arrangement 350. The end 384 is terminated at a second optical connector 353B, which is plugged into one of the first ports of another of the sliding adapter modules 351 of the termination arrangement 350. In the example shown, the third optical cable 380 is connected to another second optical cable 370', which is routed out of the termination block 330 and into the curved routing guide 345.

Figure 72:
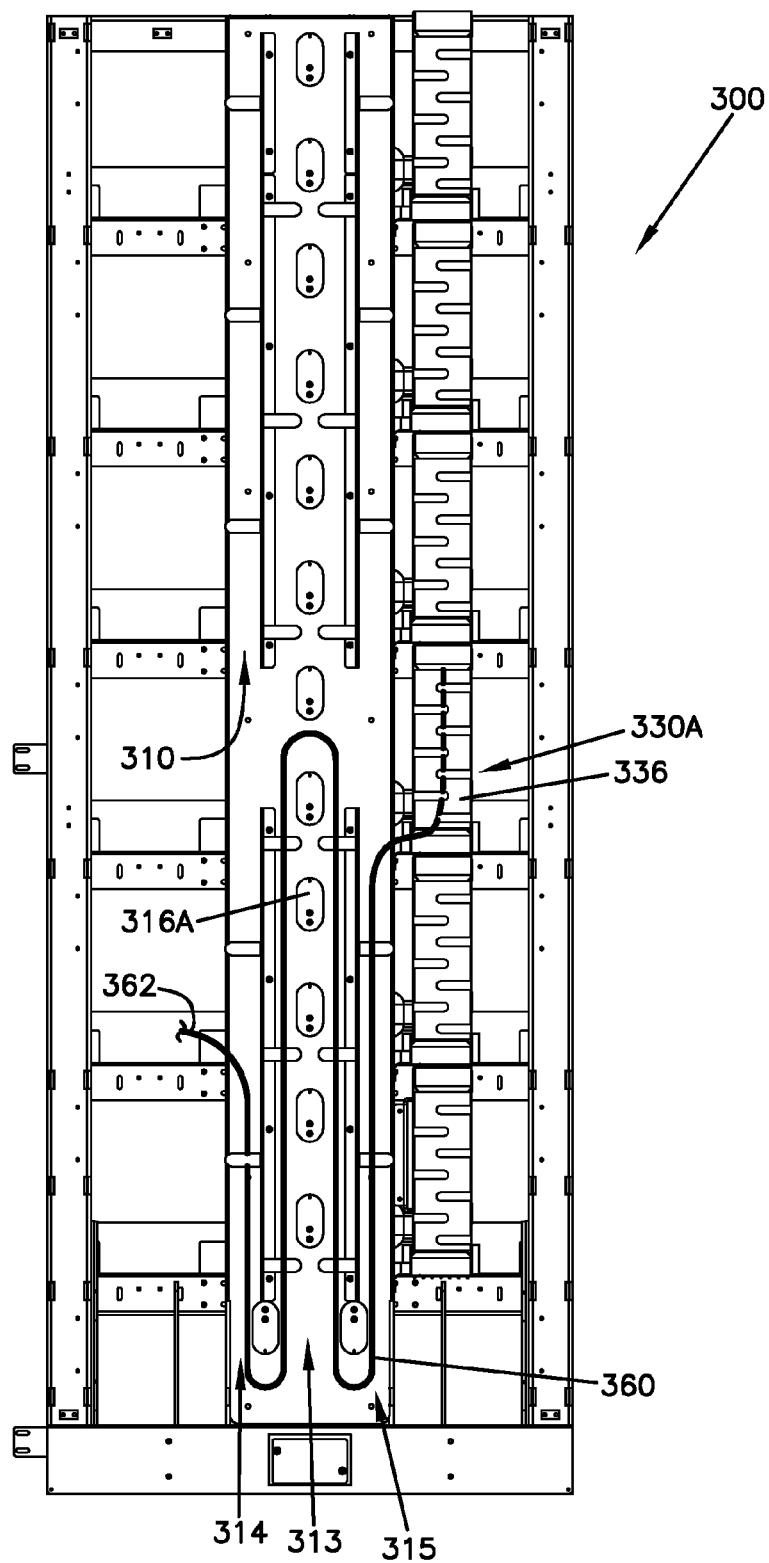
Figure 73:
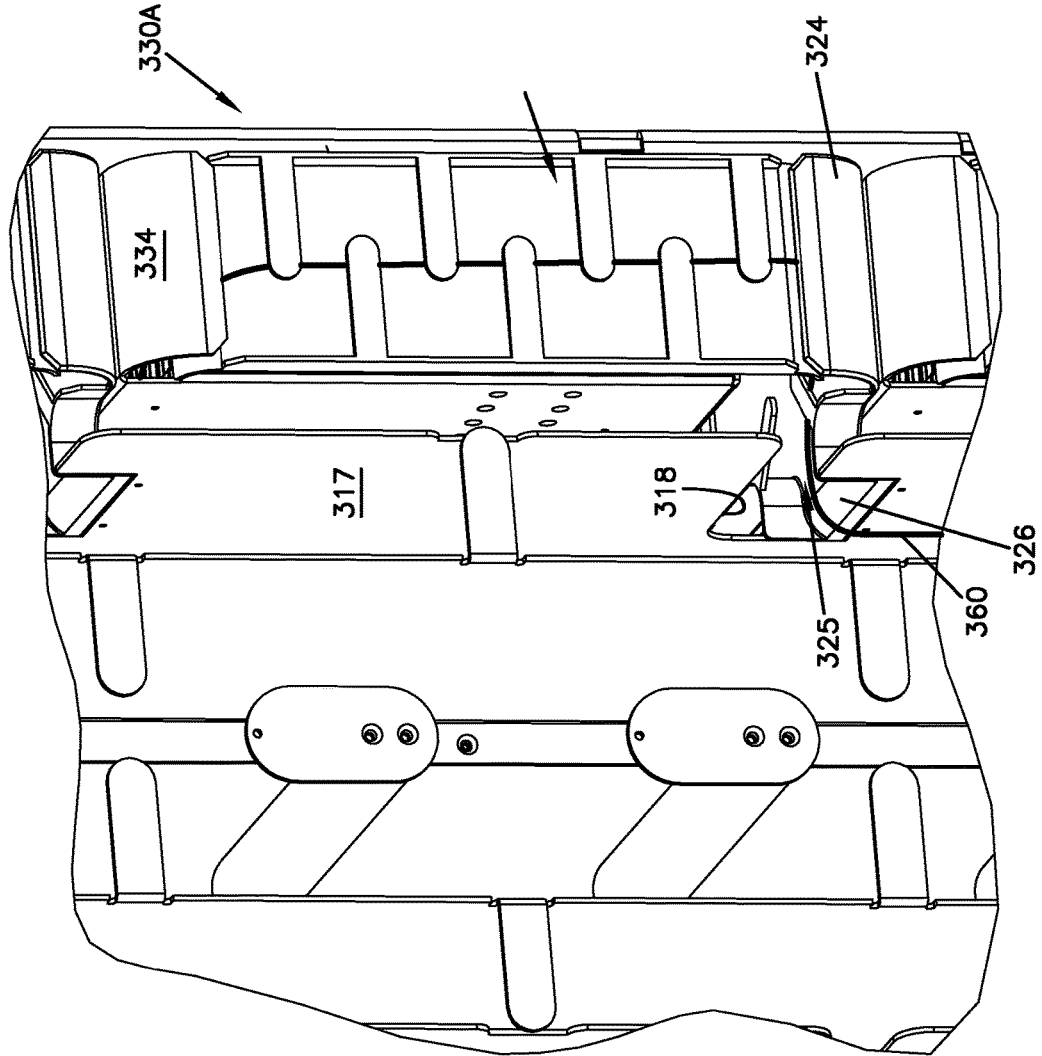

FIGS. 72 and 73 show the first optical cable 360 entering the front routing trough 336 of the termination block 330A. As shown in FIG. 72, the first optical cable 360 may be routed from the first side 303 of the rack 300, through the cable storage channels 313-315, to one of the termination blocks 330A disposed on the second side 304 of the rack 300. For example, the first optical cable 360 may be routed down the left channel 314, up the central channel 313, looped over a cable spool 316A, down the central channel 313, and back up the right channel 315.

As shown in FIG. 73, the first optical cable 360 exits the right channel 315 through the slot 318 defined in the outer member 317. The first optical cable 360 extends over the bend radius limiter 326, into a front portion of the guide trough 320, and up into the front routing trough 336. For example, the first optical cable 360 may enter the front routing guide 336 by extending between the forward radius limiter 324 curving upwardly from the guide base 321 and the bottom radius limiter 339 curving downwardly from the front routing trough 336.

Figure 74:
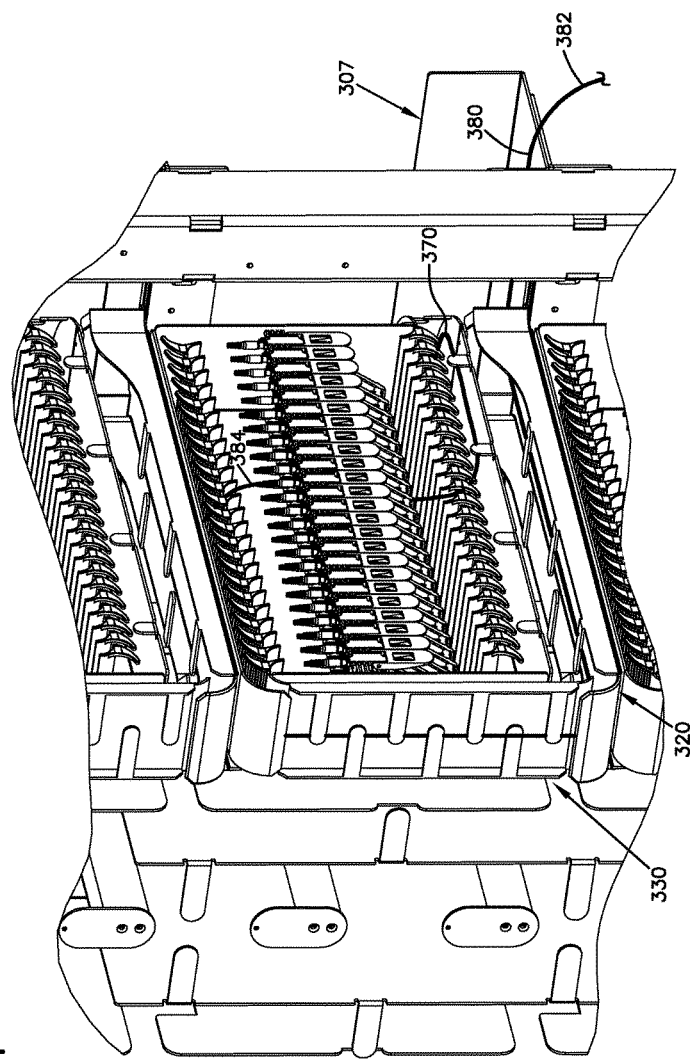

As shown in FIG. 74, the third optical cable 380 is routed to the termination block 330 from the rear 302 of the rack 300. In particular, the third optical cable 380 is routed to the termination block 330 from one of the horizontal troughs 307 at the rear 302 of the rack 300. In FIG. 74, the third optical cable 380 extends along a rear trough 307 and enters the guide trough 320 at the second port 327. The third optical cable 380 extends from the second port 327, along the base 321 of the trough 320, to the front of the trough 320. The third optical cable 380 extends upwardly into the forward routing trough 336 from the guide trough 320 by passing between the forward radius limiter 324 of the guide base 321 and the bottom radius limiter 339 of the front routing trough 336.

FIG. 75 is a top plan view showing the second optical cable 370 exiting the curved routing guide 345. The second optical cable 730 extends through the routing guide 345, out the trumpet-shaped port 349, and into a right vertical channel 390 that extends through the rack 300. The second optical cable 730 may be routed either upwardly or downwardly within the right vertical channel 390. In certain implementations, the rack 300 also has a left vertical channel 395 that is spaced from the right vertical channel 390. The vertical channels 390, 395 are located between the block mounting locations at the first and second sides 303, 304 of the rack 300.

In some implementations, the left and right vertical channels 395, 390 guide the second optical cables 370 to a guideway system (e.g., an overhead guideway system and/or an underground guideway system). In certain implementations, the guideway system leads to optical equipment at which a distal end of the second optical cable 370 is connects. In other implementations, the guideway system may lead the second optical cable 370 to another rack 300.

Having described the preferred aspects and embodiments of the present invention, modifications and equivalents of the disclosed concepts may readily occur to one skilled in the art. However, it is intended that such modifications and equivalents be included within the scope of the claims which are appended hereto.

The invention claimed is:

1. A rack having a front, a rear, a top, a bottom, a first side, and a second side, the rack comprising:
    a cable storage arrangement disposed at the front of the rack, the cable storage arrangement including cable routing channels extending between the top and the bottom of the rack, the cable storage arrangement also including a plurality of cable storage spools extending forwardly of the rack; and
    a first termination block disposed at the first side of the rack, the termination block housing a termination arrangement including a plurality of sliding adapter modules, the adapter modules being configured to slide between a non-extended position and an extended position, wherein the adapter modules move away from the rack when slid to the extended position, and wherein the adapter modules have first ports facing towards the top of the rack and second ports facing towards the bottom of the rack, the first termination block including a main panel that couples to the rack, wherein the sliding adapter modules are coupled to the main panel at an opposite side from the rack, wherein the adapter modules slide towards the main panel to the non-extended position and away from the main panel to the extended position.

2. The rack of claim 1, further comprising a guide trough disposed at the first termination block, the guide trough extending between the front and rear of the rack between the cable storage arrangement and a horizontal trough extending across the rear of the rack.

3. The rack of claim 2, wherein the guide trough includes a generally planar base that extends horizontally between the front and rear of the rack.

4. The rack of claim 3, wherein side walls extend upwardly from the base of the guide trough to retain fibers or cables routed therethrough in the guide trough.

5. The rack of claim 4, wherein retention fingers extend inwardly from the side walls.

6. The rack of claim 2, wherein the cable storage arrangement includes inner channel members and outer channel members that define the cable routing channels, wherein a first port of the guide trough is located at a slot extending through one of the outer channel members.

7. The rack of claim 6, wherein the cable storage spools are disposed between the inner channel members.

8. The rack of claim 6, wherein a radius limiter extends between a guide trough base and the slot defined in the outer channel member to form the first port.

9. The rack of claim 7, wherein a second port of the guide trough is provided at the horizontal trough and additional radius limiters are provided at the second port to facilitate transitioning fibers or cables onto the horizontal trough.

10. The rack of claim 2, wherein a forward radius limiter curves upwardly from a base at a front of the guide trough.

11. The rack of claim 1, wherein the first termination block includes a front routing trough.

12. The rack of claim 11, wherein the front routing trough includes side walls from which one or more retention fingers extend inwardly.

13. The rack of claim 11, wherein the routing trough forms a bottom radius limiter the curves downwardly and rearwardly from the trough.

14. The rack of claim 1, wherein the first termination block also includes a first set of guide fingers disposed above the adapter modules, the guide fingers of the first set providing bend radius protection.

15. The rack of claim 14, wherein the first termination block includes a top panel extending above the first set of guide fingers, the top panel being coupled to the main panel.

16. The rack of claim 14, wherein the first termination block also includes a second set of guide fingers disposed below the adapter modules, the guide fingers of the second set providing bend radius protection.

17. The rack of claim 16, wherein the first termination block also includes a bottom panel disposed below the second set of guide fingers, the bottom panel being coupled to the main panel.

18. The rack of claim 1, further comprising a curved routing guide disposed at the first termination block at the rear of the rack.

19. The rack of claim 18, wherein a cable routing path leads from the adapter modules to a rear side of the first termination block and through the curved routing guide.

20. A rack having a front, a rear, a top, a bottom, a first side, and a second side, the rack comprising:
    a cable storage arrangement disposed at the front of the rack, the cable storage arrangement including cable routing channels extending between the top and the bottom of the rack, the cable storage arrangement also including a plurality of cable storage spools extending forwardly of the rack, wherein the cable storage arrangement includes inner channel members and outer channel members that define the cable routing channels, wherein the cable storage spools are disposed between the inner channel members;
    a first termination block disposed at the first side of the rack, the termination block housing a termination arrangement including a plurality of sliding adapter modules, the adapter modules being configured to slide between a non-extended position and an extended position, wherein the adapter modules move away from the rack when slid to the extended position, and wherein the adapter modules have first ports facing towards the top of the rack and second ports facing towards the bottom of the rack;
    a guide trough disposed at the termination block, the guide trough extending between the front and rear of the rack between the cable storage arrangement and a horizontal trough extending across the rear of the rack, wherein a first port of the guide trough is located at a slot extending through one of the outer channel members, and wherein a second port of the guide trough is provided at the respective horizontal trough and additional radius limiters are provided at the second port to facilitate transitioning fibers or cables onto the respective horizontal trough.

* * * * *